US006982774B1

(12) United States Patent
Nomura et al.

(10) Patent No.: US 6,982,774 B1
(45) Date of Patent: Jan. 3, 2006

(54) LIQUID CRYSTAL DISPLAY ELEMENT INCLUDING AN OPTICALLY ANISOTROPIC FILM HAVING AT LEAST TWO REGIONS WITH DIFFERENT ORIENTATION ANISOTROPIES, AND PRODUCTION METHODS OF THE SAME

(75) Inventors: Takaiki Nomura, Osaka (JP); Kazufumi Ogawa, Nara (JP); Tadashi Otake, Neyagawa (JP); Takako Takebe, Katano (JP); Tsuyoshi Uemura, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 470 days.

(21) Appl. No.: 10/110,409

(22) PCT Filed: Oct. 12, 2000

(86) PCT No.: PCT/IB00/01458

§ 371 (c)(1),
(2), (4) Date: Apr. 12, 2002

(87) PCT Pub. No.: WO01/26442

PCT Pub. Date: Apr. 19, 2001

(30) Foreign Application Priority Data

Oct. 12, 1999 (JP) .......................................... 11-289581
Jun. 8, 2000 (JP) ...................................... 2000-171886

(51) Int. Cl.
  *G02F 1/1337* (2006.01)
  *G02F 1/1343* (2006.01)

(52) U.S. Cl. ........................ 349/129; 349/123; 349/141

(58) Field of Classification Search ......... 349/123–130, 349/141
See application file for complete search history.

(56) References Cited

U.S. PATENT DOCUMENTS

| 5,464,669 | A | * | 11/1995 | Kang et al. | 427/558 |
| 5,473,455 | A | * | 12/1995 | Koike et al. | 349/124 |
| 5,579,141 | A | * | 11/1996 | Suzuki et al. | 349/124 |
| 5,580,605 | A | | 12/1996 | Ogawa et al. | 427/155 |
| 5,602,661 | A | | 2/1997 | Schadt et al. | 349/124 |
| 5,648,829 | A | * | 7/1997 | Yano | 349/129 |
| 5,853,818 | A | | 12/1998 | Kwon et al. | 427/510 |
| 5,859,682 | A | * | 1/1999 | Kim et al. | 349/124 |

FOREIGN PATENT DOCUMENTS

| EP | 0 942 314 A2 | 9/1999 |
| GB | 2 310 048 A | 8/1997 |
| JP | 9-54315 | 2/1997 |
| JP | 10-20284 | 1/1998 |
| JP | 10-213802 | 8/1998 |
| JP | 10-260406 | 9/1998 |
| JP | 11-181127 | 7/1999 |
| JP | 11-212095 | 8/1999 |

\* cited by examiner

Primary Examiner—Tarifur R. Chowdhury
(74) Attorney, Agent, or Firm—Parkhurst & Wendel, L.L.P.

(57) ABSTRACT

A liquid crystal display element having pretilt angles and anchoring energies with respect to liquid crystal molecules that differ between a pair of opposed substrates, a liquid crystal display element having pretilt angles and anchoring energies with respect to liquid crystal molecules that vary at a same substrate, and an optically anisotropic film having a plurality of optically different regions is provided. Thus, a liquid crystal display element that has improved display characteristics, response, and the like can be obtained. Methods of producing such liquid crystal display elements and such an optically anisotropic film are provided. The production methods are simply carried out utilizing the irradiation of polarized light. Thus, the present invention is of great value to industry.

20 Claims, 12 Drawing Sheets

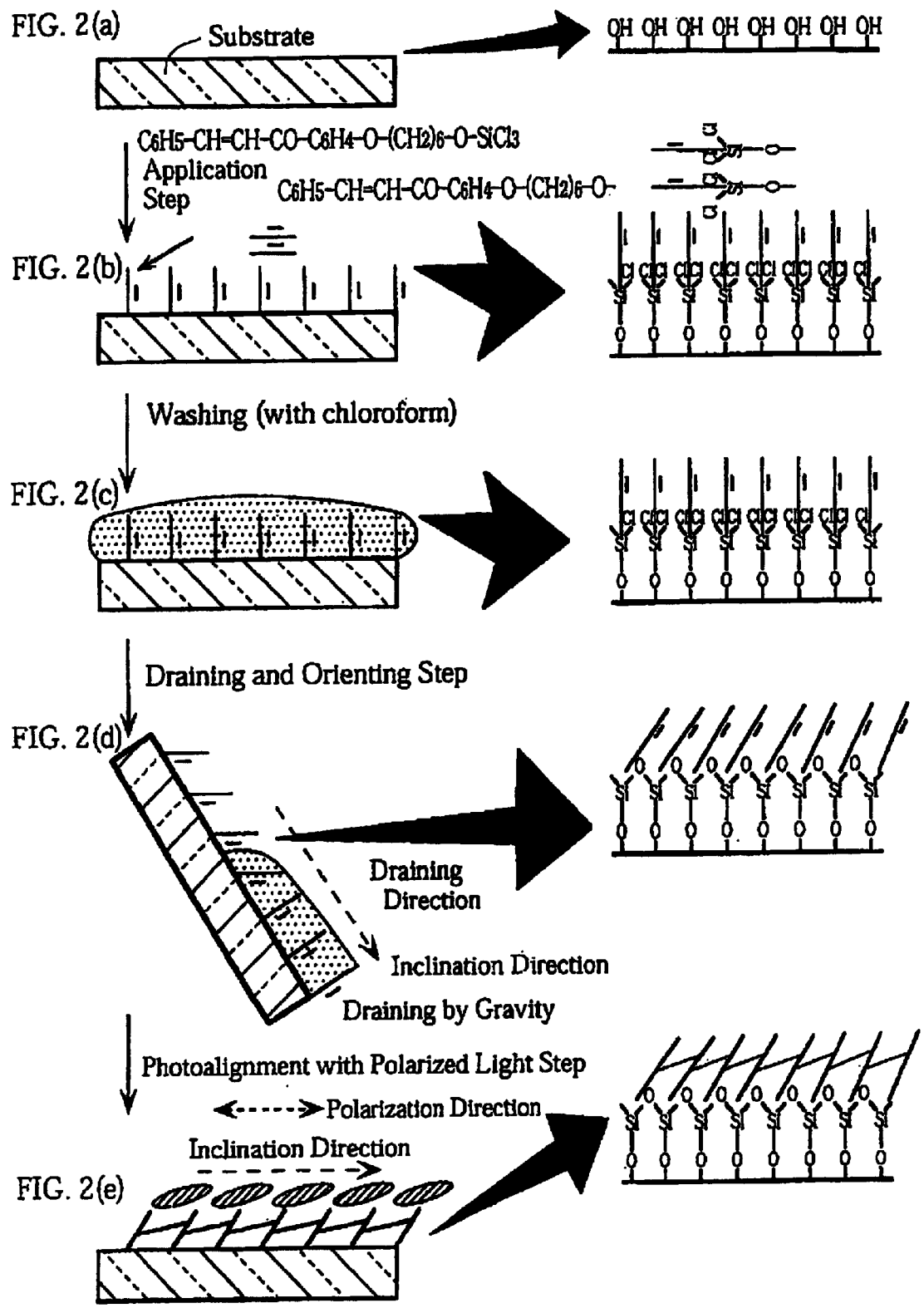

FIG. 9(a) OFF
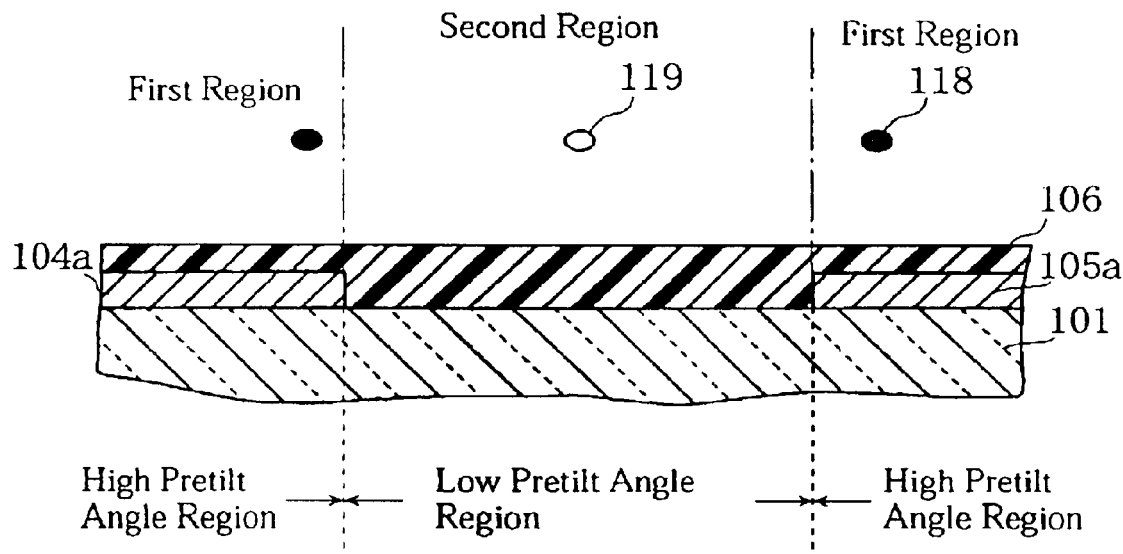
FIG. 9(b) ON
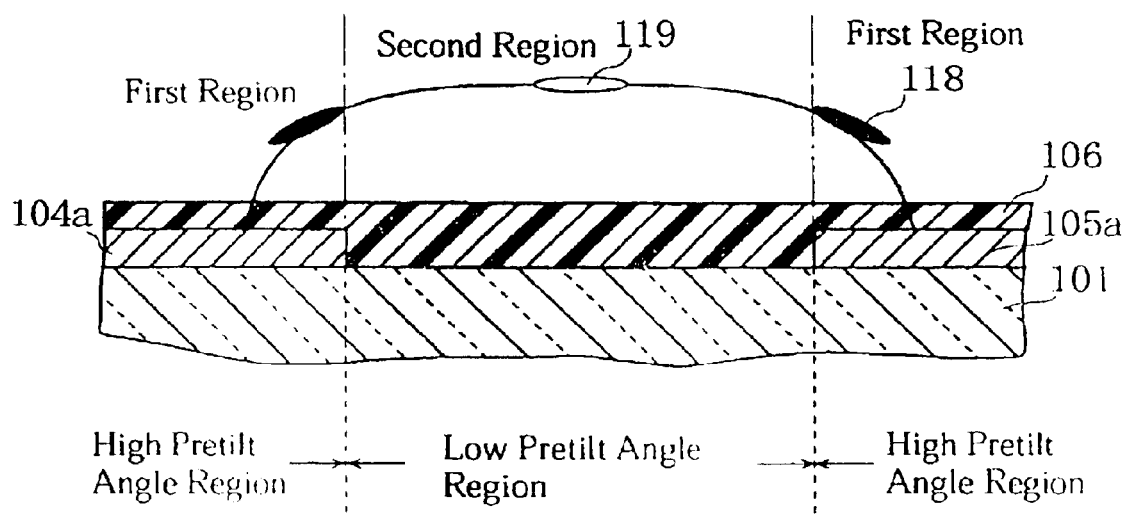

LIQUID CRYSTAL DISPLAY ELEMENT INCLUDING AN OPTICALLY ANISOTROPIC FILM HAVING AT LEAST TWO REGIONS WITH DIFFERENT ORIENTATION ANISOTROPIES, AND PRODUCTION METHODS OF THE SAME

TECHNICAL FIELD

The present invention relates to a liquid crystal display element and a method of producing the same and to an optically anisotropic film and a method of producing the same, the aforesaid for a liquid crystal display panel used in a flat panel display that displays, for example, TV or computer images.

BACKGROUND ART

Among conventional liquid crystal display elements, a twisted nematic (TN) mode liquid crystal display element (LCD) that uses a liquid crystal having a positive dielectric anisotropy, for example, has been put into practical use. This TN mode LCD is driven by applying an electric field in a direction perpendicular to the substrate surfaces to change the orientation of the liquid crystal molecules such that their long axes are parallel to the direction of the electric field.

In recent years, along with improvement in definition, progress has been made in reducing the size of pixels. However, with reduction in the size of pixels, the influence of a transverse electric field generated during voltage application between has lines (electrode wiring) in the vicinity of the edges of the pixel electrodes has become a problem. In a conventional LCD, while it is common, for preventing coloration, to orient the liquid crystal molecules at a low pretilt angle using a common orientation film this makes pixels susceptible to the influence of a transverse electric field from adjacent pixels, thereby inviting alignment defects such as reverse tilt. Alignment defects are particularly noticeable in the perimeter portions of pixel regions, and these alignment defects bring about disclination of the boundaries between the perimeter portions and regions other than the perimeter portions. Thus, in a conventional TN mode LCD, the problem of degradation in display characteristics, such as a decrease in contrast and the like, results.

In order to prevent reverse tilt caused by the transverse electric field from other pixels, the polar anchoring energy of all regions of the pixels has between increased. However, the influence of the transverse electric field in pixel regions other than the perimeter portions is small, and when the polar anchoring energy is large in their regions, coloration arises.

Transverse electric field-driven liquid crystal display elements provided with counter electrodes on a substrate surface have also been developed.

For example, in order to obtain a wide-viewing angle, in-plane switching (IPS) mode LCDs, which switch the liquid crystal molecules in a direction within the plane of the substrates by applying a so-called transverse electric field in a direction parallel to the substrate surfaces, have been developed. In the area above the electrodes in IPS mode LCDs, a transverse electric field is not generated, but rather an electric field is generated in a direction perpendicular to the substrate surfaces. For this reason, the alignment state of liquid crystal above the electrodes cannot be changed. When an electric field is applied in an IPS mode LCD, the liquid crystal layer comes to have both a region in which molecules transition to a new alignment state and a region in which molecules remain in the initial orientation state. As a result, at least in the vicinity of the boundaries between the regions, continuity in the alignment state of the liquid crystal is not maintained and this factors into deterioration in response. Thus, IPS mode LCDs are disadvantageous in that response speed is even slower than that of conventional vertical electric field mode LCDs.

In addition, in IPS mode LCDs, orientation films having the same anchoring energy are provided on opposing substrates. In such an LCD, liquid crystal molecules above the substrate having electrodes on its surface rotate to at most approximately 90° when driving is ON. On the other hand, liquid crystal molecules above the substrate without electrodes on its surface hardly rotate. Thus, sticking (phenomenon wherein liquid crystal molecules to not return to the initial orientation state when driving is switched from ON to OFF) occurs, resulting in degradation in the visual characteristics of the liquid crystal display element.

As is described above, liquid crystal display elements operated in twisted nematic (TN) mode, which use a liquid crystal having a positive dielectric anisotropy, those operated in IPS mode, which have a very wide viewing angle and whose the liquid crystal molecules are driven within a plane using transverse electric field, and the like have been put into practical use.

In contrast to these, a bend alignment type liquid crystal display element has been proposed which utilizes a change in refractive index caused by the change in the rise angle of each liquid crystal molecule in a state wherein the liquid crystal molecules between the substrates show a bend alignment (OCB mode liquid crystal display element). In comparison to the speed of the change in alignment between an ON state and an OFF state in a TN liquid crystal display element, the speed of change in alignment of each of liquid crystal molecules showing a bending alignment between an ON state and an OFF state is very high speed, making it possible to obtain a liquid crystal display element that is excellent in terms of response. The bend alignment-type liquid crystal display element described above is self-compensating in terms of optical retardation because all of the liquid crystal molecules between the upper and lower substrates show bend alignment, and the display element enables a wide viewing angle at low-voltage operation by the provision of a film retardation plate that compensates for retardation.

The liquid crystal display element described above is usually fabricated so that the liquid crystal of the liquid crystal layer shows a splay alignment when voltage is not being applied. Therefore, in order to utilize the bend alignment to change the refractive index, it is necessary to uniformly transition the entire display portion from a splay alignment state to a bend alignment state. The transition to a bend alignment proceeds with transition seeds as the center. The location of transition seed generation as not regular, appearing, for example, at orientation irregularities or damaged areas of the orientation film interface. Because the location of transition seed generation is not fixed, display defects tend to arise. Therefore, it is very important to uniformly transition the entire display portion from a splay alignment to a bend alignment before use.

In addition, although a high driving voltage is needed to transition from a splay alignment state to a bend alignment state, it is difficult to easily bring about this transition in alignment state because the driving voltage is generally limited.

Furthermore, the perimeter portion of the display region of a liquid crystal display element does not contribute to liquid crystal display. Thus, it is not necessary to inject liquid crystal into the perimeter portion of the display region. However, in conventional liquid crystal display elements, liquid crystal injected into the perimeter portion of the display region is wasted, as it is difficult to inject the liquid crystal without also injecting the liquid crystal into the perimeter portion of the display region.

Finally, use of orientation films having more than one liquid crystal orientation has been proposed in order to improve the display characteristics of liquid crystal display elements. However, further improvement in display characteristics is needed beyond what has been realized by such methods.

DISCLOSURE OF THE INVENTION

All of the embodiments are based on the same or similar concepts. However because each of the embodiments has been realized by different examples, the embodiments have been divided into a first invention group, a second invention group, etc. by grouping together those embodiments that are closely related. In the following, the details of each section (invention group) are described in order.

(1) The First Invention Group

In order to achieve the first object, the first invention group provides a liquid crystal display element comprising a liquid crystal sandwiched between two opposed substrates each having an orientation film, wherein the two orientation films comprise molecules having a photosensitive group and have different orientation anisotropies from one another, the molecules having been irradiated with polarized light, and wherein a pretilt angle of liquid crystal molecules corresponding to the orientation anisotropy of the orientation film provided on an inner side of one of the opposed substrates differs from a pretilt angle of liquid crystal molecules corresponding to the orientation anisotropy of the orientation film provided on an inner side of the other opposed substrate.

This construction makes is possible, by irradiating orientation films of a liquid crystal display element with polarized ultraviolet light, to easily provide orientation films that can induce a pretilt angle in liquid crystal molecules for various modes of the liquid crystal display.

With this construction, the polarized light irradiation may be such that the molecules having photosensitive groups, for example, are irradiated with polarized light of different irradiation intensity.

The molecules may also be irradiated with polarized light applied at different angles to the substrates.

In addition, one of the opposed substrates may have opposed electrodes on a surface thereof, and the pretilt angle of the liquid crystal molecules corresponding to the orientation anisotropy of the orientation film provided on the inner side of the one opposed substrate may be greater than the pretilt angle of the liquid crystal molecules corresponding to the orientation anisotropy of the orientation film provided on the inner side of the other opposed substrate.

With this construction, an electric field above the electrodes orients liquid crystal molecules to a specified pretilt angle when driving is ON in, for example, an IPS mode liquid crystal display element. Response speed is thus improved by orienting liquid crystal molecules above the substrate having the electrodes to somewhat of a pretilt angle even when driving is OFF.

The liquid crystal display elements described above may be produced by, for example, forming this films on a pair of substrates using molecules having at least a photosensitive group; carrying out an orientation treatment by irradiating one of the thin films and the other of the thin films with polarized light under different irradiation conditions so that the orientation anisotropy of the one thin film and that of the other thin film are made different; forming a sealing material on either of the substrates in a frame shape excluding a portion for a liquid crystal injection port; and adhering the substrates together.

Thus construction makes it possible to simply obtain orientation films that induce different pretilt angles by irradiating the one of the thin films and the other of the thin films with polarized light under different irradiation conditions.

It is possible, for example, that the irradiation be such that the one of the thin films and the other of the thin films are irradiated with polarized light of different irradiation intensity.

It is also possible that the irradiation be such that the one of the thin films and the other of the thin films are irradiated with polarized light having parallel planes of polarization and different angles of incidence with respect to surfaces of the substrates.

In addition, one of the opposed substrates may have opposed electrodes on a surface thereof, and the orientation treatment may be carried out under orientation conditions such that a pretilt angle of liquid crystal molecules corresponding to the orientation anisotropy of an orientation film provided on an inner side of the one opposed substrate is made greater than a pretilt angle of liquid crystal molecules corresponding to the orientation anisotropy of an orientation film provided on an inner side of the other opposed substrate.

(2) The Second Invention Group

In order to achieve the second object, the second invention group provides a liquid crystal display element capable of hybrid liquid crystal orientation.

In order to achieve the second object, there is provided a liquid crystal display element comprising a liquid crystal sandwiched between two opposed substrates each having an orientation film, wherein at least one of the orientation films comprises molecules having a photosensitive group and has at least two regions with different orientation anisotropies, the molecules having been irradiated with polarized light, and wherein liquid crystal molecules have pretilt angles such as to correspond to the orientation anisotropies of the regions of the orientation film.

This construction makes it possible to control the pretilt angle to a pretilt angle that can be consistently reproduced, as pretilt angle is controlled by the irradiation of polarized light. Because the at least two regions having different orientation anisotropy are provided by irradiation with polarized light, the production process is simplified and contamination and the like of the orientation film by a protective film is not a problem in comparison with rubbing treatment.

It is possible that each region be provided by irradiation of the molecules having a photosensitive group with polarized light of differing irradiation intensities.

It is also possible that the at least two regions having different orientation anisotropies be provided by irradiation with polarized light applied at differing angles to the substrates.

In addition, while at least one of the orientation films should be provided with at least two regions having different orientation anisotropies, it is possible that an orientation film provided with at least two regions having different orientation anisotropies be provided on an inner side of each of the opposed substrates such that regions of the orientation films having a same orientation are opposed to one another.

This construction makes is possible to provide a liquid crystal display element excellent in terms of liquid crystal orientation.

The liquid crystal display elements described above may be produced by, for example, the following methods.

The liquid crystal display elements may be produced by forming thin films on a pair of substrates using molecules having at least a photosensitive group; carrying out an orientation treatment by irradiating different areas of at least one of the thin films with polarized light under different irradiation conditions to form at least two regions having different orientation anisotropies on the at least one of thin films; forming a sealing material on either of the substrates in a frame shape excluding a portion for a liquid crystal injection port; adhering the substrate together; and injecting a liquid crystal between the substrates through the liquid crystal injection port to form a liquid crystal layer.

This construction makes it possible to simply produce, for various liquid crystal display modes of liquid crystal display elements, orientation films having a plurality of orientation anisotropies by using a shadow mask on the thin films on the surfaces of the substrates.

It is possible, for example, that the irradiation be such that different areas of at least one of the thin films be irradiated with polarized light of different irradiation intensity.

It is also possible that the irradiation be such that different areas of at least one of the thin films be irradiated with polarized light having parallel planes of polarization and different angles of incidence with respect to surfaces of the substrates.

(2-1) Invention Group 2-1

In order to achieve the second object, invention group 2-1 provides a TN mode liquid crystal display device for preventing the generation of disclination by transverse electric fields and for suppressing a deterioration in contrast and the like that is caused by this disclination.

In order to achieve this object, the present invention provides a liquid crystal display element, wherein the liquid crystal display element is a twisted mematic orientation mode liquid crystal display element comprising a liquid crystal layer with an initial orientation state in twisted orientation mode provided between a pair of substrates; and a transverse electric field suppressing region in which liquid crystal molecules have been oriented at a higher pretilt angle than are liquid crystal molecules in an inner region of each pixel region is provided in a perimeter portion of each pixel region in the liquid crystal layer.

In a conventional TN mode liquid crystal display element, orientation abnormalities such as disclination arise due to the influence of a transverse electric field in the perimeter portion of each pixel region, and this is a cause of the generation of disclination at boundaries between the perimeter portions and portions of the pixel regions other than the perimeter portions. Generation of disclination such as this caused by a transverse electric field (hereinafter referred to as transverse electric field disclination) invites deterioration in contrast and thus is a cause of degradation in display characteristics.

As a method of suppressing this transverse electric field disclination, orienting the liquid crystal molecules at a high pretilt angle is conceivable. In the case of TN mode, however, orientation of liquid crystal molecules at a high pretilt angle invites coloration and a further deterioration in display characteristics.

In consideration of this, the present invention, as in the construction described above, is such that each pixel region is divided into a perimeter portion that is influenced by a transverse electric field and an inner region that is not, and a transverse electric field suppressing region is provided in each perimeter portion such that liquid crystal molecules are oriented at a higher pretilt angle in the perimeter portions than in the inner regions. As a result, disclination generated at boundaries between the perimeter portions and portions other than the perimeter portions is prevented. Meanwhile, because liquid crystal molecules in the inner regions are oriented to a low pretilt angle, coloration on the display screen is not observed. Thus, a liquid crystal display element having excellent display characteristics such as contrast and no observation of coloration is provided.

It is possible that the construction described above be such that an orientation film for orienting liquid crystal molecules in a specified direction be provided on an inner side of each of the substrates; and the orientation film comprise a high pretilt angle region for initially orienting liquid crystal molecules at a high pretilt angle in each of the transverse electric field suppressing regions and a low pretilt angle region for initially orienting liquid crystal molecules at a low pretilt angle in each of the inner regions.

It is possible that the orientation film at least contain thin film components each having a photosensitive group, the photosensitive groups being polymerized and fixed in a desired direction.

It is also possible that the orientation film be a thin film formed of a group of molecules including at least molecules of a silane-based compound each having a photosensitive group, the group of molecules being bonded and fixed to each of the substrates.

It is further possible that the group of molecules be inclined in a specified direction and the photosensitive groups polymerized and fixed in the specified direction.

Finally, it is possible that the orientation film be a monomolecular film.

The present invention provides a method of producing a liquid crystal display element that is a twisted nematic orientation mode liquid crystal display element having a liquid crystal layer with an initial orientation state in twisted orientation mode provided between a pair of substrates, the method comprising the steps of forming orientation films on the pair of substrates; carrying out an orientation treatment on each of the orientation films such that orientation treatment conditions for regions of the liquid crystal layer corresponding to perimeter portions of pixel regions are made different from orientation treatment conditions for regions corresponding to inner regions, which are regions other than the perimeter portions, to form high pretilt angle regions for orienting liquid crystal molecules at a high pretilt angle in the regions corresponding to the perimeter portions and low pretilt angle regions for orienting liquid crystal molecules at a low pretilt angle in the regions corresponding to the inner regions; adhering the substrates together; and injecting liquid crystal between the substrates through an injection port to form a liquid crystal layer; whereby transverse electric field suppressing regions are formed in the perimeter portions of the pixel regions in the liquid crystal layer, the transverse electric field suppressing regions in the liquid crystal layer, the transverse electric field suppressing regions orienting liquid crystal molecules to a higher pretilt angle than do the inner regions of the pixel regions.

The method described above makes it possible to provide a liquid crystal display element for suppressing generation of reverse tilt even with influence from a transverse electric field by carrying out an orientation treatment on the orientation films formed on the substrates to form a high pretilt angle region for orienting liquid crystal molecules at a high pretilt angle in each region corresponding to the perimeter portion of each pixel region. Thus, disclination generation at boundaries between the perimeter portions and portions other than the perimeter portions is prevented, making it possible to produce a liquid crystal display element having excellent display characteristics such as contrast.

It is possible that the step of carrying out an orientation treatment be a step of carrying out an orientation treatment by polarized photoalignment such that surfaces of the substrates having the orientation films formed thereon are irradiated with polarized light; and that the irradiation with polarized light be carried out such that the irradiation intensity of a first polarized light applied to the perimeter portions of the pixel regions is made greater than the irradiation intensity of a second polarized light applied to the regions of the pixel regions other than the perimeter portions.

It is also possible that the step of carrying out an orientation treatment be a step of carrying out an orientation treatment by polarized photoalignment such that surfaces of the substrates having the orientation films formed thereon are irradiated with polarized light; and that the irradiation with polarized light is carried out such that the plane of polarization of a first polarized light applied to the formation regions and a second plane of polarization applied to the formation regions are made parallel, and the angle of incidence with respect to the substrate surfaces of the first polarized light is made smaller than the angle of incidence with respect to the substrate surfaces of the second polarized light.

It is further possible that the step of forming orientation films be such that a silane-based compound having photosensitive groups is contacted to the substrate surfaces under a dry atmosphere, whereby the silane-based compound is chemisorbed to the substrate surfaces.

It is further possible to carry out the steps of removing unadsorbed silane-based compound by washing surfaces of the substrates having the orientation films formed thereon using a washing solution immediately after the step of forming orientation films; and temporarily aligning molecules of silane-based compound adsorbed to the substrate surfaces by standing the washed substrates in a fixed direction to drain and dry washing solution remaining on the substrate surfaces; so that the draining direction is made parallel to the planes of polarization of the step of carrying out on orientation treatment by polarized photoalignment.

(2-2) Invention Group 2-2

In order to achieve the objects described hereinbefore, invention group 2-2 provides an IPS mode liquid crystal display element having good response speed by making it possible to sufficiently drive liquid crystal above the electrodes.

In order to achieve these objects, the present invention provides an in-plane switching-type liquid crystal display element having a liquid crystal layer provided between a pair of substrates and pairs of electrodes provided on one of the substrates, the display element wherein: the liquid crystal layer comprises, first regions provided above the electrodes, wherein liquid crystal alignment is controlled by electric field components above the electrodes; and a second region corresponding to an area between the pairs of electrodes, wherein liquid crystal alignment is controlled by transverse electric field components; wherein a pretilt angle of liquid crystal molecules in the first regions is larger than a pretilt angle of liquid crystal molecules in the second region.

It is possible that an orientation film for orienting liquid crystal molecules in a substantially same direction be provided on an inner side of one of the substrates, the orientation film having high pretilt angle regions for initially orienting liquid crystal molecules above the pairs of electrodes at a high pretilt angle and a low pretilt angle region for initially orienting liquid crystal molecules between the pairs of electrodes at a low pretilt angle.

It is also possible that the orientation film control the orientation of liquid crystal molecules such that pretilt angle increases continuously and progressively toward the electrodes.

It is also possible that each of the pairs of electrodes be a transparent electrode.

It is also possible that the orientation film at least contain thin film component molecules each having a photosensitive group, the photosensitive groups being polymerized and fixed in a desired direction.

It is also possible that the orientation film be a thin film formed of a group of molecules including at least molecules of a silane-based compound each having a photosensitive group, the group of molecules being bonded and fixed on each of the substrates.

It is also possible that the group of molecules be inclined in a specified direction and that the photosensitive groups be polymerized and fixed in the specified direction.

Finally, it is possible that the orientation film be a monomolecular film.

In addition, in order to realize the objects mentioned above, the present invention provides a method of producing a liquid crystal display element that is an in-plane switching-type liquid crystal display element provided with a liquid crystal layer between a pair of substrates and pairs of electrodes on one of the substrates, the method comprising the steps of forming orientation films on the pair of substrates; carrying out an orientation treatment on the orientation films such that orientation treatment conditions for regions above the pairs of electrodes are made different from orientation treatment conditions for regions corresponding to an area between the pairs of electrodes to form high pretilt angle regions for orienting liquid crystal molecules at a high pretilt angle in the regions above the pairs of electrodes and a low pretilt angle region for orienting liquid crystal molecules at a low pretilt angle in the region corresponding to the area between the pairs of electrodes; adhering the substrates together; and injecting a liquid crystal between the substrates to form a liquid crystal layer; whereby in the liquid crystal layer, first regions and a second region are formed, the first regions provided above the electrodes, wherein liquid crystal alignment is controlled by electric field components above the electrodes, and the second region corresponding to the area between the pairs of electrodes, wherein liquid crystal alignment is controlled by transverse electric field components.

In the method described above, it is possible that the step of carrying out an orientation treatment be a step of carrying out an orientation treatment such that surfaces of the substrates having the orientation films formed thereon are irradiated with polarized light; and the irradiation with polarized light be carried out such that the irradiation intensity of a first polarized light applied to the regions above the pairs of electrodes is made greater than the irradiation intensity of a second polarized light applied to the region corresponding to the area between the pairs of electrodes.

It is possible that the step of carrying out an orientation treatment be a step of carrying out an orientation treatment by photoalignment with polarized light such that surfaces of the substrates having the orientation films formed thereon are irradiated with polarized light; and the irradiation with polarized light be carried out such that the plane of polarization of a first polarized light applied above the pairs of electrodes and a second plane of polarization applied to the region corresponding to the area between the electrodes are made parallel, and the angle of incidence with respect to the substrate surfaces of the first polarized light is made smaller than the angle of incidence with respect to the substrate surfaces of the second polarized light.

It is possible that the step of forming orientation films be such that a silane based compound having photosensitive groups is contacted to the substrate surfaces under a dry atmosphere, whereby the silane-based compound is chemisorbed to the substrate surfaces.

It is possible to carry out the steps of removing unadsorbed silane-based compound by washing surfaces of the substrates having the orientation films formed thereon using a washing solution immediately after the step of forming orientation films; and temporarily aligning molecules of silane-based compound absorbed to the substrate surfaces by standing the washed substrates in a fixed direction to drain and dry washing solution remaining on the substrate surfaces; so that the draining direction is made parallel to the planes of polarization of the step of carrying out an orientation treatment by polarized photoalignment.

Advantages of the IPS mode liquid crystal display element of the present invention are described below.

In conventional IPS mode liquid crystal display elements, while a transverse electric field generated between the pixel electrodes and the opposing electrodes brings about a change in the liquid crystal alignment state, liquid crystal molecules above the electrodes are not driven because an electric field component vertical to the substrate surfaces is generated above these electrodes. For this reason, the liquid crystal layer comes to have both regions in which the liquid crystal transitions to a new alignment state and regions in which the liquid crystal remains in the initial orientation state, whereby at least in the boundary portions between both regions, continuity in the alignment state of the liquid crystal (during application of an electric field) is not maintained, factoring into a deterioration of response.

However, as in the case of the present invention, by providing, in the liquid crystal layer above the pairs of electrodes, first regions in which liquid crystal alignment is changed by electric field components above the electrodes, continuity in alignment state is maintained at boundary portions between electrode formation regions and a nonformation region even when an electric field is applied, whereby a smooth transition between liquid crystal alignment states is realized. Thus, an improvement in response is achieved.

The creation of the first regions is achieved by initially orienting liquid crystal molecules in the first regions to a larger pretilt angle than that to which liquid crystal molecules in the second region are oriented. When the liquid crystal molecules are initially oriented to a high pretilt angle, the long axis direction and the like of the liquid crystal molecules can be easily lined up with the vertical electrical field direction.

By providing, on one of the substrates, an orientation film having high pretilt angle regions above the pairs of electrodes and a low pretilt angle region between the pairs of electrodes, it is possible to initially orient liquid crystal molecules in the first regions to a high pretilt angle and liquid crystal molecules in the second region to a low pretilt angle.

By formation of first regions, the region of liquid crystal that can be operated is enlarged. Thus, when a transparent electrode is used for each of the pairs of electrodes, the electrode formation regions also contribute to screen display, thereby improving light usage efficiency. As a result, a much brighter display can be achieved.

With the production method of a liquid crystal display element of the present invention, it is possible to make the regions above the electrodes into regions that orient liquid crystal molecules at a high pretilt angle and the region corresponding to the area between the electrodes into a region that orients liquid crystal molecules at a low pretilt angle by carrying out an orientation treatment on the orientation film having the pairs of electrodes such that orientation conditions for the regions above the pairs of electrodes are made different from orientation conditions for the region corresponding to the area between the pairs of electrodes. By doing this the orientation state of liquid crystal molecules in the formation regions can be changed by electrode field components above the electrodes. Even when an electric field is being applied, continuity in liquid crystal state is maintained at the boundary portions between the first regions and the second region, making it possible to realize a smooth transition between liquid crystal alignment states and to thereby produce a liquid crystal display element having excellent response.

In addition, carrying out a photoalignment step, in which the surfaces of substrates having an orientation film formed thereon are irradiated with polarized light, for the orientation treatment step, eliminates the need to form a photoresist (protective film) by photolithography as was necessary in carrying out of the conventional rubbing treatment. Thus, it is made possible to simplify the production process and to prevent degradation of the surface of the orientation film that is caused by the formation and exfoliation of a photoresist. Furthermore, the generation of dust, which was a problem with the rubbing method, does not arise with the photoalignment method, making it possible to prevent contamination of the orientation film.

(2-3) Invention Group 2-3

In order to achieve the objects described above, it is an object of the invention group 2-3 to provide a liquid crystal display element that, along with reducing the splay-bend transition voltage by almost certain generation of transition seeds, has no display defects and has excellent display quality. It is also an object to provide a method of producing such a liquid crystal display element.

In order to achieve the objects described above, the present invention provides a liquid crystal display element comprising a liquid crystal layer oriented in a splay alignment provided between a pair of substrates with electrodes, each substrate having an orientation film, the display element wherein: at least one of the orientation films comprises thin film component molecules each having a photosensitive group and high pretilt regions for orienting liquid crystal molecules to a higher pretilt angle than do other regions; and the liquid crystal layer has transition seed generation regions wherein a transition from splay alignment to bend alignment is accelerated by application of a voltage to the electrodes, the transition seed generation regions being formed by the high pretilt angle regions.

It is preferable that at least one of the transition seed generation regions be provided in each pixel region in the liquid crystal layer.

It is possible that the construction described above be such that the one orientation film be a thin film formed of a group of silane-based compound each having a photosensitive group, the group being bonded and fixed on one of the substrates.

It is possible that the silane-based compound molecules comprise a linear hydrocarbon chain. When the silane-based compound molecules comprise a linear hydrocarbon chain, the silane-based compound molecules can be well aligned on the substrate, making it possible to form a highly dense, chemisorbed thin film. Thus, a liquid crystal display element having an orientation film with excellent orientation properties can be obtained.

It is also possible that the construction be such that a photosensitive group portion in the thin film component molecules is polymerized and fixed in a desired direction.

It is possible that the orientation film be a monomolecular film.

It is possible that the photosensitive group portion be cinnamoyl groups or chalconyl groups.

In order to realize the objects described above, the present invention provides a method of producing a liquid crystal display element having a liquid crystal layer oriented in splay alignment provided between a pair of substrates with electrodes, each substrate having an orientation film, the method comprising the steps of forming an orientation film comprising thin film components each having a photosensitive group on at least one of the substrates; carrying out an orientation treatment that utilizes a photoalignment method on the orientation film wherein irradiation conditions are varied to form high pretilt angle regions for orienting liquid crystal molecules at a higher pretilt angle than do other regions; adhering the substrates together; and injecting a liquid crystal between the substrates to form a liquid crystal layer; whereby transition seed generation regions for accelerating a transition from splay alignment to bend alignment with application of a voltage to the electrodes are provided in the liquid crystal layer, the transition seed generation regions being formed by the high pretilt angle regions.

It is possible that the step of carrying out an orientation treatment be such that polarized light having a greater irradiation intensity than polarized light applied to the other regions is applied to specified regions to form the high pretilt angle regions in the specified regions.

It is possible that the step of carrying out an orientation treatment be such that polarized light having a smaller angle of incidence than polarized light applied to the other regions is applied to specified regions to form the high pretilt angle regions in the specified regions.

It is possible that the step of carrying out an orientation treatment be such that a silane-based compound having photosensitive groups is contacted to the substrate surface under a dry atmosphere, whereby the silane-based compound is chemisorbed to the substrate surface.

It is possible to carry out the steps of removing unadsorbed silane-based compound by washing surfaces of the substrates having the orientation films formed thereon using a washing solution immediately after the step of forming orientation films; and temporarily aligning molecules of silane-based compound adsorbed to the substrate surfaces by standing the washed substrates in a fixed direction to drain and dry washing solution remaining on the substrate surfaces; so that the draining direction is made parallel to the planes of polarization of the step of carrying out an orientation treatment by polarized photoalignment.

Advantages of such a liquid crystal display element of the present invention is described below.

A liquid crystal display element in accordance with the present invention is such that transition seed generation regions are provided in the liquid crystal layer by forming high pretilt angle regions for orienting liquid crystal molecules to a higher pretilt angle than to other regions in the orientation film. Orienting liquid crystal molecules to a higher pretilt angle than to other regions makes it possible to provide a liquid crystal alignment state having a distorted construction in these regions. Thus, when voltage is applied, liquid crystal molecules in these regions rise (transition) quickly as compared to liquid crystal molecules of other regions, whereby transitions seeds are generated. The generation of transition seeds accelerates a transition from splay alignment to bend alignment, thereby reducing the splay-bend transition voltage.

It is possible that the orientation film be a thin film formed of a group of thin film components each having a photosensitive group and bonded to a substrate, a photosensitive group of the thin film components being polymerized and fixed in a specified direction. In this way, the orientation of liquid crystal molecules can be controlled in the direction in which the photosensitive group is polymerized and fixed, making it possible to obtain a liquid crystal display element having excellent orientation uniformity.

In addition, in the production method of the liquid crystal display element of the present invention, orientation treatment on the orientation film is carried out using a photoalignment method (polarized photoalignment step), eliminating the need to form a photoresist (protective film) by photolithography as was necessary in carrying out of the conventional rubbing treatment. Thus, it is made possible to simplify the production process and to prevent degradation of the surface of the orientation film that is caused by the formation and exfoliation of a photoresist. Furthermore, the generation of dust does not arise with the photoalignment method, making it possible to prevent contamination of the orientation film.

Furthermore, by irradiating specified regions with polarized light having a greater irradiation intensity than polarized light with which other regions are irradiated, high pretilt angle regions can be formed in the specified regions with good reproducibility. Alternatively, high pretilt angle regions can be formed in the specified regions by irradiating these regions with polarized light applied at an incidence angle that is larger than that of polarized light applied to other regions. Thus, by employing either of these methods or a combination of these methods, transition angle generation regions can be easily formed in the liquid crystal layer. Even when voltage is applied to the electrodes, the generation of transition seeds is ensured and the transition from splay alignment to bend alignment accelerated, making it possible to produce a liquid crystal display element having a reduced splay-bend transition voltage.

(2) The Third Invention Group

In order to achieve the objects described above, the third invention group provides a liquid crystal display element having excellent display characteristics by providing an orientation film on each of a pair of substrates in a liquid crystal display element and making the anchoring energy, with respect to liquid crystal molecules, of each respective orientation film different.

In order to achieve the objects described above, the present invention provides a liquid crystal display element comprising a liquid crystal sandwiched between two opposed substrates each having an orientation film, wherein the two orientation films comprise molecules having a photosensitive group and have different orientation anisotropies from one another, the molecules having been irradiated with polarized light, and wherein an anchoring energy, with respect to liquid crystal molecules, of the orientation film provided on an inner side of one of the opposed substrates differs from an anchoring energy, with respect to liquid crystal molecules, of the orientation film provided on an inner side of the other opposed substrate.

The construction described above makes it possible to provide a liquid crystal display element suitable for various liquid crystal modes, each display element provided with orientation films that have an anchoring energy with respect to liquid crystal molecules. For example, with an orientation film on a substrate having opposed electrodes on a surface thereof, the anchoring energy with respect to liquid crystal molecules can be made large. On the other hand, with an orientation film on a substrate without the electrodes, the anchoring energy with respect to liquid crystal molecules can be made small because it is not necessary that the anchoring energy with respect to he liquid crystal molecules be a particularly large azimuthal anchoring energy. In particular, because a photoalignment method is employed, the controlling of the anchoring energy can be realized with good reproducibility.

Such a liquid crystal display element of the present invention may also be obtained by employing the two orientation films comprising molecules having a photosensitive group, the molecules having been irradiated with polarized light of different irradiation intensity.

Such a liquid crystal display element of the present invention may also be obtained by employing the two orientation films comprising molecules having a photosensitive group, the molecules having been irradiation with polarized light applied at different angles to the substrates.

It is possible that the molecules having a photosensitive group be molecules of a silane-based compound, a group of the molecules forming a thin film bonded and fixed to each of the substrates.

Opposed electrodes may be provided on one of the substrates.

It is preferable that the anchoring energy, with respect to a liquid crystal molecules, of the orientation film provided on an inner side of one of the opposed substrates be greater than the anchoring energy, with respect to liquid crystal molecules, of the orientation film provided on an inner side of the other opposed substrate.

The anchoring energies may be defined by azimuthal anchoring energy.

The present invention provides a method of producing a liquid crystal display element, comprising the steps of forming thin films on a pair of substrates using molecules having at least a photosensitive group; carrying out an orientation treatment by irradiating one of the thin films and the other of the thin films with polarized light under different irradiation conditions to make the orientation anisotropy of the one orientation film different from the orientation anisotropy of the other orientation film, so that an anchoring energy, with respect to liquid crystal molecules, of the one orientation film and an anchoring energy, with respect to liquid crystal molecules, of the other orientation film are different; forming a sealing material on either of the substrates in a frame shape excluding a portion for a liquid crystal injection port; adhering the substrates together; and injecting a liquid crystal between the substrates through the liquid crystal injection port to form a liquid crystal layer.

With this construction, because ultraviolet polarized light is applied under different conditions, the anchoring energy, with respect to liquid crystal molecules, of each orientation film can be easily made different. When a rubbing method is employed, the controlling of anchoring energy can neither be achieved easily, nor with good reproducibility. However, polarized light irradiation makes it possible to easily control anchoring energy with good reproducibility.

In for example, an IPS mode liquid crystal display element, the surface having the opposed electrodes may have large azimuthal anchoring energy, making it possible to carry out driving of the liquid crystal element at optimal performance. For example, because voltage-transmissivity characteristics are such that the change in transmissivity is steep in the vicinity of the threshold voltage, an IPS mode liquid crystal display element having an even greater number of scan lines can be provided for matrix driving.

The production method may be carried out by applying polarized light of different irradiation intensity.

The molecules having a photosensitive group may also be irradiated with polarized light forming different angles with the substrates.

It is possible that one of the opposed substrate have opposed electrodes on a surface thereof, and that the orientation treatment be carried out under orientation conditions such that the anchoring energy with respect to liquid crystal molecules, of an orientation film provided on an inner side of the one opposed substrate is made greater than the anchoring energy with respect to liquid crystal molecules, of an orientation film provided on an inner side of the other opposed substrate.

It is possible that the step of forming thin films be such that a silane-based compound having photosensitive groups is contacted to surfaces of the substrate under a dry atmosphere, whereby the silane-based compound is chemisorbed to the substrate surfaces.

It is possible to carry out the steps of removing unadsorbed silane-based compound by washing surfaces of the substrates having the orientation films formed thereon using a washing solution immediately after the step of forming orientation films; and temporarily aligning molecules of silane-based compound adsorbed to the substrate surfaces by standing the washed substrates in a fixed direction to drain and dry washing solution remaining on the substrate surfaces; so that the draining direction is made parallel to the planes of polarization of the step of carrying out an orientation treatment by polarized photoalignment.

(4) The Fourth Invention Group

In order to realize the objects described above, the present invention provides a liquid crystal display element comprising a liquid crystal sandwiched between two opposed substrates each having an orientation film, wherein at least one of the orientation films comprises molecules having a photosensitive group and has at least two regions with different orientation anisotropies, the molecules having been irradiated with polarized light, and wherein anchoring energies with respect to liquid crystal molecules are different such as to correspond to the orientation anisotropies of the regions of the at least one of the orientation films.

Because this construction of the present invention is such that at least two regions having an anchoring energy, with respect to liquid crystal molecules, are provided on one of the substrates by polarized light irradiation, it is not necessary to form a photoresist (protective film) by photolithography, as was necessary with the conventional rubbing method. Thus, it is made possible to simplify the production process and to prevent degradation of the surface of the orientation film that is caused by the formation and exfoliation of a photoresist. Furthermore, the generation of dust does not arise with the photoalignment method, making it possible to prevent contamination of the orientation film.

It is possible that the irradiation of polarized light be carried out by applying polarized light of differing irradiation intensities.

Polarizing light may be applied so as to form differing angles with the substrates.

The orientation film having the at least two regions with different orientation anisotropies may be provided on an inner side of each of the opposed substrates such that regions of the orientation films having a same orientation anisotropy being opposed to one another.

The present invention provides a method of producing a liquid crystal display element comprising the steps of: forming thin films on a pair of substrates using molecules having at least a photosensitive group; carrying out an orientation treatment by irradiating different areas of at least one of the thin films with polarized light under different irradiation conditions to form at least two regions having different orientation anisotropies on the at least one of the thin films, whereby regions having different anchoring energies, with respect to liquid crystal molecules, are formed in the film; forming a sealing material on either of the substrates in a frame shape excluding a portion for a liquid crystal injection port; adhering the substrates together; and injecting a liquid crystal between the substrates through the liquid crystal injection port to form a liquid crystal layer.

Employing such a construction makes it possible to easily produce a liquid crystal display element having an orientation film with regions having differing anchoring energies with respect to liquid crystal.

The polarized light irradiation may be such that, for example, different areas of at least one of the thin films is irradiated with polarized light of differing irradiation intensity.

The polarized light irradiation may also be such that different areas of at least one of the thin films is irradiated with polarized light having parallel planes of polarization and at least two different angles of incidence with respect to surfaces of the substrates.

In the following, liquid crystal display elements of the fourth invention group and production methods of the same are described in detail.

(4-1) Invention Group 4-1

In order to achieve the objects described above, invention group 4-1 provides a TN mode liquid crystal display element that prevents the generation of transverse electric field disclination and deterioration in contrast caused by this disclination. It also provides a method of producing such a liquid crystal display element.

The present invention provides a liquid crystal display element wherein the liquid crystal display element is a twisted nematic orientation mode liquid crystal display element having a liquid crystal layer with an initial orientation state in twisted orientation mode provided between a pair of substrates; an orientation film for orienting liquid crystal molecules in a specified direction is provided on an inner side of each of the substrates; and a transverse electric field suppressing region is provided in a perimeter portion of each pixel region in the orientation films, the transverse electric field suppressing region having a greater anchoring energy with respect to liquid crystal molecules than does an inner region of each pixel region.

In the construction of the present invention described above, each pixel region is divided into a perimeter portion that is influenced by a transverse electric field and an inner region that is not, and a transverse electric field suppressing region is provided in each perimeter portion such that the anchoring energy, with respect to liquid crystal molecules, is larger in the perimeter portion than in the inner region. As a result, disclination generated at boundaries between the perimeter portions and portions other than the perimeter portions is prevented. Meanwhile, because anchoring energy is suppressed to a low value in the areas of the pixel regions other than the perimeter portions, the driving voltage does not reach a high value.

It is possible that the orientation film at least contain thin film components each having a photosensitive group, the photosensitive groups being polymerized and fixed in a desired direction.

It is a possible that the orientation film be a thin film formed of a group of molecules including at least molecules of a silane-based compound each having a photosensitive group, the group of molecules being bonded and fixed to each of the substrates.

It is possible that the group of molecules be inclined in a specified direction and the photosensitive groups be polymerized and fixed in the specified direction.

It is possible that the orientation film be a monomolecular film.

In order to achieve the objects described above, the present invention provides a method of producing a liquid crystal display element, comprising the steps of forming orientation films on a pair of substrates; carrying out an orientation treatment on each of the orientation films such that orientation treatment conditions for regions of the orientation films corresponding to perimeter portions of pixel regions are made different from orientation treatment conditions for regions corresponding to inner regions, which are regions other than the perimeter portions, to form regions of the orientation films having a large anchoring energy with respect to liquid crystal molecules in regions corresponding to the perimeter portions and regions of the orientation films having a small anchoring energy with respect to liquid crystal molecules in regions corresponding to the inner regions; adhering the substrates together; and injecting a liquid crystal between the substrates to form a liquid crystal layer; whereby transverse electric field suppressing regions are formed in the perimeter portions of the pixel regions of the orientation films, the transverse electric field suppressing regions having a greater anchoring energy with respect to liquid crystal molecules than do the inner regions.

The method described above makes it possible to provide a liquid crystal display element for suppressing generation of reverse tilt even with influence from a transverse electric field by carrying out an orientation treatment on the orientation films formed on the substrates to form a region having a larger anchoring energy with respect to liquid crystal molecules in regions corresponding to the perimeter portions, whereby a transverse electric field suppressing region is provided in each perimeter portion of the pixel electrodes. Thus, disclination generation at boundaries between the perimeter portions and portions other than the perimeter portions is prevented, making it possible to produce a liquid crystal display element having excellent display characteristics such as contrast.

It is possible that the step of carrying out an orientation treatment be a step of carrying out an orientation treatment by photoalignment with polarized light such that surfaces of the substrates having the orientation films formed thereon are irradiated with polarized light; and the irradiation with polarized light be carried out such that the irradiation intensity of a first polarized light applied to the perimeter portions of the pixel regions is made greater than the irradiation intensity of a second polarized light applied to the regions of the pixel regions other than the perimeter portions.

It is possible that the step of carrying out an orientation treatment be a step of carrying out an orientation treatment by photoalignment with polarized light such that surfaces of the substrates having the orientation films formed thereon are irradiated with polarized light; and the irradiation with polarized light be carried out such that the plane of polarization of a first polarized light applied to the formation regions and a second plane of polarization applied to the formation regions are made parallel, and the angle of incidence with respect to the substrate surfaces of the first polarized light is made smaller than the angle of incidence with respect to the substrate surfaces of the second polarized light.

It is possible that the step of forming orientation films be such that a silane-based compound having photosensitive groups is contacted to the substrate surfaces under a dry atmosphere, whereby the silane-based compound is chemisorbed to the substrate surfaces.

(4-2) Invention Group 4-2

In order to achieve the objects described above, invention group 4-2 provides an IPS mode liquid crystal display element having good response speed by making it possible to sufficiently drive liquid crystal even above the electrodes. It also provides a method of producing such a liquid crystal display element.

The present invention provides a liquid crystal display element that is an in-plane switching-type liquid crystal display element comprising a liquid crystal layer provided between a pair of substrates and pairs of electrodes provided on one of the substrates, the display element wherein: an orientation film for orienting liquid crystal molecules in a substantially same direction is provided on an inner side of one of the substrates; and the liquid crystal layer comprises, first regions provided above the electrodes, wherein liquid crystal alignment is controlled by electric field components above the electrodes; and a second region corresponding to an area between the pairs of electrodes, wherein liquid crystal alignment is controlled by transverse electric field components; wherein an anchoring energy, with respect to liquid crystal molecules, of the orientation film in the first regions is greater than an anchoring energy, with respect to liquid crystal molecules of the orientation film in the second region.

The principles of driving in an IPS mode liquid crystal display element are such that, when driving is ON, the electric field in the azimuthal direction is strong above the electrodes, but weak in other regions. Therefore, it is desirable that the azimuthal anchoring energy be large above the electrodes and small in other regions. An electric field component in the polar direction exists above the electrodes, but is almost nonexistent in other regions. Therefore, it is desirable that the polar anchoring energy be large above the electrodes, but small in other regions.

This construction of the present invention makes it possible to provide a liquid crystal display element having regions with different anchoring energies because anchoring energy, with respect to liquid crystal molecules, or the orientation film can be easily changed by applying polarized light.

It is possible that the orientation film comprise regions having a large anchoring energy with respect to liquid crystal molecules above the pairs of electrodes and a region having a small anchoring energy with respect to liquid crystal molecules between the pairs of electrodes.

It is possible that the orientation film control the orientation of liquid crystal molecules such that anchoring energy increases continuously or in a step-wise manner toward the electrodes.

Each of the pairs of electrodes may be a transparent electrode.

The orientation film may at least contain thin film component molecules each having a photosensitive group, the photosensitive groups being polymerized and fixed in a fixed direction.

The orientation film may be a thin film formed of a group of molecules including at least molecules of a silane-based compound each having a photosensitive group, the group of molecules being bonded and fixed to each of the substrates. The group of molecules may be inclined in a specified direction and the photosensitive groups polymerized and fixed in the specified direction.

The orientation film may be a monomolecular film.

The present invention provides a method of producing a liquid crystal display element that is an in-plane switching-type liquid crystal display element provided with a liquid crystal layer between a pair of substrates and pairs of electrodes on one of the substrates, the method comprising the steps of: forming orientation films on the pair of substrates; carrying out an orientation treatment on the orientation films such that orientation treatment conditions for regions above the pairs of electrodes are made different from orientation treatment conditions for a region corresponding to an area between the pairs of electrodes to form regions of the orientation films having a large anchoring energy with respect to liquid crystal molecules in regions above the pairs of electrodes and a region of the orientation films having a small anchoring energy with respect to liquid crystal molecules in the region corresponding to the area between the pairs of electrodes; adhering the substrates together; and injecting a liquid crystal between the substrates to form a liquid crystal layer; whereby in the liquid crystal layer, first regions and a second region are formed, the first regions provided above the electrodes, wherein liquid crystal alignment is controlled by electric field components above the electrodes, and the second region corresponding to the area between the pairs of electrodes, wherein liquid crystal alignment is controlled by transverse electric field components.

With this construction, the alignment state of liquid crystal molecules in formation regions can be changed by electric field components above the electrodes.

It is possible that the step of carrying out an orientation treatment be a step of carrying out an orientation treatment such that surfaces of the substrates having the orientation films formed thereon are irradiated with polarized light; and the irradiation with polarized light be carried out such that the irradiation intensity of a first polarized light applied to the regions above the pairs of electrodes is made greater than the irradiation intensity of a second polarized light applied to the region corresponding to the area between the pairs of electrodes.

It is possible that the step of carrying out an orientation treatment be a step of carrying out an orientation treatment by photoalignment with polarized light such that surfaces of the substrates having the orientation films formed thereon are irradiated with polarized light; and the irradiation with polarized light be carried out such that the plane of polarization of a first polarized light applied above the pairs of electrodes and a second plane of polarization applied to the regions corresponding to the area between the electrodes are made parallel, and the angle of incidence with respect to the substrate surfaces of the first polarized light is made smaller than the angle of incidence with respect to the substrate surfaces of the second polarized light.

It is possible that the step of forming orientation films be such that a silane-based compound having photosensitive groups is contacted to the substrate surfaces under a dry atmosphere, whereby the silane-based compound is chemisorbed to the substrate surfaces.

It is possible to carry out the steps of removing unadsorbed silane-based compound by washing surfaces of the substrates having the orientation films formed thereon using a washing solution immediately after the step of forming orientation films; and temporarily aligning molecules of silane-based compound adsorbed to the substrate surfaces by standing the washed substrates in a fixed direction to drain and dry washing solution remaining on the substrate surfaces; so that the draining direction is made parallel to the planes of polarization of the step of carrying out an orientation treatment by photoalignment with polarized light.

(4-3) Invention Group 4-3

In order to achieve the objects of described above, invention group 4-3 provides a liquid crystal display element that, along with reducing the splay-bend transition voltage by almost certain generation of transition seeds, has no display defects and has excellent display quality. It is also an object to provide a method of producing such a liquid crystal display element.

The present invention provides a liquid crystal display element comprising a liquid crystal layer oriented in splay alignment provided between a pair of substrates with electrodes, each substrate having an orientation film, the display element wherein: at least one of the orientation films comprises thin film component molecules each having a photosensitive group and regions having a larger anchoring energy with respect to liquid crystal molecules than do other regions; and the liquid crystal layer has transition seed generation regions wherein a transition from splay alignment to bend alignment is accelerated by application of a voltage to the electrodes, the transition seed generation regions being formed by the regions of the orientation film having a large anchoring energy with respect to liquid crystal molecules.

The same advantageous effects are obtained as with invention group 2-3. Additionally, regions having a large anchoring energy with respect to liquid crystal molecules and regions having a small anchoring energy with respect to liquid crystal molecules are formed in the orientation film without affecting pretilt angle. Thus, even if regions having a larger anchoring energy with respect to liquid crystal molecules are provided in any area of the pixel regions, these regions serve as transition seeds, the initial orientation of the liquid crystal not being affected.

The transition seed generation regions should be provided such that each pixel region in the liquid crystal layer has at least one of the transition seed generation regions. It this way, a transition seed is generated in each of the pixel regions.

It is possible that the one orientation film be a thin film formed of a group of silane-based compound each having a photosensitive group, the group being bonded and fixed on one of the substrates.

It is possible that the silane-based compound molecules comprise a linear hydrocarbon chain.

A photosensitive group portion in the thin film component molecules may be polymerized and fixed in a desired direction.

The orientation film may be a monomolecular film.

The photosensitive group portion may be cinnamoyl groups or chalconyl groups.

The present invention provides a method of producing a liquid crystal display element having a liquid crystal layer oriented in splay alignment provided between a pair of substrates with electrodes, each substrate having an orientation film, the method comprising the steps of: forming an orientation film comprising thin film components each having a photosensitive group on at least one of the substrates: carrying out an orientation treatment that utilizes a photoalignment method on the orientation film where irradiation conditions are varied to form regions having a larger anchoring energy with respect to liquid crystal molecules than do other regions; adhering the substrates together; and injecting a liquid crystal between the substrates to form a liquid crystal layer; whereby transition seed generation regions for accelerating a transition from splay alignment to bend alignment with application of a voltage to the electrodes are provided in the liquid crystal layer, the transition seed generation regions being formed by the regions of the orientation film having a large anchoring energy.

This production method also makes it possible to produce a liquid crystal display element similar to that produced by the production method of invention group 2-3.

It is possible that the step of carrying out an orientation treatment be such that polarized light having a greater irradiation intensity than polarized light applied to the other regions is applied to specified regions to form the regions of the orientation film having a large anchoring energy with respect to liquid crystal molecules.

It is possible that the step of carrying out an orientation treatment be such that polarized light having a smaller angle of incidence than polarized light applied to the other regions is applied to specified regions to form the regions of the orientation film having a large anchoring energy with respect to liquid crystal molecules in the specified regions.

It is possible that the step of carrying out an orientation treatment be such that a silane-based compound having photosensitive groups is contacted to the substrate surface under a dry atmosphere, whereby the silane-based compound is chemisorbed to the substrate surface.

It is possible to carry out the steps of removing unadsorbed silane-based compound by washing surfaces of the substrates having the orientation films formed thereon using a washing solution immediately after the step of forming orientation films; and temporarily aligning molecules of silane-based compound adsorbed to the substrate surfaces by standing the washed substrates in a fixed direction to drain and dry washing solution remaining on the substrate surfaces; so that the draining direction is made parallel to the planes of polarization of the step of carrying out an orientation treatment by photoalignment with polarized light.

(5) The Second Invention Group

In order to achieve the objects described above, the fifth invention group provides a liquid crystal display element in which regions of orientation films provided on opposed substrates induced different pretilt angles in the liquid crystal molecules in correspondence with orientation anisotropies of the films and have different anchoring energies. It also provides a method of producing a pixel.

In order to achieve the objects described above, the present invention provides a liquid crystal display element comprising a liquid crystal sandwiched between two opposed substrates each having an orientation film, wherein the two orientation films comprise molecules having a photosensitive group and have different orientation anisotropies from one another, the molecules having been irradiated with polarized light, and wherein a pretilt angle of liquid crystal molecules corresponding to the orientation anisotropy of the orientation film provided on an inner side of one of the opposed substrates differs from a pretilt angle of liquid crystal molecules corresponding to the orientation anisotropy of the orientation film provided on an inner side of the other opposed substrate and an anchoring energy, with respect to liquid crystal molecules, of the orientation film on the inner side of the one of the opposed substrates differs from an anchoring energy, with respect to liquid crystal molecules, of the orientation film provided on the inner side of the other of the opposed substrates.

By making different the conditions of polarized light irradiation, the pretilt angle induced on liquid crystal molecules in correspondence with orientation anisotropy and the anchoring energy with respect to liquid crystal molecules of each orientation film can be made different. According to this construction of the present invention, it is possible to make different the pretilt angle induced on liquid crystal molecules in correspondence with orientation anisotropy and the anchoring energy with respect to liquid crystal molecules of each orientation film by making different the conditions of polarized light irradiation.

It is also possible that the molecules comprise a photosensitive group, the molecules having been irradiated with polarized light of different irradiation intensity.

The molecules may comprise a photosensitive group, the molecules having been irradiated with polarized light applied at different angles to the substrates.

The present invention provides a method of producing a liquid crystal display element comprising the steps of: forming thin films on a pair of substrates using molecules having at least a photosensitive group; carrying out an orientation treatment by irradiating one of the thin films and the other of the thin films with polarized light under different irradiation conditions so that the orientation anisotropy of the one thin film and that of the other thin film are made different; forming a sealing material on either of the substrates in a frame shape excluding a portion for a liquid crystal injection port, adhering the substrates together; and injecting a liquid crystal between the substrates through the liquid crystal injection port to form a liquid crystal layer; whereby regions are formed in which a pretilt angle of liquid crystal molecules corresponding to the orientation anisotropy of an orientation film provided on an inner side of one of the opposed substrates differs from a pretilt angle of liquid crystal molecules corresponding to the orientation anisotropy of an orientation film provided on an inner side of the other opposed substrate and an anchoring energy region, with respect to liquid crystal molecules of the orientation film on the inner side of the one of the opposed substrates differs from an anchoring energy region, with respect to liquid crystal molecules, of the orientation film provided on the inner side of the other of the opposed substrates.

Such a construction makes it possible to produce a liquid crystal display element in which each of the orientation films induces a pretilt angle in liquid crystal molecules corresponding to the orientation anisotropy of the orientation film and has an anchoring energy with respect to liquid crystal molecules.

It is possible that the irradiation be such that the one of the thin films and the other of the thin films are irradiated with polarized light of different irradiation intensity.

The irradiation may be such that the one of the thin films and the other of the thin films are irradiated with polarized light having parallel planes of polarization and different angles of incidence with respect to surfaces of the substrates.

One of the opposed substrates may have opposed electrodes on a surface thereof, and the orientation treatment may be carried out under orientation conditions such that the pretilt angle of liquid crystal molecules corresponding to the orientation anisotropy of the orientation film provided on the inner side of the one opposed substrate is made greater than the pretilt angle of liquid crystal molecules corresponding to the orientation anisotropy of the orientation film provided on the inner side of the other opposed substrate and the anchoring energy, with respect to liquid crystal molecules, of the orientation film provided on the inner side of the one opposed substrate is made greater than the anchoring energy, with respect to liquid crystal molecules, of the orientation film provided on the inner side of the other opposed substrate.

(6) The Sixth Invention Group

In order to achieve the objects described above, the sixth invention group provides a liquid crystal display element in which regions of an orientation film provided on the same substrate induce different pretilt angles in the liquid crystal molecules and have different anchoring energies with respect to liquid crystal molecules, such as to correspond to orientation anisotropies of the film. It also provides a method of producing such a liquid crystal display element.

The present invention provides a liquid crystal display element comprising a liquid crystal sandwiched between two opposed substrates each having an orientation film, wherein at least one of the orientation films comprises molecules having a photosensitive group and has at least two regions with different orientation anisotropies, the molecules having been irradiated with polarized light, and wherein pretilt angles of liquid crystal molecules and anchoring energies, with respect to liquid crystal molecules, of the orientation film are different such as to correspond to the orientation anisotropies of the regions of the orientation film.

Such a construction makes in possible to produce a liquid crystal display element in which each of the orientation films induces a pretilt angle in liquid crystal molecules and has an anchoring energy with respect to liquid crystal molecules such as to correspond to orientation anisotropies of the orientation film.

It is possible, for example, that the irradiation of polarized light be such that the one of the thin films and the other of the thin films are irradiated with polarized light of different irradiation intensity.

The orientation film having the at least two regions with different orientation anisotropies may be provided on an inner side of each of the opposed substrates such that regions of the orientation films having a same orientation anisotropy being opposed to one another.

The present invention provides a method of producing a liquid crystal display element comprising the steps of: forming thin films on a pair of substrates using molecules having at least a photosensitive group; carrying out an orientation treatment by irradiating different areas of at least one of the thin films for polarized light under different irradiation conditions to form at least two regions having different orientation anisotropies on the at least one of the thin films; forming a sealing material on either of the substrates in a frame shape excluding a portion for a liquid crystal injection port; adhering the substrates together; and injecting a liquid crystal between the substrates through the liquid crystal injection port to form a liquid crystal layer; whereby regions are formed in which a pretilt angle of liquid crystal molecules corresponding to the orientation anisotropy of an orientation film provided on an inner side of at least one of the opposed substrates differs from a pretilt angle of liquid crystal molecules corresponding to the orientation anisotropy of an orientation film provided on an inner side of the other opposed substrate and an anchoring energy region, with respect to liquid crystal molecules, of the orientation film on the inner side of the one of the opposed substrates differs from an anchoring energy region, with respect to liquid crystal molecules, of the orientation film provided on the inner side of the other of the opposed substrates.

The irradiation may be such that different areas of at least one of the thin films are irradiated with polarized light of different irradiation intensity.

The irradiation may be such that different areas of at least one of the thin films are irradiated with polarized light having parallel planes of polarization and different angles of incidence with respect to surfaces of the substrates.

(7) The Seventh Invention Group

In order to achieve the objects described above, the seventh invention group provides a liquid crystal display element in which liquid crystal is not injected into portions that do not contribute to image display. It also provides a method of producing such a liquid crystal display element.

In order to achieve the second object, the present invention provides a liquid crystal display element comprising a liquid crystal sandwiched between two opposed substrates each having an orientation film, wherein at least one of the orientation films comprises molecules having a photosensitive group and has at least two regions with different orientation anisotropies, the molecules having been irradiated with polarized light, and wherein contact angles between the liquid crystal and the orientation film are different such as to correspond to the orientation anisotropies of the regions of the orientation film.

By varying contact angle between the liquid crystal and the orientation film, portions into which it is easy to inject liquid crystal and portions into which it is difficult to inject liquid crystal are formed.

Polarized light of differing irradiation intensities may be applied.

Polarized light may be applied at different angles to the substrates.

The contact angle in a display region may be larger than the contact angle in a portion other than the display region. In such a way, liquid crystal is not injected into the portion other than the display region.

The contact angle in the portion other than the display region should be 40° or larger from a surface of the orientation film, as such a contact angle is sufficient from preventing the injection of liquid crystal.

The liquid crystal should not be filled into the portion other than the display portion.

(8) The Eighth Invention Group

In order to achieve the objects described above, the eighth invention group provides an optically anisotropic film, for use in a liquid crystal display element having more than one liquid crystal orientation, which contributes to the realization of a liquid crystal display element that has no coloration and excellent display characteristics. It also provides a method of producing such an optically anisotropic film.

In order to realize the objects described above, the present invention provides an optically anisotropic film formed of a liquid crystal polymer that is optically positive and uniaxial and of a polymerizable polymer, the film comprising at least two regions in which different orientation structures are fixed, the orientation structures having been formed when the liquid crystal polymer was in a liquid crystal state.

With such a construction, because there are at least two regions in which different orientation structures are fixed, an optically anisotropic film is provided having liquid crystal polymer with an optimum pretilt, this pretilt corresponding to the pretilt of each region of the liquid crystal display element having more than one liquid crystal orientation.

The liquid crystal polymer may have a twist angle.

It is preferable that the liquid crystal polymer be a cholesteric liquid crystal polymer or a discotic liquid crystal polymer.

The present invention provides a method of producing an optically anisotropic film, comprising the steps of: forming thin films on a pair of substrates using molecules having at least a photosensitive group; carrying out an orientation treatment by irradiating different areas of at least one of the thin films with polarized light under different irradiation conditions to form at least two regions having different orientation anisotropies in the at least one of the thin films; adhering the substrates together; injecting a polymerizable polymer and a liquid crystal polymer between the substrates through the injection port to form a layer of the polymerizable polymer and the liquid crystal polymer; and polymerizing the polymerizable polymer and the liquid crystal polymer.

Because the liquid crystal polymer is oriented by the orientation anisotropy of the orientation film, an optically anisotropic film can be produced that corresponds to the pretilt of the liquid crystal in a liquid crystal display element having more than one liquid crystal orientation.

The irradiation of polarized light may be such that different areas of at least one of the thin films are irradiated with polarized light of different irradiation intensity.

Different areas of at least one of the thin films may be irradiated with polarized light having parallel planes of polarization and at least two different angles of incidence with respect to surfaces of the substrates.

Different areas of at least one of the thin films may be irradiated with polarized light having parallel planes of polarization and at least different incidence directions with respect to surfaces of the substrates.

In opposing regions of opposed orientation films, groups of molecules making up the thin films may be oriented in different directions such that a twist angle is formed.

(9) The Ninth Invention Group

In order to achieve the objects described above, the ninth invention group provides a liquid crystal display element with improved display characteristics.

In order to realized the objects, the present invention provides a liquid crystal display element comprising a liquid crystal layer sandwiched between two opposed substrates each having an orientation film, wherein the display element comprises an optically anisotropic film formed of a liquid crystal polymer that is optically positive and uniaxial and of a polymerizable polymer, the optically anisotropic film having at least two regions in which different orientation structures are fixed, the orientation structures having been formed when the liquid crystal polymer was in a liquid crystal state.

This construction makes it possible to provide a liquid crystal display element with improved display characteristics by employing an optically anisotropic film that corresponds to regions having more than one liquid crystal orientation.

It is possible that each pixel of the liquid crystal display element have a plurality of regions in which liquid crystal molecules are oriented in different orientation states.

It is possible that the orientation state of the liquid crystal molecules be divided into a plurality of regions by use of orientation films having more than one liquid crystal orientation.

The orientation structure of the optically anisotropic film may vary in correspondence with regions in which the liquid crystal molecules are oriented in different orientation states.

It is possible that the pretilt direction of liquid crystal molecules in each of the regions and the direction of the director of molecules of the liquid crystal polymer formed with the film plane differ by 180°.

A plurality of regions, in each of the regions, in which liquid crystal molecules have a different twist, and a plurality of regions, in the optically anisotropic film, in which the liquid crystal polymer has a different twist may be matched.

The twist of liquid crystal molecules in each of the regions and the twist of the liquid crystal polymer in the optically anisotropic film may be the reverse of one another.

The optically anisotropic film may be provided in a liquid crystal cell.

BRIEF DESCRIPTION OF THE DRAWINGS

FIGS. 2(a)–2(c) are views schematically showing the main production steps of a method of producing a liquid crystal display element in accordance with an example of the present invention.

FIGS. 9(a)–9(b) are schematic cross sectional views showing the orientation state of liquid crystal molecules in first regions and a second region of the liquid crystal display element mentioned above: FIG. 7(a) shows the state of liquid crystal molecules when no voltage is being applied, and FIG. 7(b) shows the state of liquid crystal molecules when voltage is being applied.

BEST MODE FOR CARRYING OUT THE INVENTION

Examples of the First Invention Group

Figure 1A:
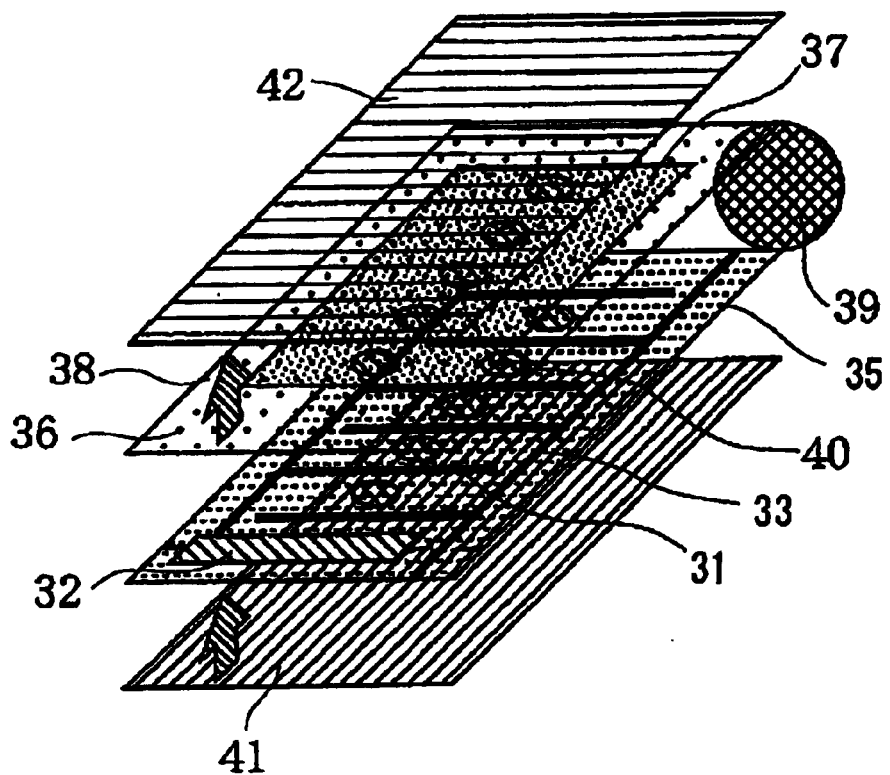
FIGS. 1(a)–1(b) are schematic views for illustrating an IPS mode liquid crystal display element in accordance with the present invention.

In the following, the first invention group of the present invention is described in detail Embodiment 1

The present embodiment in accordance with the first invention group of the present invention provides a liquid crystal display element having a liquid crystal sandwiched between two opposed substrates each having an orientation film, wherein the two orientation films are composed of molecules having a photosensitive group and have different orientation anisotropies from one another because the molecules have been irradiated with polarized light. The pretilt angle of liquid crystal molecules corresponding to the orientation anisotropy of the orientation film provided on the inner side of one of the opposed substrates differs from the pretilt angle of liquid crystal molecules corresponding to the orientation anisotropy of the orientation film provided on the inner side of the other opposed substrate.

The orientation films are composed of a compound having photosensitive groups. When photosensitive groups are contained, it is made possible, by applying polarized light, to polymerize and fix the photosensitive groups in a desired direction, thereby imparting orientation anisotropy to the orientation film.

Examples of compounds having photosensitive groups include polymers, such as polyvinyl alcohol, ethylene-vinyl alcohol copolymer, and polyimide-based resin, and their precursors. It is necessary that these polymers and their precursors have photosensitive groups such as cinnamoyl groups or chalconyl groups to serve as substitution groups.

It is also possible to use a silane-based compound having photosensitive groups for the compound of the orientation film. This is desirable because such silane-based compounds having photosensitive groups bond and fix to a substrate surface.

Examples of silane-based compounds usable in the present embodiment include the compounds listed below.

(1) $SiY_pCl_{3-p}$ (2) $CH_3(CH_2)_rSiY_qCl_{3-q}$ (3) $CH_3(CH_2)_3O(CH_2)_tSiY_qCl_{3-q}$ (4) $CH_3(CH2)_u$—$Si(CH_3)_2(CH_2)_vSiY_qCl_{3-q}$ (5) $CFCOO_3(CH_2)_wSiY_qCl_{3-q}$

Note that p is an integer of 0–3, q is an integer of 0–2, r is an integer of 1–25, s is an integer of 0–12, t is an integer of 1–20, u is an integer of 0–12, v is an integer of 1–20, and w is an integer of 1–25. In addition, Y is one of hydrogen, an alkyl group, an alkoxyl group, a fluorine-containing alkyl group, and a fluorine-containing alkoxyl group.

It is also possible to use a trichlorosilane-based compound for the silane-based compound. Specifically, the compounds (6) to (14) shown below can be used.

(6) $CF_3(CH_2)_9SiCl_3$ (7) $CH_3(CH_2)_9OSiCl_3$ (8) $CH_3(CH_2)_9Si(CH_2)_2(CH_2)_{10}SiCl_3$ (9) $CH_3COO(CH_2)_{15}SiCl_3$

10) $CF_3(CF_2)_7$—$(CH_2)_2$—$SiCl_3$

(11) $CF_3(CF_2)_7$—$C_6H_4$—$SiCl_3$

(12) $C_6H_5$—$CH$=$CH$—$CO$—$O$—$(CH_2)_6$—$O$—$SiCl_3$

(13) $C_6H_5$—$CO$—$CH$=$CH$—$C_6H_4O$—$(CH_2)_6$—$O$—$SiCl_3$

(14) $C_6H_5$—$CH$=$CH$—$CO$—$C_6H_4O$—$(CH_2)_6$—$O$—$SiCl_3$

Of the compounds listed above, the compound represented by expression (12) has a cinnamoyl group for the photosensitive group, and the compounds represented by the expressions (13) and (14) have a chalconyl group for the photosensitive group.

Instead of the chlorosilane-based compounds, it is also possible to use an isocyanate-based compound having an isocyanate group or an alkoxy group in place of the chlorosilyl group. Specifically, examples include the compounds represented by the expressions (15) and (16) below in which the chlorosilane group in the chlorosilane of expression (6) is substituted with an isocyanate group or an alkoxy group.

(15) $CH_3(CH_2)_9Si(OC_2H_5)_3$

(16) $CH_3(CH_2)_9Si(NCO)_3$

By using an isocyanate-based compound or an alkoxy-based compound, the generation of hydrochloric acid is prevented when either of the compounds is contacted to a substrate and chemisorption is brought about. For this reason, TFTs or the like provided on the substrate are not damaged, and there is the additional advantage that these compounds are easy to use.

Examples for an organic solvent that dissolves silane-based compounds include a hydrocarbon-based solvent that does not contain water, a fluorocarbon-based solvent, and a silicone-based solvent. Examples usable for a petroleum-based solvent include petroleum naphtha, solvent naphtha, petroleum ether, petroleum benzene, isoparaffin, normal paraffin, decalin, industrial gasoline, kerosene, ligroin, dimethyl silicone, phenyl silicone, alkyl modified silicone, polyester silicone, and the like. For a fluorocarbon-based solvent, a flon-based solvent, Fluorinert (tradename, available from 3M), Afluid (tradename, available from Asahi Glass Co., Ltd), or the like can be used. These solvents may be used individually or by mixing two or more solvents together supposing the solvents are compatible. In particular, silicone serves to prevent direct contact of a chlorosilane-based compound with moisture by solvation of the chlorosilane-based compound. Thus, by employing a solvent that is composed of a chlorosilane-based compound and silicone, adverse effects caused by moisture in the atmosphere when the solvent is contacted to a substrate layer are prevented, making it possible to chemisorb the chlorosilane-based compound to the exposed OH groups on the substrate layer.

On a substrate, in addition to pixel electrodes and counter electrodes, wiring composed of an ITO film or an Al film, TFTs, and a protective film composed of an $SiO_2$ film or $SiN_x$ are provided in advance. On the counter substrate, a color filter composed of, for example, an acrylic-based or silicone-based polymer film is provided. Spacers composed of an acrylic-based or silicone-based polymer material are integrally formed with either the substrate or the counter substrate so as to be provided thereon. Of all the members described above, because the distribution density of OH groups, which serve as adsorption sites, is high on the surfaces of the $SiO_2$ or $SiN_x$ film, even more of the silane-based compound molecules can be adsorbed. Thus, it is made possible to form orientation films that are excellent in terms of orientation characteristics. By contrast, the distribution density of OH groups on the wiring and the electrodes, which are composed of an ITO film or an Al film, the TFTs, and the like is low. As for the color filter and the spacers, OH groups are almost nonexistent. Thus, in order to adsorb a silane-based compound to the surfaces of these members also and to form an orientation film having high quality film characteristics, it is necessary to carry out a hydrophilization treatment to increase the number of adsorption sites. In the present embodiment, various known methods may be employed for the hydrophilization treatment. Specifically, examples include a method wherein an $SiO_2$ or $SiN_x$ film is formed on regions to be made hydrophilic, a $UV$-$O_3$ treatment wherein ultraviolet is applied under an ozone atmosphere, or the like.

A method of producing a liquid crystal display element in accordance with the present invention is now described. In this example, for the orientation films, monomolecular thin films composed of chemisorbed groups of silane-based compound molecules are described.

First, pairs of opposed electrodes are formed on a substrate by a known method. A silane-based compound (chemisorption substance) having at least a photosensitive group is then dissolved in a nonaqueous organic solvent and a chemisorption solution is prepared. This chemisorption substance is then contacted to the substrates and the molecules of the chemisorption substance in the chemisorption solution are chemisorbed to the substrate surfaces.

For example, when a compound provided with a photosensitive group and a trichlorosilane group, specifically $C_6H_5$—$CH$=$CH$—$CO$—$C_6H_4O$—$(CH_2)_6$—$O$—$SiCl_3$, is used for the silane-based compound, the chemisorption reaction represented by chemical reaction formula (1) occurs. In short, the chlorosilyl groups in the compound and OH groups on the substrate surfaces undergo a dehydrochlorination reaction, whereby the compound is chemisorbed to the substrate surfaces.

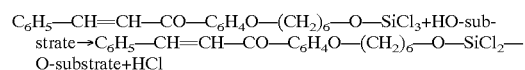
$C_6H_5$—$CH$=$CH$—$CO$—$C_6H_4O$—$(CH_2)_6$—$O$—$SiCl_3$+HO-substrate→$C_6H_5$—$CH$=$CH$—$CO$—$C_6H_4O$—$(CH_2)_6$—$O$—$SiCl_2$—O-substrate+HCl Because the silane-based compound is highly reactive with water, the silane-based compound is deactivated when contained in a chemisorption solution having a lot of moisture. Therefore, in order that the chemisorption reaction be made to progress smoothly, it is desirable to use a nonaqueous solvent that does not contain active hydrogen groups such as OH groups and also to carry out the contacting of the solution with the substrate surfaces in a dry atmosphere. In addition, a portion of the silane-based compound may remain in an undissolved state. A chemisorption solution in a supersaturated state is an example of such a solution.

When polymer orientation films are used for the orientation films, a variety of known methods may be employed for the method of forming the films. Specifically, a polymer orientation film can be formed by applying, for example, an orientation material containing a polymer precursor or the like having a photosensitive group, to a substrate surface and subsequently, drying and baking the substrate.

After the step of forming the orientation films, a step of washing the substrates is carried out to remove unadsorbed silane-based compound on the substrates and form monomolecular orientation films. Examples of washing methods that may be employed in this step include an immersion method, a steam washing method, and the like. The steam washing method is particularly effective in that excess unadsorbed silane-based compound on the front surface of the substrate can be forcibly removed by the penetrating power of the steam. It should be noted that when a chlorosilane-based compound, a variety of silane-based compound, is used for the chemisorption substance, it is desirable to use chloroform or N-methyl-2-pyrrolidinone for the washing solution. This is because chloroform is excellent for removing chlorosilane polymer that is formed by the reaction between chlorosilane-based compound and water.

After the step of washing, the substrates are then lifted from the washing container and left to drain and dry in a fixed upright position. Thus, the washing solution is drained only in the direction of gravity, making it possible to temporarily orient the chemisorbed molecules making up the thin films in the draining and drying direction. In particular, washing solutions having a boiling point of 200° C. or less as desirable as these solutions have excellent drying properties following draining. As another method of draining and orienting applicable to the present embodiment, gas is sprayed on the substrate surfaces to bring about the draining of the washing liquid. With this method, the washing solution can be drained in a short period and only in the direction in which the gas is sprayed. In particular, use of a washing solution having a boiling point of 150° C. or higher is effective because the washing solution can be drained by the spraying of the gas without evaporation.

An orientation treatment (photoalignment with polarized light step) is carried out on the orientation films formed on the substrates by a photoalignment method. Unlike the conventional rubbing treatment, this photoalignment method eliminates the need for masking in which a protective film is used, making it possible to simplify the production process and prevent contamination and the like of the orientation films by protective films. There is also no generation of dust and the like as there is when rubbing is carried out.

The orientation films are thin films composed of chemisorbed groups of silane-based compound molecules and have constructions such that most of the thin film component portion is exposed in an orderly manner on the surfaces. For these reasons, the films are sensitive to polarized light and can be provided with orientation anisotropy by low intensity polarized light irradiation. In addition, because the orientation films are ultrathin films, occurrence of driving voltage loss, sticking, and the like is reduced, making it possible to realize an improvement in display characteristics.

Figure 1B:
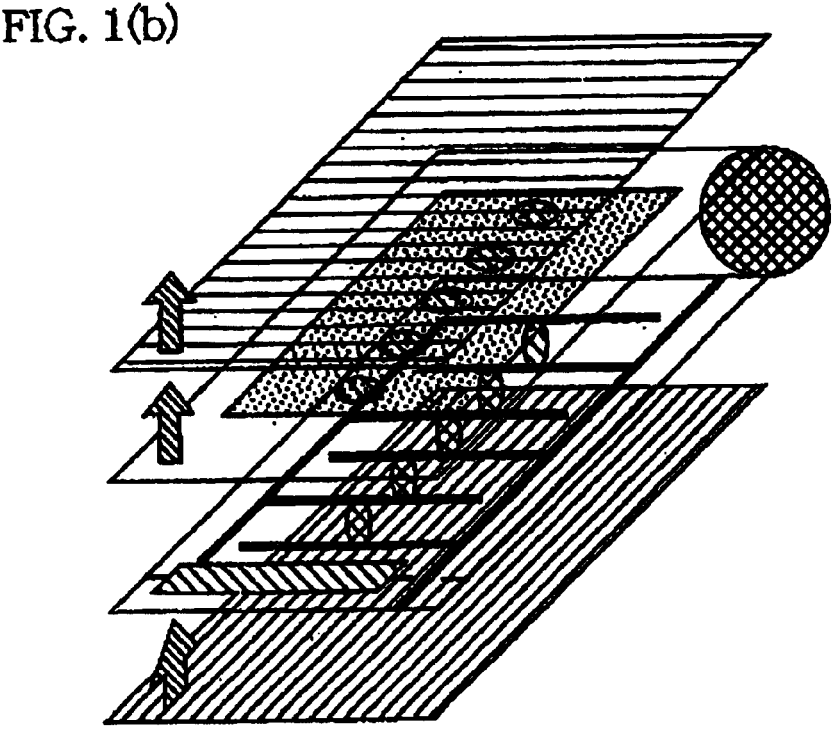

Specifically, photoalignment is brought about by the following method This method is described with reference to FIG. 1. First, one of the substrates of a pair of opposed substrates, a substrate 1, is irradiated with polarized ultraviolet light having a wavelength distribution in the neighborhood of 300 nm to 400 nm. The polarized ultraviolet light is applied in a direction that forms an angle of θ1 with the substrate along the draining direction.

The other substrate, a substrate 2, is then irradiated wit polarized ultraviolet light. The polarized ultraviolet light is applied in a direction that forms and angle of θ2 with the substrate along the draining direction.

The planes of polarization of the polarized ultraviolet light line up with the draining direction from the draining step (in other words, with the thin film component portion). The irradiation intensity of the polarized ultraviolet light should be within the range of 50 mJ/cm$^2$ to 3000 mJ/cm$^2$ (wavelength: 365 nm). Specifically, when the pretilt angles of the liquid crystal molecules are controlled by the irradiation intensity of polarized ultraviolet light, it is necessary that irradiation intensity be set such that the irradiation intensity of the former polarized ultraviolet light be smaller than the irradiation intensity of the latter polarized ultraviolet light. The directions in which the polarized ultraviolet light is applied are set so as to form, along the draining direction, and angle of θ1 and θ2 within the range of 0° to 90° and more preferably within the range of 45° to 90°. Specifically, when the pretilt angles of the liquid crystal molecules are controlled by the irradiation intensity of polarized ultraviolet light, it is necessary to set θ1 formed by the polarized ultraviolet light so as to be greater than θ2 formed by the polarized ultraviolet light.

In this way, by carrying out photoalignment treatment with polarized light, photosensitive groups in the thin film component molecules of the orientation films can be selectively photopolymerized, making it possible to induce crosslinking of the thin film components on the substrate surfaces in a direction parallel to the polarization direction. Furthermore, orientation substrates having different pretilt angles may be formed on each of the substrates of the pair of opposed substrates. In addition, by appropriately setting the irradiation intensity of the polarized ultraviolet light and the direction in which the polarized ultraviolet light is applied, orientation films capable of controlling the orientation of the liquid crystal molecules at a specified pretilt angle can be consistently reproduced.

The pretilt angle of light crystal molecules associated with one of the substrates should be approximately 1° to 10° and the pretilt angle of liquid crystal molecules associated with the order of the substrates approximately 1° to 9°.

The pair of substrates are then positioned at a specified distance with the film-formed sides on the inside, and the perimeters of the substrates are adhered and fixed together to fabricate an empty cell. A liquid crystal cell is then fabricated by injecting a liquid crystal into the empty cell, and subsequently, a liquid crystal display element of the present invention is fabricated by sandwiching the liquid crystal cell between a pair of polarizers.

As described above, in the method of producing a liquid crystal display element according to the present embodiment, the carrying out of an orientation treatment by the photoalignment method eliminates the need to form a photoresist (protective film) by photolithography as was necessary in carrying out of the conventional rubbing method. As a result, along with realizing a simplification in the production process, the formation and exfoliation of a photoresist becomes unnecessary, making it possible to prevent degradation of the surface of the orientation films. Furthermore, the generation of dust, which is a problem with rubbing treatment, does not arise with the photoalignment method, making it possible to prevent contamination of the orientation films.

In addition, with the photoalignment method, the fact that the irradiation intensity of polarized ultraviolet light, the polarization direction, and the direction of applied light can be controlled makes it possible to carry out an orientation treatment on the orientation films such that the orientation of the liquid crystal molecules is fixed in a desired direction and at a desired pretilt angle. In comparisons with rubbing treatment, this orientation treatment can be reproduced very consistently, making it excellent for volume production.

EXAMPLE 1

First, the construction of an IPS mode liquid crystal display element is described. As is shown in FIG. 1, a first substrate 35 has a first electrode group 31 arranged in a comb-shape, a TFT group 32 for driving this electrode group, a second electrode group 33 arranged in a comb-shape so as to be opposed to the first electrode group 31, wiring for connecting these members, and the like, a second substrate 38 has a color filter group 37 arranged so as to be opposed to the first substrate 35, and liquid crystal orientation films 36 are on each of the substrates. The orientation direction of the liquid crystal film 36 of both the first and the second substrates is induced parallel to the comb-shaped electrodes. The first and second substrates 35 and 38 are fixed such that beads are dispersed in a central portion of the electrodes and the color filter 37, and though not shown in FIG. 1, an adhesive containing spacers 39 is applied to the edge, and the gap set at approximately 3 $\mu$m. A homogeneous liquid crystal 40 is injected in the space between the first substrate and the second substrate, and first and second polarizers are fixed on the outer side of the first and the second substrates so as to be in a crossed nicols relation (so that the directions of polarized light that can pass through are perpendicular to one another).

The principle behind driving an IPS mode liquid crystal display element is now described. When driving is in an OFF state (FIG. 1($a$)), the homogeneous liquid crystal 40 is oriented parallel to the comb-shaped electrodes, and polarized light, having been transmitted through the first polarizer 41, passes through the liquid crystal layer without its direction being changed in the liquid crystal layer. As a result the polarized light cannot pass through the second polarizer 42, which is in a crossed nicols relation with the first polarizer 41. Thus display is black (normally black). However when driving is switched to an ON state, liquid crystal in the vicinity of the first substrate rotates toward a direction perpendicular to that of the comb-shaped electrodes as the driving voltage is increased until the liquid crystal in the vicinity of the first substrate is oriented perpendicular to the comb-shaped electrodes. Liquid crystal above the substrate orients by application of an electric field so as to have a specified tilt. By contrast, liquid crystal in the vicinity of the second substrate remains oriented parallel to the comb-shaped electrodes. Thus, a twist is created in the liquid crystal layer, eventually becoming a twist of 90°. Because its polarization direction is twisted by the optical rotation of the liquid crystal in the liquid crystal layer, polarized light, having passed through the polarizer 1, passes through the liquid crystal layer, until finally, the light has completely passed through the liquid crystal layer, the polarization direction having been twisted by 90°. As a result, the polarized light can now pass through the second polarizer, which is in a crossed nicols relation with the first polarizer, and the display changes from black to white. However, when the driving voltage is increased more than this, the liquid crystal in the vicinity of the second substrate orients perpendicular to the comb-shaped electrodes and the twist in the liquid crystal layer is lost, whereby the display becomes black once again.

With the construction of the present embodiment, the liquid crystal molecules on the substrate are oriented at a relatively large pretilt angle, and therefore, when driving is switched to an ON state, orientation is realized quickly and response speed improved.

First, for the formation of orientation films, a solution for the fabrication of orientation films are prepared. Specifically, $C_6H_5$—CH=CH—CO—O—$(CH_2)_6$—O—$SiCl_3$ was mixed and dissolved in hexamethyldisiloxane under a dry atmosphere to form a $10^{-3}$ mol/L solution.

As is shown in FIG. 2($a$), a substrate for IPS mode was provided and the solution described above applied to the substrate surface under a dry atmosphere (relative humidity of 5% or less). A printing press was used in the application. The thickness of the applied film was made to be approximately 1 $\mu$m. After the hexamethyldisiloxane contained in the applied film was evaporated, the substrate was then baked for a specified length of time of form an orientation film (see FIG. 2($b$)).

The substrate having an orientation film formed thereon was then immersed in chloroform, a nonaqueous solvent, and the substrate was washed (washing step, see FIG. 2($c$)). In a fixed upright position, the substrate was then lifted from the chloroform and the chloroform was drained (draining orientation step, see FIG. 2($d$)). The draining direction was made to be parallel to the direction of the long side of the comb-shaped electrode portions provided on the substrate. Thus, molecules making up the orientation film were inclined in the draining direction, the direction opposite to the direction of lifting, and oriented accordingly. The same process was carried out on the other substrate.

After the draining orientation step, the substrate having the comb-shaped electrodes was irradiated with polarized ultraviolet light. The polarization direction of the ultraviolet light was lined up with the draining direction, but the direction of the applied light was set so as to form a 45° angle with the substrate surface along the draining direction. Irradiation intensity was set at 400 mJ/cm$^2$.

The other substrate was irradiated with polarized ultraviolet light under the following conditions. The polarization direction of the ultraviolet light was lined up with the draining direction, but the direction of applied light was set so as to be perpendicular to the substrate surface along the draining direction. Irradiation intensity was the same as the above.

Spacers were then dispersed on one of the substrates and sealing material was applied on the perimeter of one of the substrates so that the application formation was a frame shape. The substrate and the counter substrate were then adhered together. In this process, the orientation treatment direction of the orientation film provided in one substrate and the orientation treatment direction of the orientation film provided in the counter substrate were positioned so as to be parallel to one another.

A liquid crystal material was then injected between the substrate and the counter substrate to form a liquid crystal display element A of the present invention.

COMPARATIVE EXAMPLE 1

In the present comparative example 1, the irradiation of both the substrate and the counter substrate with polarized ultraviolet light was such that the polarization direction of the ultraviolet light was lined up with the draining direction, and except of the fact that the direction of applied light was set so to be perpendicular to the substrate surface along the draining direction, a liquid crystal display element B for comparison was fabricated in the same manner as the element of example 1.

Conditions of Film Fabrication and Display Dharacteristics

Pretilt angle and response speed of the liquid crystal during operation were measured in the liquid crystal display element A of the present invention and in the liquid crystal display element B for comparison, respectively. The results are shown in Table 1. Note that response speed was obtained by measuring the response time for a change in transmissivity from 10% to 90%.

TABLE 1

|  | Liquid crystal display element | |
| --- | --- | --- |
|  | A | B |
| Pretilt angle at substrate | 5° | 3° |
| Pretilt angle at counter substrate | 3° | 3° |
| Response speed (ms) | 30 | 40 |

As is understood from Table 1, in the liquid crystal display element A of the present invention, the pretilt angle of liquid crystal molecules of the substrate having the comb-shaped electrodes was approximately 5°. On the other hand, the pretilt angle of liquid crystal molecules of the substrate having the counter electrode was approximately 3°. The response speed of was approximately 30 ms. By contrast, in the liquid crystal display element B for comparison, the pretilt angle of liquid crystal molecules of the substrate having the comb-shaped electrodes and the pretilt angles of liquid crystal molecules of the substrate having the counter electrode were approximately 3°. The response speed was approximately 40 ms. Thus, it is shown that the liquid crystal display element A of the present invention is superior to the liquid crystal display element B for comparison in terms of response speed.

Examples of the Second Invention Group

Embodiments of the second invention group are basically like that of embodiment 1. However, in the embodiments of the second invention group, an orientation treatment step is such that at least two regions having differing orientation anisotrophies are formed on at least one of the thin films. In other words, in embodiment 1 it was suitable to carry out an orientation treatment for each substrate, but in the embodiments of the second invention group, a photomask is used to form at least two regions having differing orientation anisotrophies on the same substrate.

Embodiment 2-1

In the following, the present embodiment is described with reference to FIGS. 3–6. Parts not essential to the description have been omitted, and for the sake of convenience in the description, some parts have been enlarged, reduced, or the like.

Figure 3:
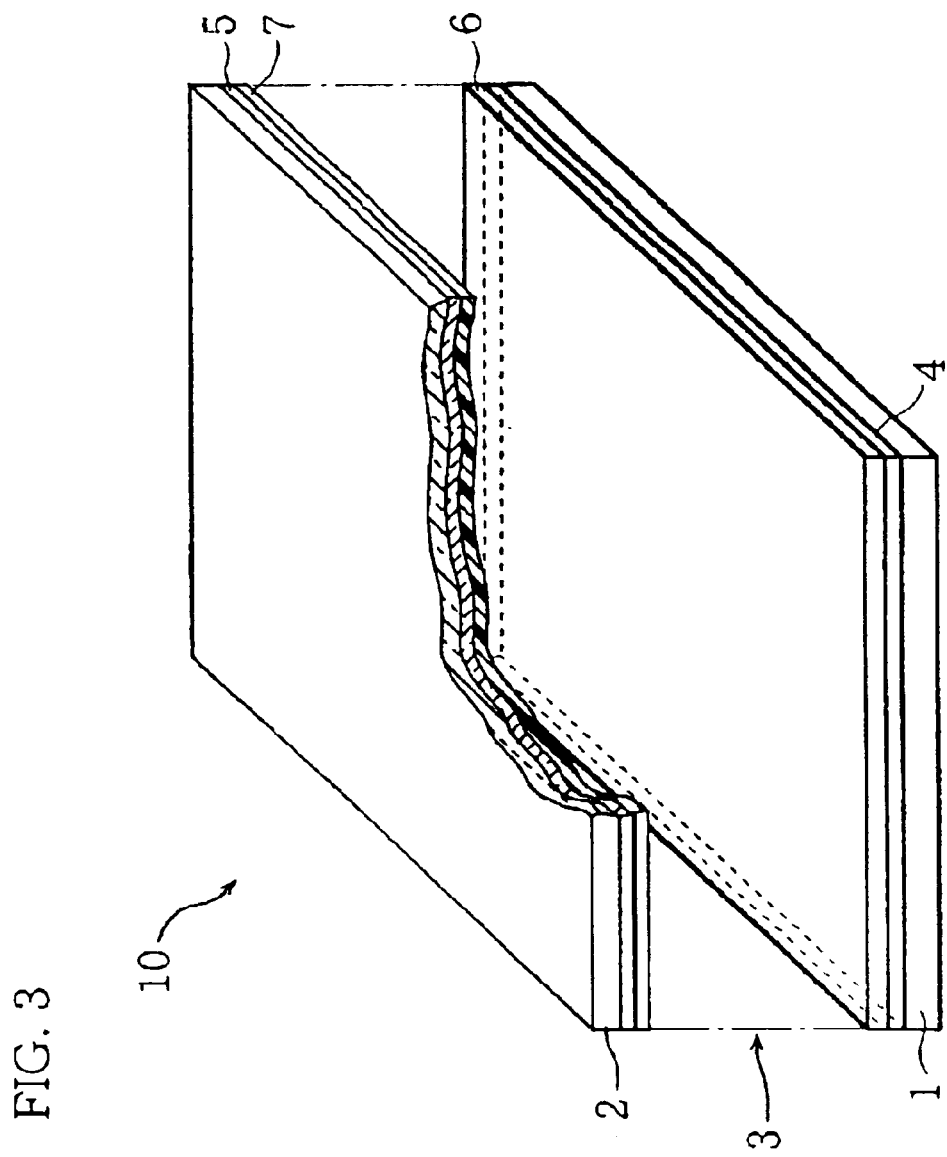
FIG. 3 is a perspective view schematically showing an TN mode liquid crystal display element in accordance with an embodiment of the present invention.
Figure 4:
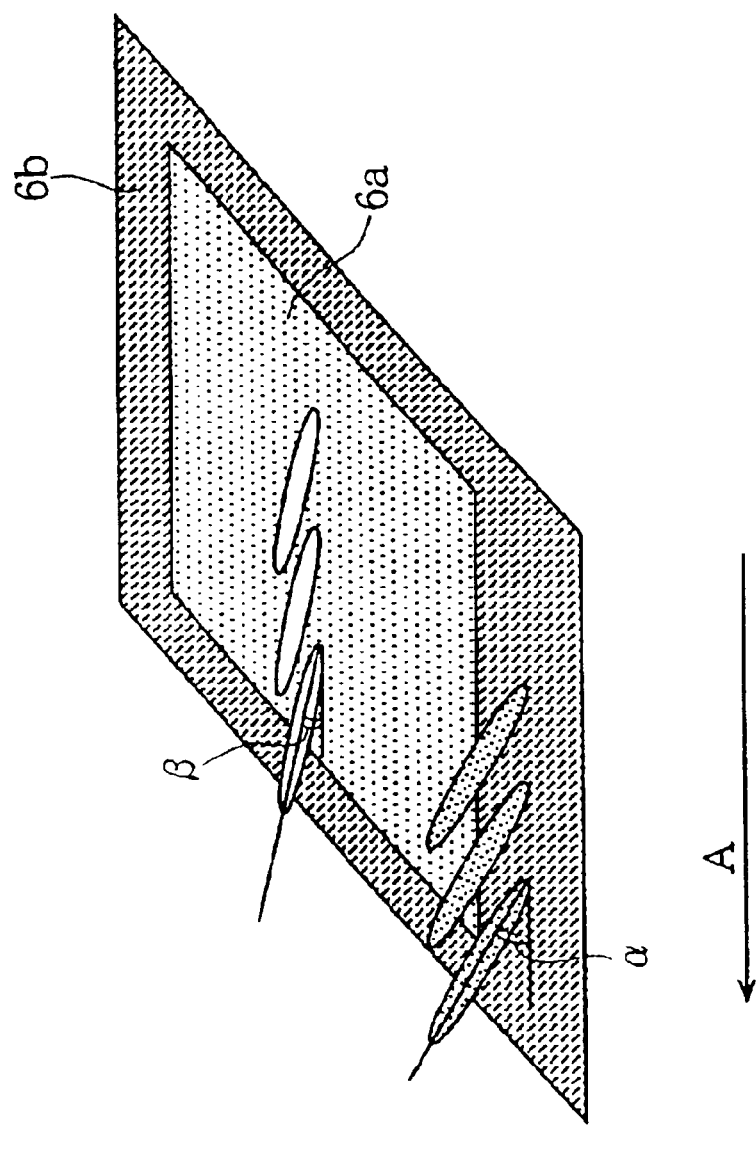
FIG. 4 is a perspective view schematically showing the orientation state of liquid crystal molecules in one pixel.

The present embodiment suppresses the generation of disclination and realizes an improvement in display characteristics such as contrast by providing, in a twisted nematic orientation mode liquid crystal display element, a transverse electric field suppressing region around the perimeter portion of each of pixel regions of the liquid crystal layer. Specifically, in order to realize these transverse electric field suppressing regions, the pretilt angle of liquid crystal molecules of the perimeter portions of the pixel regions is made larger than the pretilt angle of liquid crystal molecules of regions other than the perimeter portions (hereinafter referred to as inner regions). Using FIG. 3, a TN mode liquid crystal display element of the present invention is described below. FIG. 3 is a perspective view that schematically shows the TN mode liquid crystal display element. FIG. 4 is a perspective view schematically showing the orientation state of liquid crystal molecules in one pixel.

A liquid crystal display element 10 has a substrate 1, a counter substrate 2 opposed to the substrate 1, and a liquid crystal layer 3 provided between the substrate 1 and the counter substrate 2. A glass substrate, for example, may be used for the substrate 1 and the counter substrate 2.

On the inner side of the substrate 1, pixel electrodes 4 are arranged in a matrix, and bus lines (wiring), TFTs, and the like (not shown in figures) are formed. On the inner surface of the pixel electrodes 4 and the like, an orientation film 6 for orienting the liquid crystal molecules in the direction shown by the arrow X is formed. On the inner surface of the counter substrate 2, a counter electrode 5 is provided, and on the inner surface of the counter electrode 5, an orientation film 6 for orienting liquid crystal molecules in the direction shown by the arrow Y is formed. Electrodes composed of ITO (indium tin oxide) or like may be employed for the pixel electrodes 4 and the counter electrode 5.

The orientation film 6 has, for every pixel electrode, a high pretilt angle region 6a for orienting liquid crystal molecules at a high pretilt angle and a low pretilt angle region 6b for orienting liquid crystal molecules at a low pretilt angle (see FIG. 4). The high pretilt angle region 6a is provided in a rectangular frame-shape corresponding to the perimeter portion of a given pixel region. The low pretilt angle region 6b is provided so as to correspond to the inner region, the region other than the perimeter region. The high pretilt angle region 6a may be a frame-shaped region having a width within the range of 5 $\mu$m×20 $\mu$m when the pixel region is for example, 200 $\mu$m×200 $\mu$m. When the width of the high pretilt angle region 6a is less than 5 $\mu$m, disclination cannot be sufficiently suppressed, making such a width undesirable. On the other hand, when greater than 20 $\mu$m, coloration is observed, making such a width undesirable. It should be noted that instead of making the high pretilt angle region 6a into a rectangular frame-shaped region, it may be made into a circular frame-shaped region. In addition, in the present embodiment, while the formation regions of the pixel electrodes 4 was matched with the pixel regions for the sake of convenience in the description, it is no problem to define the pixel regions as regions enlarged to include positions for the formation of bus lines provided around the regions.

The orientation film is composed of a group of adsorbed molecules (thin film component molecules) that are chemisorbed to the substrate surface and is a monomolecular chemisorbed film having a construction such that a photosensitive group portion of the adsorbed molecules is polymerized and fixed in a specified direction. In addition, the thin film has a construction wherein the thin film components are inclined and oriented in the direction shown by arrow A in FIG. 4, and the photosensitive group portion is polymerized in the same direction. Thus, the orientation film 6 differs from orientation films intended for multidomain-type displays in that the orientation controlling direction induced in the liquid crystal molecules is the same for both the high pretilt angle region 6a and the low pretilt angle region 6b. The thin film component molecules are adsorbed in a state wherein the inclination angle of the thin film component molecules (the angle formed by the long axis of the thin film component molecules and the substrate surface) in the high pretilt angle region 6a is smaller than the inclination angle of the thin film component molecules in the low pretilt angle region 6b.

The orientation film 6 is a monomolecular chemisorbed film wherein a group of adsorbed molecules are chemisorbed to the substrate surface. The group of adsorbed molecules includes at least adsorbed molecules having photosensitive groups, the photosensitive group portion being polymerized and fixed in a specified direction. Because the adsorbed molecules are disposed in an orderly manner on the substrate, an orientation film having excellent orientation uniformity is realized. In addition, because the thickness of the film is the same as the length of the molecules due to the fact that it is a monomolecular film, the thickness of the film can be controlled very uniformly. Thus, it is made possible to reduce degradation of display characteristics such as variances in driving voltages, sticking, and the like which arise from unevenness in thickness. In employing an orientation treatment carried out using a photoalignment method described hereinafter, the dose of polarized ultraviolet light may also be reduced. This is because the anisotropic light reaction can be easily induced in a desired direction when photosensitive groups are exposed on the outermost surface. It should be noted that the orientation film 6 is not limited to a monomolecular chemisorbed film, but that is possible to employ, for example, polymer orientation films composed of polyvinyl, polyimide, or the like and having photosensitive groups.

Cinnamoyl groups or chalconyl groups are suitable for the photosensitive groups. By providing such photosensitive groups, it is made possible to reduce the irradiation intensity of polarized ultraviolet light when photoalignment treatment is carried out and to shorten tact time. Chalconyl groups are particularly sensitive to ultraviolet light, and thus an even greater shortening of tact time can be realized. In addition, the molecular structure of the adsorbed molecules may have a linear hydrocarbon chain. When a linear hydrocarbon chain is contained, silane-based compound molecules can be disposed on a substrate in an orderly manner and adsorbed at a high density, thereby making it possible to realize an orientation film that is excellent in terms of orientation. It should be noted that while the orientation film 6 has been described, for the most part, the same applies to the orientation film 7 provided on the counter substrate 2 side.

The liquid crystal layer 3 contains a liquid crystal having a positive dielectric anisotropy and has a TN alignment structure in which the long axes of the liquid crystal molecules form a continuous twist of 90° between the substrate 1 and the counter substrate 2 as a result of the controlling of the orientation directions by the orientation films 6 and 7. In addition the liquid crystal layer 3 has a structure such that, around the perimeter of each pixel region, a frame-shaped transverse electric field suppressing region where liquid crystal molecules are oriented at a high pretilt angle is provided, and liquid crystal molecules in inner regions, regions other than the transverse electric field suppressing regions, are oriented at a low pretilt angle. This is achieved by orienting liquid crystal molecules 8 in the vicinity of the high pretilt angle region 6a of the orientation film 6 at a pretilt angle of a degrees and liquid crystal molecules 9 in the vicinity of the low pretilt angle region 6b at a pretilt angle of 8 angles (see FIG. 4). By thus forming a transverse electric field suppressing region in every pixel region, even if this region is subject to a transverse electric field, alignment defects do not arise because molecules are oriented at a high pretilt angle in advance. Thus, a liquid crystal display element having good contrast and capable of suppressing the generation of disclination is realized. It should by noted that a transverse electric field suppressing region is provided in every pixel region in a frame-shape because a bus line is wired on all sides of each pixel region such that influence from a transverse electric field comes from all directions.

It is desirable that α be in the range of 3° to 10°. When less than 3°, disclination is generated in liquid crystal molecules under the influence of a transverse electric field. On the other hand when greater than 10°, coloration is observed. It is desirable that 8 be in the range of 1° to 7°. When less than 1°, a reverse tilt is generated. On the other hand when greater than 7°, coloration is observed. Specifically, α and β are set such that α>β.

A method of producing a liquid crystal display element 10 in accordance with the present invention is described. In this example, for the orientation films 6 and 7, monomolecular thin films composed of chemisorbed groups of silane-based compound molecules are described.

First, pixel electrodes 4 are formed on a substrate 1 by a known method. A silane-based compound (chemisorption substrate) having at least a photosensitive group is then dissolved in a nonaqueous organic solvent and a chemisorption solution is prepared. The chemisorption substance is then contacted to the substrate 1 and the molecules of the chemisorption substance in the chemisorption solution are chemisorbed to the substrate surface.

For example, when a compound provided with a photosenstive group and a Trichlorosilane group, specifically $C_6H_5$—CH=CH—CO—$C_6H_4$O—$(CH_2)_6$—O—$SiCl_3$, is used for the silane-based compound, the chemisorption reaction represented by chemical reaction formula (1) occurs. In short, the chlorosilyl groups in the compound and OH groups on the substrate surface undergo a dehydrochlorination reaction, whereby the compound is chemisorbed to the substrate surface.

$C_6H_5$—CH=CH—CO—$C_6H_4$O—$(CH_2)_6$—O—$SiCl_3$+HO-substrate→$C_6H_5$—CH=CH—CO—$C_6H_4$O—$(CH_2)_6$—O—$SiCl_2$—O-substrate+HCl Because the silane-based compound is highly reactive with water, the silane-based compound is deactivated when contained in a chemisorption solution having a lot of moisture. Therefore, in order that the chemisorption reaction be made to progress smoothly, it is desirable to use a nonaqueous solvent that does not contain active hydrogen groups such as OH groups and also to carry out the contacting of the solution with the surface of substrate 1 in a dry atmosphere. In addition, a portion of the silane-based compound may remain in an undissolved state. A chemisorption solution in a supersaturated state is an example of such a solution.

When a polymer orientation film is used for the orientation film, a variety of known methods may be employed for the method of forming the film. Specifically, a polymer orientation film can be formed by applying, for example, an orientation material containing a polymer precursor or the like having a photosensitive group, to a substrate surface and subsequently, drying and baking the substrate.

After the step of forming the orientation film a step of washing is carried out to remove unadsorbed silane-based compound on the substrate 1 and form a monomolecular orientation film. Examples of washing methods that may be employed in this step include an immersion method, a steam washing method and the like. The steam washing method is particularly effective in that excess unadsorbed silane-based compound on the front surface of the substrate can be forcibly removed by the penetrating power of the steam. It should be noted that when a clorosilane-based compound, a variety of silane-based compound, is used for the chemisorption substance, it is desirable to use chloroform or N-methyl-2-pyrrolidinone for the washing solution. This is because chloroform is excellent for removing chlorosilane polymer that is formed by the reaction between chlorosilane-based compound and water.

After the step of washing, the substrate 1 is then lifted from the washing container and left to drain and dry in a fixed upright position. Thus, the washing solution is drained only in the direction of gravity, making it possible to temporarily orient the chemisorbed molecules making up the thin film in the draining and drying direction. In particular, washing solutions having a boiling point of 200° C. or less are desirable as these solutions have excellent drying properties following draining. Another method of draining and orienting applicable to the present embodiment entails spraying gas on the substrate surface to being about the draining of the washing liquid. With this method, the washing solution can be drained in a short period and only in the direction in which the gas was sprayed. In particular, use of a washing solution having a boiling point of 150° C. or higher is effective because the washing solution can be drained by the spraying of the gas without evaporation.

An orientation treatment (photoalignment with polarization light step) is carried out on the orientation film formed on the substrate 1 by a photoalignment method. Unlike the conventional rubbing treatment, this photoalignment method eliminates the need for masking in which a protective film is used, making it possible to satisfy the production process and prevent contamination and the like of the orientation film by a protective film. There is also no generation of dust and the like as there is when rubbing is carried out.

The orientation film 6 is a thin film composed of a chemisorbed group of silane-based compound molecules and has a construction such that most of the thin film component portion is exposed in an orderly manner on the surface. For these reasons, the film is sensitive to polarized light and can be provided with orientation anisotropy by low intensity polarized light irradiation. In addition, because the orientation film is an ultrathin film, occurrence of driving voltage loss, sticking, and the like is reduced, making it possible to realize an improvement in display characteristics.

Figure 5:
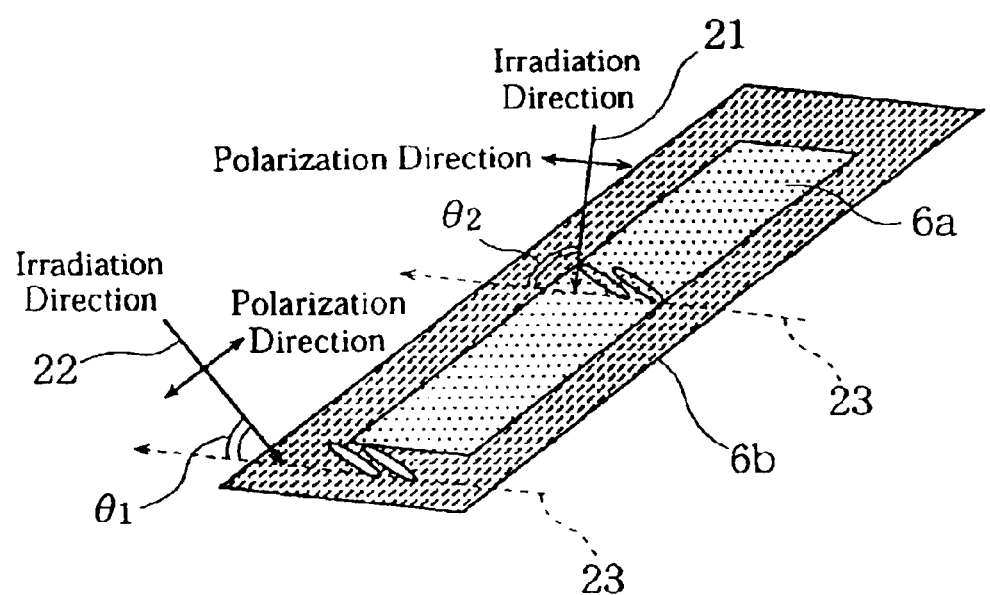
FIG. 5 is a perspective view for illustrating orientation treatment by an orientation film photoalignment method in the method of producing a liquid crystal display element mentioned above.

Specifically, photoalignment is brought about by the following method. FIG. 5 is a perspective view for illustrating orientation treatment by photoalignment. As is shown in the same figure, first, polarized ultraviolet light 21 having, for example, a wavelength distribution in the neighborhood of 300 nm to 400 nm is applied, the perimeter portions of the pixel regions only being covered by a mask (not shown in figure). The polarized ultraviolet light 21 is applied in a direction that forms an angle of θ1 with the substrate along the draining direction 23.

The other substrate, a substrate 2, is then irradiated with polarized ultraviolet light 22. The polarized ultraviolet light 22 is applied in a direction that forms an angle of θ2 with the substrate along the draining direction 23.

The planes of polarization of the polarized ultraviolet light 21 and 22 line up with the draining direction from the draining step (in other words, with the thin film component portion). The irradiation intensity of the polarized ultraviolet light 21 and 22 should be within the range of 50 to 300 mJ/cm² (wavelength: 365 nm). Specifically, when the petilt angle of the liquid crystal molecules is controlled by the irradiation intensity of polarized ultraviolet light, it is necessary that irradiation intensity be set such that the irradiation intensity of the former polarization ultraviolet light be smaller than the irradiation intensity of the latter polarized ultraviolet light. The directions in which the polarized ultraviolet light is applied are set so as to form, along the draining direction, an angle of θ1 and θ2 within the range of 0° to 90° and more preferably within the range of 45° to 90°. Specifically, when the pretilt angle of the liquid crystal molecules is controlled by the irradiation intensity of polarized ultraviolet light, it is necessary to set θ1 formed by the polarized ultraviolet light 21 so as to be greater than θ2 formed by the polarized ultraviolet light. For example, FIG. 5 shows a case in which θ1=45° and θ2=π°.

In this way, by carrying out a photoalignment treatment with polarized light, photosensitive groups in the thin film component molecules of the orientation film 6 can be selectively photopolymerized, making it possible to induce crosslinking of the thin film components on the substrate surface in a direction parallel to the polarization direction. Furthermore, in the formation region of a pair of parallel electrodes, a high pretilt angle region 6a capable of controlling the orientation of liquid crystal molecules at a high pretilt angle may be formed, and in the non-formation region, a low pretilt angle region 6b capable of controlling the orientation of liquid crystal molecules at a low pretilt angle may be formed. In addition, by appropriately setting the irradiation intensity of the polarized ultraviolet light and the direction in which the polarized ultraviolet light is applied, orientation films capable of controlling the orientation of the liquid crystal molecules at a specified pretilt angle can be consistently reproduced.

A counter electrode is then formed on a counter substrate 2 by a known method, and subsequently, an orientation film is formed by repeating the step of forming an orientation film and the step of carrying out an orientation treatment on the counter substrate.

The pair of substrates are then positioned at a specified distance with the film-formed sides on the inside, and the perimeters of the substrate are adhered and fixed together to fabricate an empty cell. A liquid crystal cell is then fabricated by injecting a liquid crystal into the empty cell, and subsequently, a TN liquid crystal display element of the present invention is fabricated by sandwiching the liquid crystal cell between a pair of polarizers.

As described above, in the method of producing a liquid crystal display element according to the present embodiment, the carrying out of an orientation treatment by the photoalignment method eliminates the need to form a photoresist (protective film) by photolithography for the carrying out of the conventional rubbing method. As a result, along with realizing a simplification in the production process, the formation and exfoliation of a photoresist becomes unnecessary, making it possible to prevent degradation of the surface of the orientation films. Furthermore, the generation of dust, which was a problem with rubbing treatment, does not arise with the photoalignment method, making it possible to prevent contamination of the orientation films.

In addition, with the photoalignment method, the fact that the irradiation intensity of polarized ultraviolet light, the polarization direction, and the direction of applied light can be controlled makes it possible to carry out an orientation treatment on the orientation films such that the orientation of the liquid crystal molecules is controlled in a desired direction and at a desired pretilt angle. In comparison with rubbing treatment, this orientation treatment can be reproduced very consistently, making it excellent for volume production.

If an orientation film is employed wherein groups of silane-based compound molecules each having a photosensitive group are absorbed to the substrate surface, because the orientation film is an ultrathin film, occurrence of driving voltage loss sticking, and the like is reduced making it possible to produce a liquid crystal display element having improved display characteristics.

However, it is possible to perform the orientation treatment on an orientation film without photosensitive groups by a rubbing method. In such a case, it is sufficient to follow the procedure of a known method, though it is desirable that the rubbing direction substantially line up with the draining direction. As the film component molecules will have been oriented in the rubbing treatment direction in advance, the rubbing treatment may be performed lightly, the rubbing conditions having been eased in comparison to those of conventional rubbing treatments. As a result, the generation of dust is reduced. For an orientation film without photosensitive groups, a polyimide without photosensitive groups, for example, may be employed.

Examples of silane-based compounds usable for the present embodiment include the compounds listed below.

(1) $SiY_pCl_{3-p}$
(2) $CH_3(CH_2)_rSiY_qCl_{3-q}$
(3) $CH_3(CH_2)_3O(CH_2)_sSiY_qCl_{3-q}$
(4) $CH_3(CH_2)_u—Si(CH_3)_2(CH_2)_vSiY_qCl_{3-q}$
(5) $CFCOO_3(CH_2)_wSiY_qCl_{3-q}$

Note that p is an integer of 0–3, q is an integer of 0–2, r is an integer of 1–25, s is an integer of 0–12, t is an integer of 1–20, $\mu$ is an integer of 0–12, v is an integer of 1–20, and w is an integer of 1–25. In addition, Y is one of hydrogen, an alkyl group, an alkoxyl group, a fluorine-containing alkyl group, and a fluorine-containing alkoxyl group.

It is also possible to use a trichlorosilane-based compound for the silane-based compound. Specifically, the compounds (6) to (14) shown below can be used.

(6) $CF_3(CH_2)_9SiCl_3$
(7) $CH_3(CH_2)_9OS_4Cl_3$
(8) $CH_3(CH_2)_9Si(CH_2)_2(CH_2)_{10}SiCl_3$
(9) $CH_3COO(CH_2)_2SiCl_3$
(10) $CF_3(CF_2)_7—(CH_2)_2—SiCl_3$
(11) $CF_3(CF_2)_7—(C_6H_4—SiCl_3$
(12) $C_6H_5—CH=CH—CO—O—(CH_2)_6—O—SiCl_3$
(13) $C_6H_5—CO—CH=CH—C_6H_4O—(CH_2)_6—O—SiCl_3$
(14) $C_6H_5—CH=CH—CO—C_6H_4O—(CH_2)_6—O—SiCl_3$

Of the compounds listed above, the compound represented by expression (12) has a cinnamoyl group for the photosensitive group, and the compounds represented by the expressions (13) and (14) have a chalconyl group for the photosensitive group.

Instead of the chlorosilane-based compound, it is also possible to use an isocyanate-based compound having an isocyanate group or an alkoxy group in place of the chlorosilyl group. Specifically, examples include the compounds represented by the expression (15) and (16) below in which the chlorosilane group in the chlorosilane of expression (6) is substituted with an isocyanate group or an alkoxy group.

(15) $CH_3(CH_2)_9Si(OC_2H_5)_3$
(16) $CH_3(CH_2)_9Si(NCO)_3$

By using an isocyante-based compound or an alkoxy-based compound, the generation of hydrochloric acid is prevented when either of the compounds is contacted to a substrate and chemisorpton is brought about. For this reason, TFTs or the like provided on the substrate are not damaged, and there is the additional advantage that these compounds are easy to use.

Examples for an organic solvent that dissolves silane-based compounds include a hydrocarbon-based solvent that does not contain water, a fluorocarbon-based solvent, and a silicone-based solvent. Examples usable for a petroleum-based solvent include petroleum naphtha, solvent naphtha, petroleum ether, petroleum benzene, isoparaffin, normal paraffin, decalin, industrial gasoline, kerosene, ligroin, dimethyl silicone, phenyl silicone, alkyl modified silicone, polyester silicone, and the like. For a fluorocarbon-based solvent, a flon-based solvent. Fluorinert (tradename, available from 3M). A fluid (tradename, available from Asahi Glass Co. Ltd), or the like can be used. These solvents may be used individually or by mixing two or more solvents together supposing the solvents are compatible. In particular, silicone has little moisture and does not easily absorb moisture, and silicone serves to prevent direct contact of a chlorosilane-based compound with moisture by solvation of the chlorosilane-based compound. Thus, by employing a solvent that is composed of a chlorosilane-based compound and silicone, adverse effects caused by moisture in the atmosphere when the solvent is contacted to a substrate layer are prevented, making it possible to chemisorb the chlorosilane-based compound to the exposed OH groups on the substrate layer.

On the substrates, in addition to the pixel electrodes 4 and the counter electrode 5, wiring composed of an ITO film or an Al film, TFTs, and protective films composed of an $SiO_2$ film or $SiN_x$ are provided in advance. On the counter substrate 2, a color filter composed of, for example, an acrylic-based or silicone based polymer film is provided. Spacers composed of an acrylic-based or silicone-based polymer material are integrally formed with either the substrate or the counter substrate so as to be provided thereon. Of all the members described above, because the distribution density of OH groups, which serve as adsorption sites, is high on the surfaces of the $SiO_2$ or $SiN_x$ film, even more of the silane-based compound molecules can be adsorbed. Thus, it is made possible to form orientation films that are excellent in terms of orientation characteristics. By contrast, the distribution density of OH groups on the wiring and the electrodes, which are composed of an ITO film or an Al film, the TFTs, and the like is low. As for the color filter and the spacers, OH groups are almost nonexistent. Thus, in order to adsorb a silane-based compound to the surfaces of these members also and to form an orientation film having high quality film characteristics, it is necessary to carry out a hydrophilization treatment to increase the number of adsorption sites. In the present embodiment, various known methods may be employed for the hydrophilization treatment. Specifically, examples include a method wherein an $SiO_2$ film is formed on regions to be made hydrophilic, a UV—$O_3$ treatment wherein ultraviolet is applied under an ozone atmosphere, or the like.

Examples for the washing solution employed in the washing step include a hydrocarbon-based solvent that does not contain water, a fluorocarbon-based solvent, and a silicone-based solvent. Examples usable for a petroleum-based solvent include petroleum naphtha, solvent naphtha, petroleum ether, petroleum benzene, isoparaffin, normal paraffin, decalin, industrial gasoline, kerosene, ligroin, dimethyl silicone, phenyl silicone, alkyl modified silicone, polyester silicone, and the like. For a fluorocarbon-based solvent, a flon-based solvent, Fluorment (tradename, available from 3M), Afluid (tradename, available from Asahi Glass Co., Ltd), or the like can be used. These solvents may be used individually or by mixing two or more solvents together supposing the solvents are compatible.

Embodiment 2-2

In the following, the present embodiment is described with reference to FIGS. 6–10. Parts not essential to the description have been omitted, and for the sake of convenience in the description, some parts have been enlarged or reduced.

Figure 6:
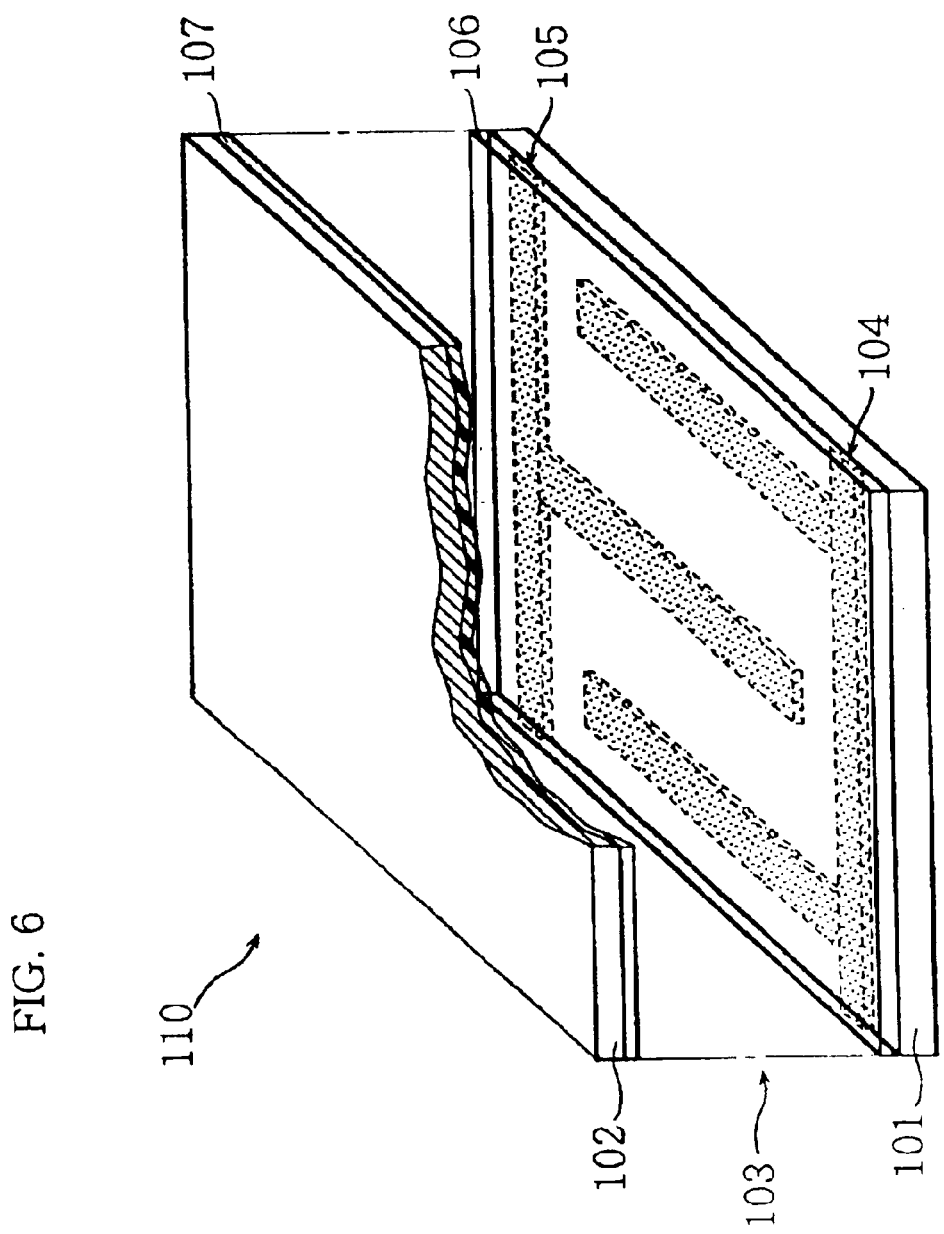
FIG. 6 is a perspective view schematically showing an IPS mode liquid crystal display element in accordance with an embodiment of the present invention.
Figure 7:
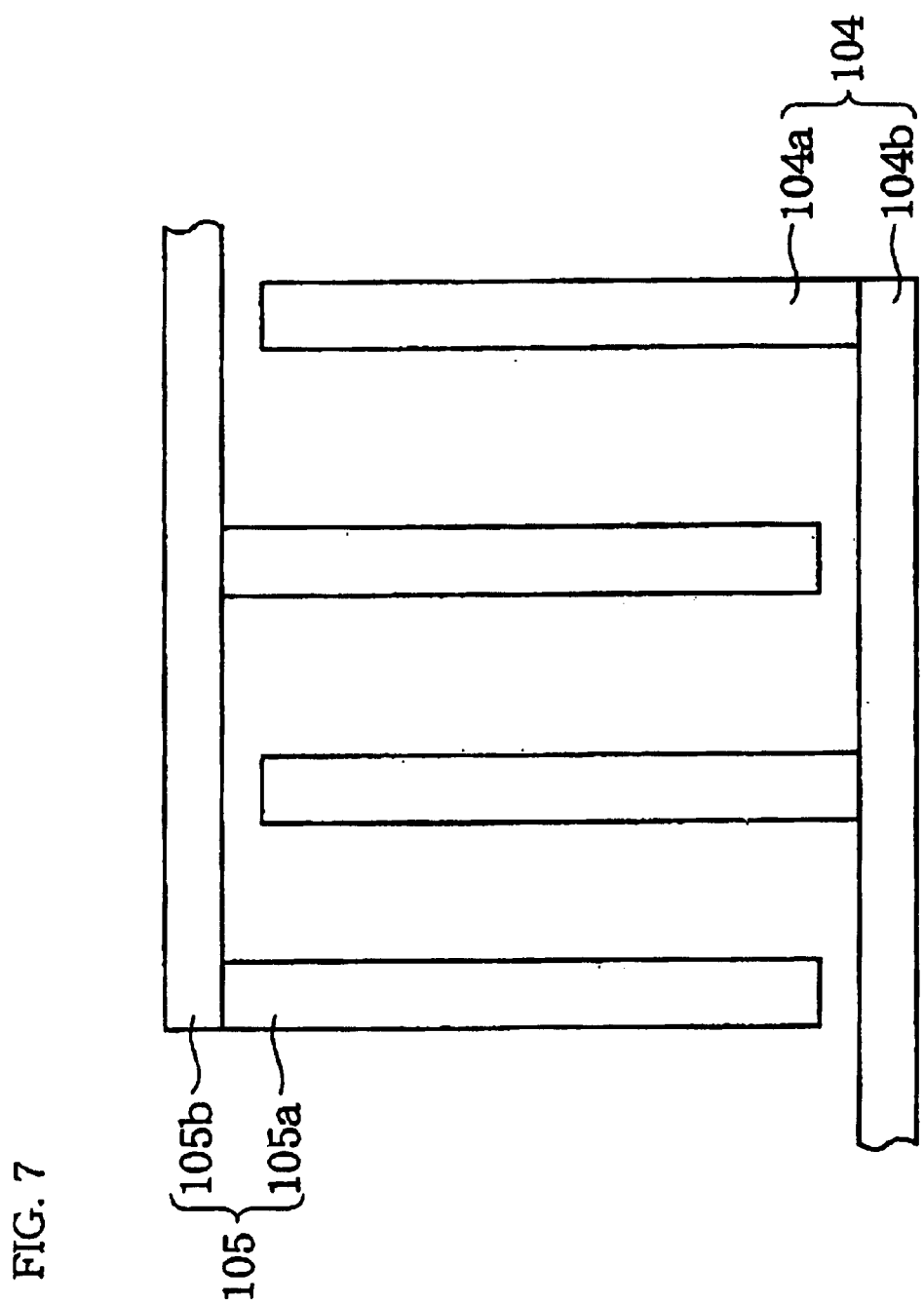
FIG. 7 is a plan view schematically showing electrode pairs made up of a pixel electrode structure and a counter electrode structure in the liquid crystal display element mentioned above.
Figure 8:
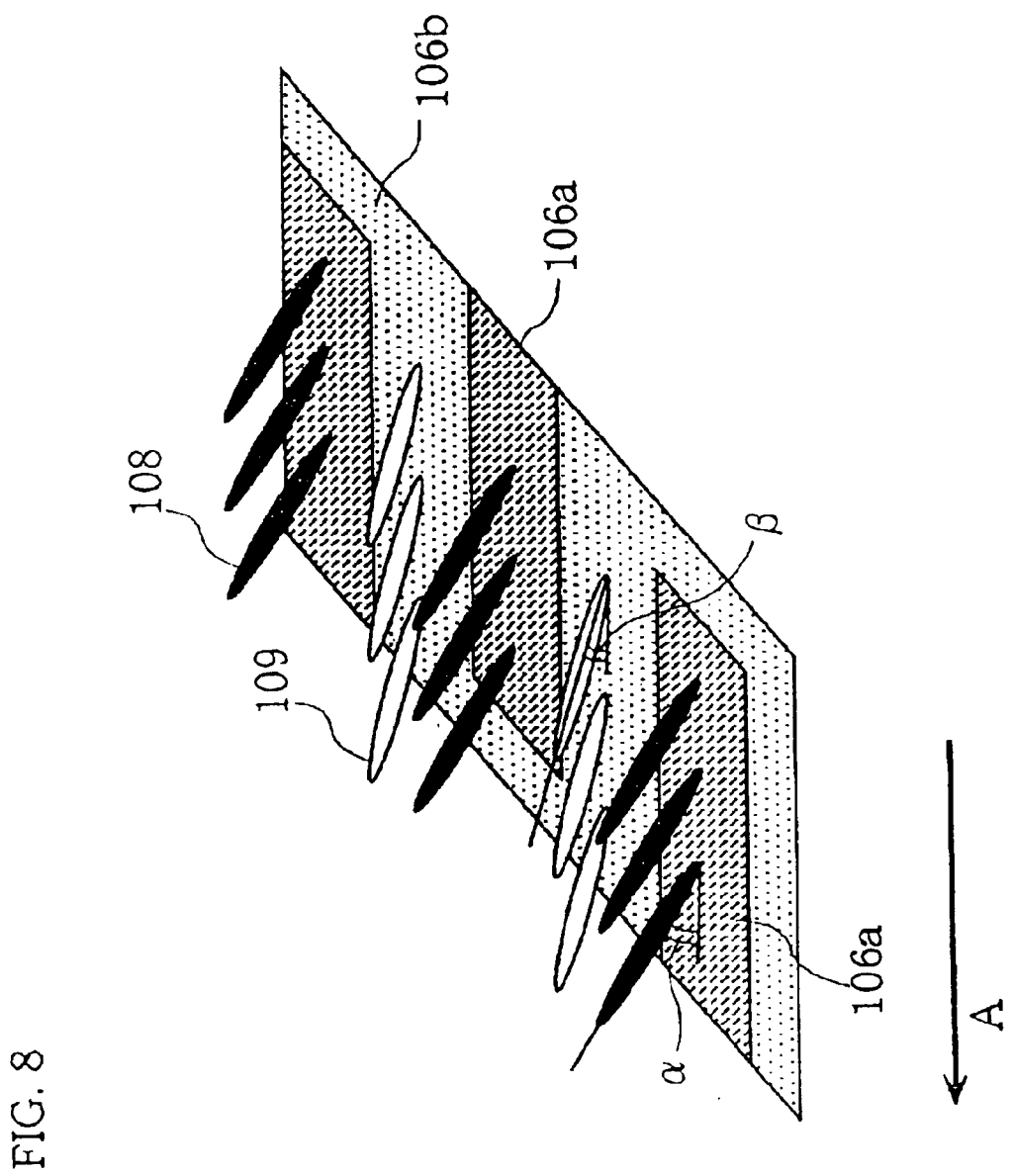
FIG. 8 is a perspective view schematically showing the orientation state of liquid crystal molecules in the liquid crystal display element mentioned above.

An in-plane switching liquid crystal display element in accordance with the present invention realizes an improvement in response speed by the formation of first regions capable of controlling the alignment of the liquid crystal by means of the electric field components above the electrodes. To form the first regions, the pretilt angle of liquid crystal molecules above the electrodes is made larger than the pretilt angle of liquid crystal molecules above the region between the electrodes. Using FIG. 6, an in-plane switching mode liquid crystal display element according to the present invention is described below. FIG. 6 is a perspective view schematically showing the IPS mode liquid crystal display element. FIG. 7 is a plan view schematically showing electrode pairs made up of a pixel electrode structure and a counter electrode structure. FIG. 8 is a perspective view schematically showing the orientation state of liquid crystal molecules.

A liquid crystal display element 110 has a substrate 101, a counter substrate 102 opposed to the substrate 101, and a liquid crystal layer 103 provided between the substrate 101 and the counter substrate 102. A glass substrate, for example, may be used for the substrate 101 and the counter substrate 102.

On the inner side of the substrate 101, a pixel electrode structure 104 and a counter electrode structure 105 serving as pairs of electrodes are provided. An orientation film 106 for orienting liquid crystal molecules in the vicinity in the same given direction is provided on the substrate having the pixel electrode structure 104 and the counter electrode structure 105. An orientation film 107 is provided on the inner surface of the counter substrate 102 for orienting liquid crystal molecules in the vicinity in the same given direction.

The pixel electrode structure 104, as shown in FIG. 7, has a plurality of pixel electrode portions 104a and a connecting electrode portion, the pixel electrode portions 104b being disposed so as to be parallel to one another. In other words, the pixel electrode structure 104 is a comb-shaped electrode. The counter electrode structure takes on the same form as that of the pixel electrode structure it has a plurality of counter electrode portions 105a and a connecting electrode portion 105b, the counter electrode portions being disposed so as to be parallel to one another. The pixel electrode structure and the counter electrode structure are interleaved such that the pixel electrode portions and the counter electrode portions alternate. For the pixel electrode structure and the counter electrode structure, an electrode composed of, for example, ITO (indium tin oxide) may be used.

The orientation film is composed of a group of adsorbed molecules (thin film component molecules) that are chemisorbed to the substrate surface and is a monomolecular chemisorbed film having a construction such that a photosensitive group portion of the adsorbed molecules is polymerized and fixed in a specified direction. In addition, the thin film has a construction wherein the thin film components are inclined and oriented in the direction shown by arrow A in FIG. 4, and the photosensitive group portion is polymerized in the same direction. Thus, the orientation film 6 differs from orientation films intended for multidomain-type displays in that the orientation controlling direction induced in the liquid crystal molecules is the same for both high pretilt angle regions 6a and a low pretilt angle region 6b. The thin film component molecules are absorbed in a state wherein the inclination angle of the thin film component molecules (the angle formed by the long axis of the thin film component molecules and the substrate surface) in the high pretilt angle regions 6a is smaller than the inclination angle of the thin film computer molecules in the low pretilt angle region 6b.

The orientation film is a monomolecular chemisorbed film wherein a group of adsorbed molecules are chemisorbed to the substrate surface. The group of adsorbed molecules includes at least adsorbed molecules having photosensitive groups, the photosensitive group portion being polymerized and fixed in a specified direction. Because the adsorbed molecules are disposed in an orderly manner on the substrate, an orientation film having excellent orientation uniformity is realized. In addition, because the thickness of the film is the same as the length of the molecules due to the fact that it is a monomolecular film, the thickness of the film can be controlled very uniformly. Thus, it is made possible to reduce degradation of display characteristics such as variances in driving voltages, sticking, and the like which arise from unevenness in thickness. In employing an orientation treatment carried out using a photoalignment method described hereinafter, the dose of polarized ultraviolet light may also be reduced. This is because the anisotropic light reaction can be easily induced in a desired direction when photosensitive groups are exposed on the outermost surface. It should be noted that the orientation film 6 is not limited to a monomolecular chemisorbed film, but that it is possible to employ, for example, polymer orientation films composed of polyvinyl, polyimide, or the like and having photosensitive groups.

Cinnamoyl groups are chalconyl groups are suitable for the photosensitive groups. By providing such photosensitive groups, it is made possible to reduce the irradiation intensity of polarized ultraviolet light when photoalignment treatment is carried out and to shorten tact time. Chalconyl groups are particularly sensitive to ultraviolet light, and thus an even greater shortening of tact time can be realized. In addition, the molecular structure of the adsorbed molecules may have a linear hydrocarbon chain. When a linear hydrocarbon chain is contained, silane-based compound molecules can be disposed on a substrate in an orderly manner and adsorbed at a high density, thereby making it possible to realize an orientation film that is excellent in terms of orientation.

The orientation film, as is shown in FIG. 8, is made up of high pretilt angle regions 106a that orient and control liquid crystal molecules in the vicinity at a high pretilt angle and a low pretilt angle region 106b that orients and controls liquid crystal molecules in the vicinity at a low pretilt angle. The high pretilt angle regions 106a are provided so as to match up with the pixel electrode portions 104a and the counter electrode portions 105b. In the high pretilt angle regions 106a, thin film component molecules are inclined and oriented in the comb teeth direction of the comb tooth-shaped pixel electrode portions (the direction shown by arrow A in FIG. 8), and photosensitive group portions are polymerized in the same direction. Thus, the orientation controlling direction for the liquid crystal molecules is the same as the comb teeth direction. On the other hand, the low pretilt angle region 106b is provided so as to match up with the non-formation region in which the pixel electrode structure 104 and the counter electrode 105 are not provided. In addition, thin film component molecules in the low pretilt angle region 106b are inclined and oriented in the same direction as thin film components in the high pretilt angle regions 106a, and photosensitive group portions are polymerized in this same direction. In other words, the orientation controlling strength in the low pretilt angle region 106b is provided so as to match up with the orientation controlling strength of the high pretilt angle regions 106a. The thin film component molecules are adsorbed in a state wherein the inclination angle of the thin film component molecules (the angle formed by the long axis of the thin film component molecules and the substrate surface) in the high pretilt angle regions 106a is smaller than the inclination angle of the thin film component molecules in the low pretilt angle region 106b.

The liquid crystal layer 103 contains a liquid crystal having a positive dielectric anisotropy and has a homogeneous orientation structure as a result of the controlling of the orientation directions by the orientation films 106 and 107. In addition the liquid crystal layer 3 contains first regions provided above the pixel electrode structure 104 and the counter electrode structure 105 and a second region provided between the pixel electrode portions 105a and the counter electrode portions 105b. The first regions are such that liquid crystal molecules are oriented at a high pretilt angle (α degrees) due to the orientation controlling of the high pretilt angle regions 106a. The second region is such that liquid crystal molecules are oriented at a low pretilt angle (β degrees) due to the orientation controlling of the low pretilt angle region 106b (see FIG. 8).

It is desirable that α be in the range of 1° to 10°. When less than 1°, disclination is generated in liquid crystal molecules under the influence of a transverse electric field. On the other hand when greater than 10°, coloration is observed. It is desirable that β be 1° or less. When greater than 1°, coloration is observed. Specifically, α and β are set such that α>β.

Referring to FIG. 9, the behavior of liquid crystal molecules 118 and 119 when an electric filed is applied across the liquid crystal layer 103 is now described. FIGS. 9(a)–9(b) are cross sectional views schematically showing the orientation state of liquid crystal molecules in the first regions and the second region: FIG. 7(a) shows the state of liquid crystal molecules when no voltage is being applied, and FIG. 7(b) shows the state of liquid crystal molecules when voltage is being applied. As is shown in FIG. 7(a), when no voltage is being applied, a transverse electric field is not generated between the pixel electrode portions 104a and the counter electrode portion 104b, and the liquid crystal molecules 118 and 119 accordingly line up and orient in the same direction within a plane parallel to the substrate 101 and the counter electrode portions 102.

As is shown in FIG. 7(b), when voltage is being applied, an electric field substantially parallel to the substrate 1 (transverse field) is generated, and thus, the liquid crystal molecules 119, which have a positive dielectric anisotropy, are such that their long axes line up in the direction of the electric field and rotate within the plane. On the other hand, above the pixel electrode portions 104a and the counter electrode portions 105a, an electric field in a substantially vertical direction or oblique direction (electric field component above the electrodes) is generated. Thus, liquid crystal molecules in the vicinity of the pixel electrode portions 104a are oriented at a high pretilt angle. For this reason, the long axes of the liquid crystal molecules 118 in the central area of the liquid crystal layer 103 line up with the long axis of the electric field component direction above the electrodes to change the orientation state. In the conventional IPS mode, liquid crystal molecules above the electrodes and liquid crystal molecules between the electrodes are oriented in the same direction and at the same pretilt angle. Therefore, when voltage is applied, because a transverse electric field is generated between the electrodes, it is not possible to change the alignment state of liquid crystal above the electrodes. In other words, as a result of the liquid crystal layer coming to have a plurality of regions in which the liquid crystal transitions to a new alignment state and a plurality of regions in which the liquid crystal remains in the initial orientation state, at least in the boundary portions between both regions, continuity in the alignment state of the liquid crystal is not maintained and this is a factor in deterioration of response. In contrast to this conventional mode, in the present embodiment, the orientation state of liquid crystal molecules above the pixel electrode structure 104 and the counter electrode structure 105 can be transitioned and thus even when voltage is being applied, continuity of the alignment state of liquid crystal at the boundary portions between the first regions and the second region is maintained. As a result, the transition of the liquid crystal molecules 119 is much smoother, and it is thought that this is linked to an improvement in response. In addition, compared to conventional IPS mode liquid crystal display elements, the region of operation of the liquid crystal is expanded, and as a result, if transparent electrodes composed of ITO or the like are used for the pixel electrode structure and the counter electrode structure, the utilization efficiency of light is improved, making a much brighter display possible.

A method of producing a liquid crystal display element 10 in accordance with the present invention is described. In this example, for the orientation films, monomolecular thin films composed of chemisorbed groups of silane-based compound molecules are described.

Firs, pixel electrodes are formed on a substrate 1 by a known method. A silane-based compound (chemisorption substance) having at least a photosensitive group is then dissolved in a nonaqueous organic solvent and a chemisorption solution is prepared. This chemisorption substance is then contacted to the substrate 1 and the molecules of the chemisorption substance in the chemisorption solution are chemisorbed to the substrate surface.

For example, when a compound provided with a photosensitive group and a trichlorosilane group, specifically $C_6H_5-CH=CH-CO-C_6H_4O$ $(CH_2)_6-O-SiCH_2$ is used for the silane-based compound, the chemisorption reaction represented by chemical reaction formula (1) occurs. In short, the chorosilyl groups in the compound and OH groups on the substrate surface undergo a dehydrochlorination reaction, whereby the compound is chemisorbed to the substrate surface.

$C_6H_5-CH=CH-CO-C_6H_4O-(CH_2)_6-SiCl_3+HO\text{-substrate} \rightarrow$
$C_6H_5-CH=CH-CO-C_6H_4O-(CH_2)_6-O-SiCl_2-O\text{-substrate}+HCl$ 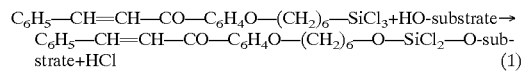 (1)

Because the silane-based compound is highly reactive with water, the silane-based compound is deactivated when contained in a chemisorption solution having a lot of moisture. Therefore, in order that the chemisorption reaction be made to progress smoothly, it is desirable to use a nonaqueous solvent that does not contain active hydrogen groups such as OH groups and also to carry out the contacting of the solution with the substrate surface in a dry atmosphere. In addition, a portion of the silane-based compound may remain in an undissolved state. A chemisorption solution in a supersaturated state is an example of such a solution.

When a polymer orientation film is used for the orientation film, a variety of known methods may be employed for the method of forming the film. Specifically, a polymer orientation film can be formed by applying, for example, an orientation material containing a polymer precursor or the like having a photosensitive group, to a substrate surface and subsequently, drying and baking the substrate.

After the step of forming the orientation film, a step of washing is carried out to remove unadsorbed silane-based compound on the substrate and form a monomolecular orientation film. Examples of washing methods that may be employed in this step include an immersion method, a steam washing method, and the like. The steam washing method is particularly effective in that excess unadsorbed silane-based compound on the front surface of the substrate can be forcibly removed by the penetrating power of the steam. It should be noted that when a chlorosilane-based compound, a variety of silane-based compound, is used for the chemisorption substance, it is desirable to use chloroform or N-methyl-2-pyrrolidinone for the washing solution. This is because chloroform is excellent for removing chlorosilane polymer that is formed by the reaction between chlorosilane-based compound and water.

After the step of washing, the substrate is then lifted from the washing container and left to drain and dry in a fixed upright position. Thus, the washing solution is drained only in the direction of gravity, making it possible to temporarily orient the chemisorbed molecules making up the thin film in the draining and drying direction. In particular, washing solutions having a boiling point of 200° C. or less are desirable as these solutions have excellent drying properties following draining. Another method of draining and orienting applicable to the present embodiment entails spraying gas on the substrate surface to bring about the draining of the washing liquid. With this method, the washing solution can be drained in a short period and only in the direction in which the gas was sprayed. In particular, use of a washing solution having a boiling point of 150° C. or higher is effective because the washing solution can be drained by the spraying of the gas without evaporation.

An orientation treatment (photoalignment with polarized light step) is carried out on the orientation film formed on the substrate by a photoalignment method. Unlike the conventional rubbing treatment, this photoalignment method eliminates the need for masking in which a protective film is used, making it possible to simplify the production process and prevent contamination and the like of the orientation film by a protective film. There is also no generation of dust and the like as there is when rubbing is carried out.

The orientation film is a thin film composed of a chemisorbed group of silane-based compound molecules and has a construction such that most of the thin film component portion is exposed in an orderly manner on the surface. For these reasons, the film is sensitive to polarized light and can be provided with orientation anisotropy by low intensity polarized light irradiation. In addition, because the orientation film is an ultrathin film, occurrence of driving voltage loss, sticking, and the like is reduced, making it possible to realize an improvement in display characteristics.

Figure 10:
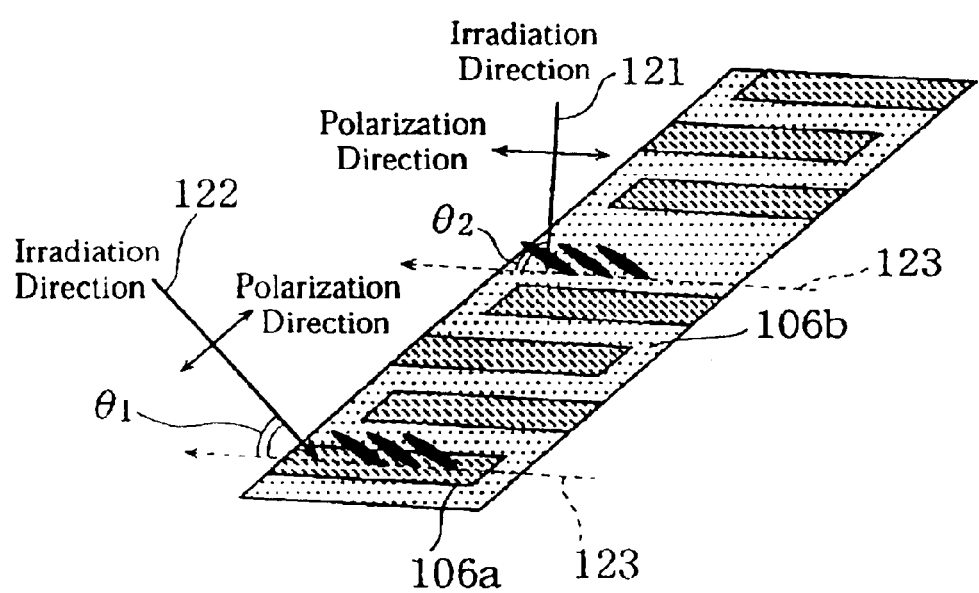
FIG. 10 is a perspective view illustrating orientation treatment by an orientation film photoalignment method in a method of producing the liquid crystal display element mentioned above.

Specifically, photoalignment is brought about by the following method. FIG. 10 is a perspective view for illustrating orientation treatment by photoalignment. As is shown in the same figure, first, polarized ultraviolet light 121 having, for example, a wavelength distribution in the neighborhood of 300 nm to 100 nm is applied, the perimeter portions of the pixel regions only being covered by a mask (not shown in figure). The polarized ultraviolet light 121 (a second polarized light) is applied in a direction that forms an angle of θ1 with the substrate along the draining direction 123.

The non-formation region only is then covered with a mask, and polarized light 122 (a first polarized light) is applied to the formation regions. The polarized ultraviolet light 122 is applied in a direction that forms an angle of θ2 with the substrate along the draining direction 123.

The planes of polarization of the polarized ultraviolet light 121 and 122 line up with the draining direction from the draining step (in other words, with the thin film component portion). The irradiation intensity of the polarized ultraviolet light should be within the range of 50 mJ/cm$^2$ to 3000 mJ/cm$^2$ (wavelength: 365 nm). Specifically, when the pretilt angle of the liquid crystal molecules is controlled by the irradiation intensity of polarized ultraviolet light, it is necessary that irradiation intensity be set such that the irradiation intensity of the former polarized ultraviolet light be smaller than the irradiation intensity of the latter polarization ultraviolet light. The directions in which the polarized ultraviolet light is applied are set so as to form, along the draining direction, an angle of θ1 and θ2 within the range of 0° to 90° and more preferably within the range of 45° to 90°. Specifically, when the profile angle of the liquid crystal molecules is controlled by the irradiation intensity of polarized ultraviolet light, it is necessary to set θ1 formed by the polarized ultraviolet light so as to be greater than θ2 formed by the polarized ultraviolet light. For example, FIG. 10 shows a case in which θ1=45° and θ2=90°.

In this way, by carrying out a photoalignment treatment with polarized light, photosensitive groups in the thin film component molecules of the orientation film 106 can be selectively photopolymerized, making it possible to induce crosslinking of the thin film components on the substrate surface in a direction parallel to the polarization direction. Furthermore, in the formation regions above pairs of parallel electrodes, high pretilt angle regions 106a capable of controlling the orientation of liquid crystal molecules at a high pretilt angle may be formed, while in the region between the electrodes, a low pretilt angle region 106b capable of controlling the orientation of liquid crystal molecules at a low pretilt angle may be formed. In addition, by appropriately setting the irradiation intensity of the polarized ultraviolet light and the direction in which the polarized ultraviolet light is applied, orientation films capable of controlling the orientation of the liquid crystal molecules at a specific pretilt angle can be consistently reproduced.

The substrate having the pixel electrode structure and the counter electrode structure formed thereon and a counter structure 2 prepared separately are then positioned at a specified distance with the film-formed sides on the inside, and the perimeters of the substrate are adhered and fixed together to fabricate an empty cell. A liquid crystal cell is then fabricated by injecting a liquid crystal into the empty cell, and subsequently, an IPS mode liquid crystal display element of the present invention is fabricated by sandwiching the liquid crystal cell between a pair of polarizers.

As described above, in the method of producing a liquid crystal display element according to the present embodiment, the carrying out of an orientation treatment by the photoalignment method eliminates the need to form a photoresist (protective film by photolithography for the carrying out of the conventional rubbing method. As a result, along with realizing a simplification in the production process, the information and exfoliation of a photoresist becomes unnecessary, making it possible to prevent degradation of the surface of the orientation films. Furthermore, the generation of dust, which was a problem with rubbing treatment, does not arise with the photoalignment method, making it possible to prevent contamination of the orientation films.

In addition, with the photoalignment method, the fact that the irradiation intensity of polarized ultraviolet light, the polarization direction, and the direction of applied light can be controlled makes it possible to carry out an orientation treatment on the orientation films such that the orientation of the liquid crystal molecules is controlled in a desired direction and at a desired pretilt angle. In comparison with rubbing treatment, this orientation treatment can be reproduced very consistently, making it excellent for volume production.

If an orientation film is employed wherein groups of silane-based compound molecules each having a photosensitive group are adsorbed to the substrate surface, because the orientation film is an ultrathin film, occurrence of driving voltage loss, sticking, and the like is reduced, making it possible to produce a liquid crystal display element having improved display characteristics.

However, it is possible to perform the orientation treatment on an orientation film without photosensitive groups by a rubbing method. In such a case, it is sufficient to follow the procedure of a known method, though it is desirable that the rubbing direction substantially line up with the draining direction. As the film component molecules will have been oriented in the rubbing treatment direction in advance, the rubbing treatment may be performed lightly, the rubbing conditions have been eased in comparison to those of conventional rubbing treatments. As a result, the generation of dust is reduced. For an orientation film without photosensitive groups, a polyimide without photosensitive groups, for example, may be employed.

Examples of silane-based compounds usable for the present embodiment include the compounds listed below.

(1) $SiY_pCl_{3-p}$
(2) $CH_3(CH_2)_rSiY_qCl_{3-q}$
(3) $CH_3(CH_2)_sO(CH_2)_tSiY_qCl_{3-q}$
(4) $CH_3(CH_2)_u—Si(CH_3)_2(CH_2)_vSiY_qCl_{3-q}$
(5) $CFCOO_3(CH_2)_wSiY_qCl_{3-q}$

Note that p is an integer of 0–3, q is an integer of 0–2, r is an integer of 1–25, s is an integer of 0–12, t is an integer of 1–20, u is an integer of 0–12, v is an integer of 1–20, and w is an integer of 1–25. In addition, Y is one of hydrogen, an alkyl group, an alkoxyl group, a fluorine-containing alkyl group, and a fluorine-containing alkoxyl group.

It is also possible to use a trichlorosilane-based compound for the silane-based compound. Specifically, the compounds (6) to (14) shown below can be used.

(6) $CF_3(CH_2)_9SiCl_3$
(7) $CH_3(CH_2)_3OSiCl_3$
(8) $CH_3(CH_2)_3Si(CH_2)_2(CH_2)_{10}SiCl_3$
(9) $CH_3COO(CH_2)_{15}SiCl_3$
(10) $CF_3(CF_2)_7—(CH_2)_2—SiCl_3$
(11) $CF_3(CF_2)_7—C_6H_4—SiCl_3$
(12) $C_6H_5—CH=CH—CO—O—(CH_2)_6—O—SiCl_3$
(13) $C_6H_5—CO—CH=CH—C_6H_4O—(CH_2)_6—O—SiCl_3$
(14) $C_6H_5—CH=CH—CO—C_6H_4O—(CH_2)_6—O—SiCl_3$

Of the compounds listed above, the compound represented by expression (12) has a cinnamoyl group for the photosensitive group, and the compounds represented by the expressions (13) and (14) have a chalconyl group for the photosensitive group.

Instead of the chlorosilane-based compound, it is also possible to use an isocyanate-based compound having an isocyanate group or an alkoxy group in place of the chlorosilyl group. Specifically, examples include the compounds represented by the expression (15) and (16) below in which the chlorosilane group in the chlorosilane of expression (6) is substituted with an isocyanate group or an alkoxy group.

(15) $CH_3(CH_2)_3Si(OC_2H_5)_3$
(16) $CH_3(CH_2)_9Si(NCO)_3$

By using an isocyanate-based compound or an alkoxy-based compound, the generation of hydrochloric acid is prevented when either of the compounds is contacted to a substrate and chemisorption is brought about. For this reason, TFTs or the like provided on the substrate are not damaged, and there is the additional advantage that these compounds are easy to use.

Examples for an organic solvent that dissolves silane-based compounds include a hydrocarbon-based solvent that does not contain water, a fluorocarbon-based solvent, and a silicone-based solvent. Examples usable for a petroleum-based solvent include petroleum naphtha, solvent naphtha, petroleum ether, petroleum benzene, isoparaffin, normal paraffin, decalin, industrial gasoline,kerosene, ligroin, dimethyl silicone, phenyl silicone, alkyl modified silicone, polyester silicone, and the like. For a fluorocarbon-based solvent, a flon-based solvent. Fluorinert (tradename, available from 3M). A fluid (tradename, available from Asahi Glass Co., Ltd), or the like can be used. These solvents may be used individually or by mixing two or more solvents together supposing the solvents are compatible. In particular, silicone has little moisture and does not easily absorb moisture, and silicone serves to prevent direct contact of a chlorosilane-based compound with moisture by solvation of the chlorosilane-based compound. Thus, by employing a solvent that is composed of a chlorosilane-based compound and silicone, adverse effects caused by moisture in the atmosphere when the solvent is contacted to a substrate layer are prevented, making it possible to chemisorb the chlorosilane-based compound to the exposed OH groups on the substrate layer.

On the substrate 101, in addition to the pixel electrode structure 104 and the counter electrode structure 105, wiring composed of an ITO film or an Al film, TFTs, and protective films composed of an $SiO_2$ film or $SiN_3$ are provided in advance. On the counter substrate 105, a color filter composed of, for example, an acrylic-based or silicone-based polymer film is provided. Spacers composed of an acrylic-based or silicone-based polymer material are integrally formed with either the substrate or the counter substrate so as to be provided thereon. Of all the members described above, because the distribution density of OH groups, which serve as description sites, is high on the surfaces of the $SiO_2$ or $SiN_x$ film, even more of the silane-based compound molecules can be adsorbed. Thus, it is made possible to form orientation films that are excellent in terms of orientation characteristics. By contrast, the distribution density of OH groups on the wiring and the electrodes, which are composed of an ITO film or an Al film, the TFTs, and the like is low. As for the color filter and the spacers, OH groups are almost nonexistent. Thus, in order to adsorb a silane-based compound to the surfaces of these members also and to form an orientation film having high quality film characteristics, it is necessary to carry out a hydrophilization treatment to increase the number of adsorption sites. In the present embodiment, various known methods may be employed for the hydrophilization treatment. Specifically, examples include a method wherein an $SiO_2$ or $SiN_x$ film is formed on regions to be made hydrophilic, a $UV-O_3$ treatment wherein ultraviolet is applied under an ozone atmosphere, or the like.

Examples for the washing solution employed in the washing step include a hydrocarbon-based solvent that does not contain water, a fluorocarbon-based solvent, and a silicone-based solvent. Examples usable for a petroleum-based solvent include petroleum naphtha, solvent naphtha, petroleum ether, petroleum benzene, isoparaffin, normal paraffin, decalin, industrial gasoline, kerosene, ligroin, dimethyl silicone, phenyl silicone, alkyl modified silicone, polyester silicone, and the like. For a fluorocarbon-based solvent, a flen-based solvent, Fluorinert (tradename, available from 3M), Afluid (tradename, available from Asahi Glass Co., Ltd), or the like can be used. These solvents may be used individually or by mixing two or more solvents together supposing the solvents are compatible.

Supplementary Remarks

As for the pairs of electrodes in accordance with the embodiment described above, dimension, material, shape, relative positioning, and the like described hereinbefore, where not particularly restricted, are illustrative only and are not intended to limit the scope of the present invention.

For example, a comb-shaped electrode is given as an example of pairs of electrodes, but an electrode bent alternately in differing directions may also be employed. It is only necessary that the pixel electrode portions of the pixel electrode structure and the counter electrode portions of the counter electrode structure be positioned so as to be parallel to one another. The case may also be applied wherein the thickness of one of the electrodes of a pair and the thickness of the other of the electrodes of the pair differ from one another but are within the range of the thickness of the liquid crystal layer.

In the description, an orientation film 107 is provided on the inner side of the counter substrate 102, but it is also possible that an orientation film 106 be provided only on the substrate 101 in the present embodiment.

In the present embodiment, it was described that the orientation films according to the present invention have a high pretilt angle region, in which liquid crystal molecules are initially oriented at a specified pretilt angle in a uniform manner, and a low pretilt angle region, in which liquid crystal molecules are initially oriented at a specified pretilt angle in a uniform manner. However, the present embodiment is not at all limited to this. For example, it is possible to control the orientation of the liquid crystal molecules such that the pretilt angle increases continuously or progressively toward the electrodes. Thus, the alignment state of the liquid crystal at the boundary portion between the first regions and the second region can be made much more continuous, the transition between alignment states of the liquid crystal when voltage is applied facilitated, and response even further improved.

Embodiment 2-3

In the following, the present embodiment is described with reference to FIGS. 11–12. Parts not essential to the description have been omitted, and for the sake of convenience in the description, some parts have been enlarged, reduced, or the like.

An OCB mode liquid crystal display element in accordance with the present invention uses orientation films composed of thin film components having photosensitive groups. High pretilt angle regions that orient liquid crystal molecules at a high pretilt angle are formed in the orientation films, whereby transition seed generation regions are provided in the liquid crystal layer. By providing these transition seed generation regions, the generation of transition seeds in the liquid crystal layer is ensured, and consequently, the transition from splay alignment to bend alignment is facilitated such that a reduction in the splay-bend transition voltage is realized.

Figure 11:
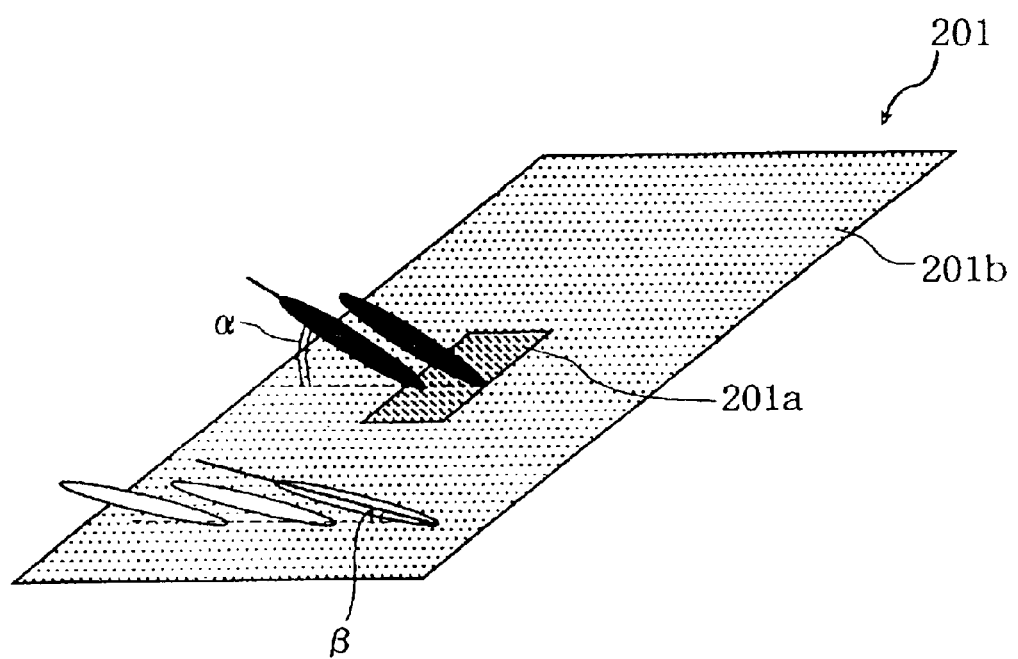
FIG. 11 is a perspective view schematically showing the orientation state of liquid crystal molecules in one pixel of an orientation film in accordance with the present invention.
Figure 12:
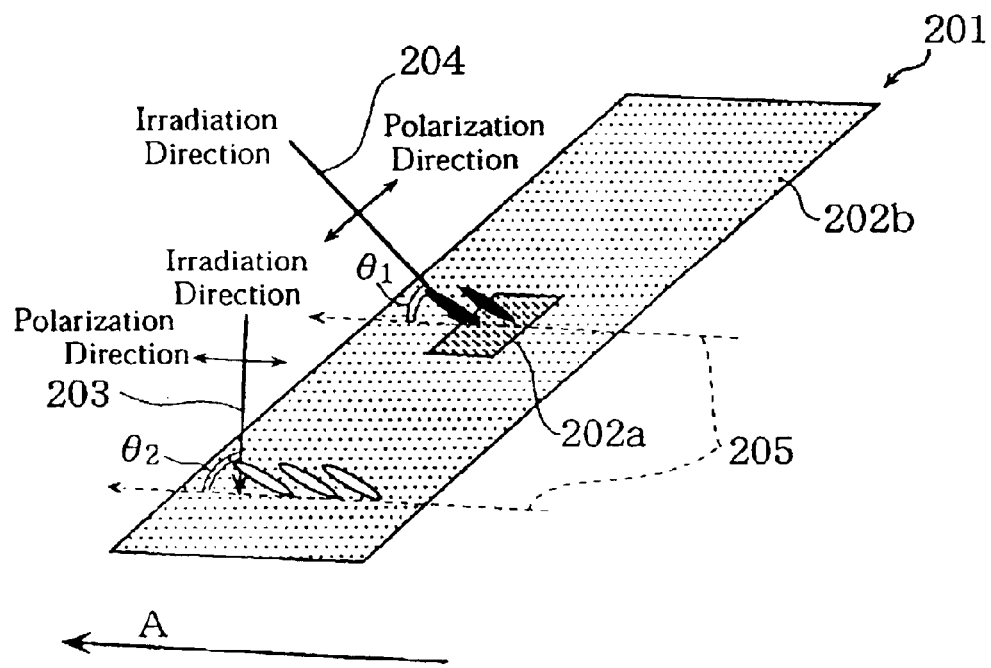
FIG. 12 is a perspective view illustrating orientation treatment by an orientation film photoalignment method in a method of producing the liquid crystal display element mentioned above.

An OCB mode liquid crystal display element in accordance with the present invention is now described using FIG. 11. FIG. 11 is a perspective view schematically showing the orientation state of liquid crystal molecules in one pixel. In an orientation film 201 shown in the same figure, there is a high pretilt angle region 201a in the central portion of the pixel region for orienting liquid crystal molecules at a high pretilt angle and a low pretilt angle region 201b for orienting liquid crystal molecules at a low pretilt angle. By providing the high pretilt angle region 201a, it is possible to form, in a liquid crystal layer showing splay alignment, a region having a large distortion in liquid crystal alignment, in other words a transition seed generation region. As a result, when voltage is applied, liquid crystal molecules in the transition seed generation region rise first, ensuring the generation of transition seeds. With the transition seeds as the center, the region in a bend alignment state expands, greatly facilitating the transition of the whole liquid crystal layer from splay alignment to bend alignment.

It is desirable that the pretilt angle $\alpha$ of liquid crystal molecules in the high pretilt angle region 201a be in the range of 5° to 20°. When less than 5°, transition seeds cannot be generated when a voltage is applied, and when higher than 20°, disclination is generated. It is desirable that the pretilt angle $\beta$ in the low pretilt angle region 201b be in the range of 3° to 10°. When less than 3°, transition of the liquid crystal in all areas of the pixel regions is not achieved. When higher than 10°, coloration is observed. Specifically, $\alpha$ and $\beta$ are set such that $\alpha > \beta$.

The area of the high pretilt angle region 6a should be, for example, approximately 10–1000 $\mu m^2$. When the area is less than 10 $\mu m^2$, the transition seed generation region cannot be formed. On the other hand, when greater than 1000 $\mu m^2$, coloration arises.

The orientation film is composed of a group of adsorbed molecules (thin film component molecules) that are chemisorbed to the substrate surface and is a monomolecular chemisorbed film having a construction such that a photosensitive group portion of the adsorbed molecules is polymerized and fixed in a specified direction. In addition, the thin film has a construction wherein the thin film component molecules of the orientation film 201 are inclined and oriented in the direction shown by arrow A in FIG. 12, and the photosensitive group portion is polymerized in the same direction. Thus, the orientation film 201 differs from orientation films intended for multidomain-type displays in that the orientation controlling direction induced in the liquid crystal molecules is the same for both the high pretilt angle region 201a and the low pretilt angle region 201b. The thin film component molecules are adsorbed in a state wherein the inclination angle of the thin film component molecules (the angle formed by the long axis of the thin film component molecules and the substrate surface) in the high pretilt angle region 201a is smaller than the inclination angle of the thin film component molecules in the low pretilt angle region 201b.

The orientation film 6 is a monomolecular chemisorbed film wherein a group of adsorbed molecules are chemisorbed to the substrate surface. The group of adsorbed molecules includes at least adsorbed molecules having photosensitive groups, the photosensitive group portion being polymerized and fixed in a specified direction. Because the adsorbed molecules are disposed in an orderly manner on the substrate, an orientation film having excellent orientation uniformity is realized. In addition, because the thickness of the film is the same as the length of the molecules due to the fact that it is a monomolecular film, the thickness of the film can be controlled very uniformly. Thus, it is made possible to reduce degradation of display characteristics such as variances in driving voltages, sticking, and the like which arise from unevenness in thickness. In employing an orientation treatment carried out using a photoalignment method described hereinafter, the dose of polarized ultraviolet light may also be reduced. This is because the anisotropic light reaction can be easily induced in a desired direction when photosensitive groups are exposed on the outermost surface. It should be noted that the orientation film 6 is not limited to a monomolecular chemisorbed film, but that it is possible to employ, for example, polymer orientation films composed of polyvinyl, polyimide, or the like and having photosensitive groups.

Cinnamoyl groups or chalconyl groups are suitable for the photosensitive groups. By providing such photosensitive groups, it is made possible to reduce the irradiation intensity of polarized ultraviolet light when photoalignment treatment is carried out and to shorten tact time. Chalconyl groups are particularly sensitive to ultraviolet light, and thus an even greater shortening of tact time can be realized. In addition, the molecular structure of the adsorbed molecules may have a linear hydrocarbon chain. When a linear hydrocarbon chain is contained, silane-based compound molecules can be disposed on a substrate in an orderly manner and adsorbed at a high density, thereby making it possible to realize an orientation film that is excellent in terms of orientation. It should be noted that while the orientation film 201 has been described, for the most part, the same applies to the orientation film provided on the counter substrate side.

In FIG. 11, the planar shape of the high pretilt region 201a is rectangular, but the present invention is not limited to this. For example, the planar shape may be circular. It is sufficient that at least one high pretilt region be provided in the entire display portion of each of the pixels and the like.

A method of producing a liquid crystal display element 10 in accordance with the present invention is described. In this example, for the orientation films, monomolecular thin films composed of chemisorbed groups of silane-based compound molecules are described.

First, pixel electrodes are formed on a substrate 1 by a known method. A silane-based compound (chemisorption substance) having at least a photosensitive group is then dissolved in a nonaqueous organic solvent and a chemisorption solution is prepared. This chemisorption substance is then contacted to the substrate 1 and the molecules of the chemisorption substance in the chemisorption solution are chemisorbed to the substrate surface.

For example, when a compound provided with a photosensitive group and a trichlorosilane group, specifically $C_6H_5$—CH=CH—CO—$C_6H_4$O—$(CH_2)_6$—O—$SiCl_3$, is used for the silane-based compound, the chemisorption reaction represented by chemical reaction formula (1) occurs. In short, the chlorosilyl groups in the compound and OH groups on the substrate surface undergo a dehydrochlorination reaction, whereby the compound is chemisorbed to the substrate surface.

$$C_6H_5\text{—}CH\text{=}CH\text{—}CO\text{—}C_6H_4O\text{—}(CH_2)_6\text{—}O\text{—}SiCl_3 + HO\text{-substrate} \rightarrow C_6H_5\text{—}CH\text{=}CH\text{—}CO\text{—}C_6H_4O\text{—}(CH_2)_6\text{—}O\text{—}SiCl_2\text{—}O\text{-substrate} + HCl \quad (1)$$

Because the silane-based compound is highly reactive with water, the silane-based compound is deactivated when contained in a chemisorption solution having a lot of moisture. Therefore, in order that the chemisorption reaction be made to progress smoothly, it is desirable to use a nonaqueous solvent that does not contain active hydrogen groups such as OH groups and also to carry out the contacting of the solution with the surface of substrate in a dry atmosphere. In addition, a portion of the silane-based compound may remain in an undissolved state. A chemisorption solution in a supersaturated state is an example of such a solution.

When a polymer orientation film is used for the orientation film, a variety of known methods may be employed for the method of forming the film. Specifically, a polymer orientation film can be formed by applying, for example, an orientation material containing a polymer precursor or the like having a photosensitive group, to a substrate surface and subsequently, drying and baking the substrate.

After the step of forming the orientation film, a step of washing is carried out to remove unadsorbed silane-based compound on the substrate and form a monomolecular orientation film. Examples of washing methods that may be employed in this step include an immersion method, a steam washing method, and the like. The steam washing method is particularly effective in that excess unadsorbed silane-based compound on the front surface of the substrate can be forcibly removed by the penetrating power of the steam. It should be noted that when a chlorosilane-based compound, a variety of silane-based compound, is used for the chemisorption substance, it is desirable to use chloroform or N-methyl-2-pyrrolidinone for the washing solution. This is because chloroform is excellent for removing chlorosilane polymer that is formed by the reaction between chlorosilane-based compound and water.

After the step of washing, the substrate is then lifted from the washing container and left to drain and dry in a fixed upright position. Thus, the washing solution is drained only in the direction of gravity, making it possible to temporarily orient the chemisorbed molecules making up the thin film in the draining and drying direction. In particular, washing solutions having a boiling point of 200° C. or less are desirable as these solutions have excellent drying properties following draining. Another method of draining and orienting applicable to the present embodiment entails spraying gas on the substrate surface to bring about the draining of the washing liquid. With this method, the washing solution can be drained in a short period and only in the direction in which the gas was sprayed. In particular, use of a washing solution having a boiling point of 150° C. or higher is effective because the washing solution can be drained by the spraying of the gas without evaporation.

An orientation treatment (photoalignment with polarized light step) is carried out on the orientation film formed on the substrate by a photoalignment method. FIG. 12 is a perspective view illustrating orientation treatment by a photoalignment method. Unlike the conventional rubbing treatment, this photoalignment method eliminates the need for masking in which a protective film is used, making it possible to simplify the production process and prevent contamination and the like of the orientation film by a protective film. There is also no generation of dust and the like as there is when rubbing is carried out.

The orientation film 201 is a thin film composed of a chemisorbed group of silane-based compound molecules and has a construction such that most of the thin film component portion is exposed in an orderly manner on the surface. For these reasons, the film is sensitive to polarized light and can be provided with orientation anisotropy by low intensity polarized light irradiation. In addition, because the orientation film is an ultrathin film, occurrence of driving voltage loss, sticking, and the like is reduced, making it possible to realize an improvement in display characteristics.

Specifically, photoalignment is brought about by the following method. FIG. 12 is a perspective view for illustrating orientation treatment by photoalignment. As is shown in the same figure, first, polarized ultraviolet light 203 having, for example, a wavelength distribution in the neighborhood of 300 nm to 400 nm is applied, only a region 202a, where a high pretilt angle region 201a is to be formed, being covered by a mask (not shown in figure). The polarized ultraviolet light 203 is applied in a direction that forms an angle of θ1 with the substrate along the draining direction 205.

Polarized ultraviolet light 204 is applied to the region 202a, while only a region where a low pretilt region 201b is to be formed is covered in by a mask. The polarized ultraviolet light 204 is applied in a direction that forms an angle of θ2 with the substrate along the draining direction 205.

The planes of polarization of the polarized ultraviolet light line up with the draining direction from the draining step (in other words, with the thin film component portion). The irradiation intensity of the polarized ultraviolet light should be within the range of 50 mJ/cm$^2$ to 3000 mJ/cm$^2$ (wavelength: 365 nm). Specifically, when the pretilt angle of the liquid crystal molecules is controlled by the irradiation intensity of polarized ultraviolet light, it is necessary that irradiation intensity be set such that the irradiation intensity of the former polarized ultraviolet light be smaller than the irradiation intensity of the latter polarized ultraviolet light. The directions in which the polarized ultraviolet light is applied are set so as to form, along the draining direction, an angle of θ1 and θ2 within the range of 0° to 90° and more preferably within the range of 45° to 90°. Specifically, when the pretilt angle of the liquid crystal molecules is controlled by the irradiation intensity of polarized ultraviolet light, it is necessary to set θ1 formed by the polarized ultraviolet light so as to be greater than θ2 formed by the polarized ultraviolet light. For example, FIG. 5 shows a case in which θ1=45° and θ2=90°.

In this way, by carrying out a photoalignment treatment with polarized light, photosensitive groups in the thin film component molecules of the orientation film can be selectively photopolymerized, making it possible to induce crosslinking of the thin film components on the substrate surface in a direction parallel to the polarization direction. Furthermore, in the formation region of a pair of parallel electrodes, a high pretilt angle region capable of controlling the orientation of liquid crystal molecules at a high pretilt angle may be formed, while in the non-formation region, a low pretilt angle region capable of controlling the orientation of liquid crystal molecules at a low pretilt angle may be formed. In addition, by appropriately setting the irradiation intensity of the polarized ultraviolet light and the direction in which the polarized ultraviolet light is applied, orientation films capable of controlling the orientation of the liquid crystal molecules at a specified pretilt angle can be consistently reproduced.

The substrate 1 and the counter substrate 2 are then positioned at a specified distance with the film-formed sides on the inside, and the perimeters of the substrates are adhered and fixed together to fabricate an empty cell. A liquid crystal cell is then fabricated by injecting a liquid crystal into the empty cell, and subsequently, a TN mode liquid crystal display element of the present invention is fabricated by sandwiching the liquid crystal cell between a pair of polarizers.

As described above, in the method of producing a liquid crystal display element according to the present embodiment, the carrying out of an orientation treatment by the photoalignment method eliminates the need to form a photoresist (protective film) by photolithography for the carrying out of the conventional rubbing method. As a result, along with realizing a simplification in the production process, the formation and exfoliation of a photoresist becomes unnecessary, making it possible to prevent degradation of the surface of the orientation films. Furthermore, the generation of dust, which was a problem with rubbing treatment, does not arise with the photoalignment method, making it possible to prevent contamination of the orientation films.

In addition, with the photoalignment method, the fact that the irradiation intensity of polarized ultraviolet light, the polarization direction, and the direction of applied light can be controlled makes it possible to carry out an orientation treatment on the orientation films such that the orientation of the liquid crystal molecules is fixed in a desired direction and at a desired pretilt angle. In comparison with rubbing treatment, this orientation treatment can be reproduced very consistently, making it excellent for volume production.

If an orientation film is employed wherein groups of silane-based compound molecules each having a photosensitive group are adsorbed to the substrate surface, because the orientation film is an ultrathin film, occurrence of driving voltage loss, sticking, and the like is reduced, making it possible to produce a liquid crystal display element having improved display characteristics.

However, it is possible to perform the orientation treatment on an orientation film without photosensitive groups by a rubbing method. In such a case, it is sufficient to follow the procedure of a known method, though it is desirable that the rubbing direction substantially line up with the draining direction. As the film component molecules will have been oriented in the rubbing treatment direction in advance, the rubbing treatment may be performed lightly, the rubbing conditions having been eased in comparison to those of conventional rubbing treatments. As a result, the generation of dust is reduced. For an orientation film without photosensitive groups, a polyimide without photosensitive groups, for example, may be employed.

Examples of silane-based compounds usable for the present embodiment include the compounds listed below.

(1) $SiY_pCl_{3-p}$ (2) $CH_3(CH_2)_rSiY_qCl_{3-q}$ (3) $CH_3(CH_2)_sO(CH_2)_tSiY_qCl_{3-q}$ (4) $CH_3(CH_2)_u—Si(CH_3)_2(CH_2)_vSiY_qCl_{3-q}$ (5) $CFCOO_3(CH_2)_wSiY_qCl_{3-q}$

Note that p is an integer of 0–3, q is an integer of 0–2, r is an integer of 1–25, s is an integer of 0–12, t is an integer of 1–20, u is an integer of 0–12, v is an integer of 1–20, and w is an integer of 1–25. In addition, Y is one of hydrogen, an alkyl group, an alkoxyl group, a fluorine-containing alkyl group, and a fluorine-containing alkoxyl group.

It is also possible to use a trichlorosilane-based compound for the silane-based compound. Specifically, the compounds (6) to (14) shown below can be used.

(6) $CF_3(CH_2)_9SiCl_3$ (7) $CH_3(CH_2)_9OSiCl_3$ (8) $CH_3(CH_2)_9Si(CH_2)_2(CH_2)_{10}SiCl_3$ (9) $CH_3COO(CH_2)_{15}SiCl_3$

(10) $CF_3(CF_2)_7—(CH_2)_2—SiCl_3$

(11) $CF_3(CF_2)_7—C_6H_4—SiCl_3$

(12) $C_6H_5—CH=CH—CO—O—(CH_2)_6—O—SiCl_3$

(13) $C_6H_5—CO—CH=CH—C_6H_4O—(CH_2)_6—O—SiCl_3$

(14) $C_6H_5—CH=CH—CO—C_6H_4O—(CH_2)_6—O—SiCl_3$

Of the compounds listed above, the compound represented by expression (12) has a cinnamoyl group for the photosensitive group, and the compounds represented by the expressions (13) and (14) have a chalconyl group for the photosensitive group.

Instead of the chlorosilane-based compound, it is also possible to use an isocyanate-based compound having an isocyanate group or an alkoxy group in place of the chlorosilyl group. Specifically, examples include the compounds represented by the expression (15) and (16) below in which the chlorosilane group in the chlorosilane of expression (6) is substituted with an isocyanate group or an alkoxy group.

(15) $CH_3(CH_2)_9Si(OC_2H_5)_3$

(16) $CH_3(CH_2)_9Si(NCO)_3$

By using an isocyanate-based compound or an alkoxy-based compound, the generation of hydrochloric acid is prevented when either of the compounds is contacted to a substrate and chemisorption is brought about. For this reason, TFTs or the like provided on the substrate are not damaged, and there is the additional advantage that these compounds are easy to use.

Examples for an organic solvent that dissolves silane-based compounds include a hydrocarbon-based solvent that does not contain water, a fluorocarbon-based solvent, and a silicone-based solvent. Examples usable for a petroleum-based solvent include petroleum naphtha, solvent naphtha, petroleum ether, petroleum benzene, isoparaffin, normal paraffin, decalin, industrial gasoline, kerosene, ligroin, dimethyl silicone, phenyl silicone, alkyl modified silicone, polyester silicone, and the like. For a fluorocarbon-based solvent, a flon-based solvent, Fluorinert (tradename, available from 3M), Afluid (tradename, available from Asahi Glass Co., Ltd), or the like can be used. These solvents may be used individually or by mixing two or more solvents together supposing the solvents are compatible. In particular, silicone has little moisture and does not easily absorb moisture, and silicone serves to prevent direct contact of a chlorosilane-based compound with moisture by solvation of the chlorosilane-based compound. Thus, by employing a solvent that is composed of a chlorosilane-based compound and silicone, adverse effects caused by moisture in the atmosphere when the solvent is contacted to a substrate layer are prevented, making it possible to chemisorb the chlorosilane-based compound to the exposed OH groups on the substrate layer.

On the substrates, in addition to the pixel electrodes and the counter electrode, wiring composed of an ITO film or an Al film, TFTs, and protective films composed of an $SiO_2$ film or $SiN_x$ are provided in advance. On the counter substrate, a color filter composed of, for example, an acrylic-based or silicone-based polymer film is provided. Spacers composed of an acrylic-based or silicone-based polymer material are integrally formed with either the substrate or the counter substrate so as to be provided thereon. Of all the members described above, because the distribution density of OH groups, which serve as adsorption sites, is high on the surfaces of the $SiO_2$ or $SiN_x$ film, even more of the silane-based compound molecules can be adsorbed. Thus, it is made possible to form orientation films that are excellent in terms of orientation characteristics. By contrast, the distribution density of OH groups on the wiring and the electrodes, which are composed of an ITO film or an Al film, the TFTs, and the like is low. As for the color filter and the spacers, OH groups are almost nonexistent. Thus, in order to adsorb a silane-based compound to the surfaces of these members also and to form an orientation film having high quality film characteristics, it is necessary to carry out a hydrophilization treatment to increase the number of adsorption sites. In the present embodiment, various known methods may be employed for the hydrophilization treatment. Specifically, examples include a method wherein an $SiO_2$ or $SiN_x$ film is formed on regions to be made hydrophilic, a $UV-O_3$ treatment wherein ultraviolet is applied under an ozone atmosphere, or the like.

Examples for the washing solution employed in the washing step include a hydrocarbon-based solvent that does not contain water, a fluorocarbon-based solvent, and a silicone-based solvent. Examples usable for a petroleum-based solvent include petroleum naphtha, solvent naphtha, petroleum ether, petroleum benzene, isoparaffin, normal paraffin, decalin, industrial gasoline, kerosene, ligroin, dimethyl silicone, phenyl silicone, alkyl modified silicone, polyester silicone, and the like. For a fluorocarbon-based solvent, a flon-based solvent, Fluorinert (tradename, available from 3M), Afluid (tradename, available from Asahi Glass Co., Ltd), or the like can be used. These solvents may be used individually or by mixing two or more solvents together supposing the solvents are compatible.

EXAMPLE 2

First, for the formation of orientations films, a solution for the fabrication of orientation films was prepared. Specifically, $C_6H_5—CH=CH—CO—O—(CH_2)_6—O—SiCl_3$ was mixed and dissolved in hexamethyldisiloxane under a dry atmosphere to form a $10^{-3}$ mol/L solution.

As shown in FIG. 2(a), a substrate for TN mode, pixel electrodes having been formed thereon in advance, was provided and the solution described above applied to the substrate surface under a dry atmosphere (relative humidity of 5% or less). A printing press was used in the application. The thickness of the applied film was made to be approximately 1 $\mu$m. After the hexamethyldisiloxane contained in the applied film was evaporated, the substrate was then baked for a specified length of time to form an orientation film (see FIG. 2(b)).

The substrate having an orientation film formed thereon was then immersed in chloroform, a nonaqueous solvent, and the substrate was washed (washing step, see FIG. 2(c)). In a fixed upright position, the substrate was then lifted from the chloroform and the chloroform was drained (draining orientation step, see FIG. 2(d)). The draining direction was made to be parallel to the direction of the long side of the comb-shaped electrode portions provided on the substrate. Thus, molecules making up the orientation film were inclined in the draining direction, the direction opposite to the direction of lifting, and oriented accordingly.

After the draining orientation step, polarized ultraviolet light was applied utilizing masking with a photomask. Specifically, each pixel region (80 $\mu$m×240 $\mu$m) was separated into an inner region (50 $\mu$m×210 $\mu$m) and a rectangular frame-shaped region (perimeter portion), and polarized ultraviolet light applied with the rectangular frame-shaped region being masked. The polarization direction of the ultraviolet light was lined up with the draining direction, and the direction of the applied light was set so as to be perpendicular to the substrate surface along the draining direction. Irradiation intensity was set at 400 mJ/cm$^2$.

Using a photomask differing from the photomask used above, the inner region was masked and polarized ultraviolet light again applied. The polarization direction of the ultraviolet light was lined up with the draining direction, but the direction of the applied light was set so as to form a 45° angle with the substrate surface along the draining direction. Irradiation intensity was set at 400 mJ/cm$^2$.

An orientation film for the counter substrate having a high pretilt angle region and a low pretilt angle region was fabricated by carrying out each of the steps in sequence.

Spacers were then dispersed on one of the substrates and sealing material was applied on the perimeter of one of the substrates so that the application formation was a frame shape. The substrate and the counter substrate were then adhered together. In this process, the orientation treatment direction of the orientation film provided on one substrate and the orientation treatment direction of the orientation film provided on the counter substrate were positioned so as to form an angle of 90°.

A liquid crystal material was then injected between the substrate and the counter substrate to form a liquid crystal display element C of the present invention.

COMPARATIVE EXAMPLE 2

In the present comparative example 2, the irradiation of the substrates with polarized ultraviolet light was such that the polarization direction of the ultraviolet light was lined up with the draining direction, and except that light was applied without using a photomask in a direction perpendicular to the substrate surfaces along the draining direction, a liquid crystal display element D for comparison was fabricated in the same manner as the element of example 2.

COMPARATIVE EXAMPLE 3

In the present comparative example 3, the irradiation of both substrates with polarized ultraviolet light was such that the polarization direction of the ultraviolet light was lined up with the draining direction, and except that light was applied without using a photomask in a direction forming an angle of 45° with the substrate surfaces along the draining direction, a liquid crystal display element E for comparison was fabricated in the same manner as the element of example 2.

Conditions of Film Fabrication and Display Characteristics

In addition to measuring the pretilt angles of the liquid crystal display element C for comparison and the liquid crystal display element E for comparison, respectively, orientation defects of liquid crystal during operation, hue, and viewing angle were observed. The results are shown in Table 2.

TABLE 2

| | Liquid crystal display element | | |
|---|---|---|---|
| | C | D | E |
| Pretilt angle | Inner regions: 3 Transverse electric field suppressing regions: 5 | 3 | 5 |
| Liquid crystal orientation defects during operation | None | Transverse electric field disclination generation | None |
| Hue | Good | Good | Not so good |
| Viewing angle | Good | Symmetrical | Nonsymmetrical |

As is understood from Table 2, in the liquid crystal display element C of the present invention, the pretilt angle of liquid crystal molecules in the transverse electric field suppressing regions was approximately 5°. The pretilt angle of liquid crystal molecules in the other region, the inner region, was approximately 3°. During operation, there were no orientation defects, hue was good, and viewing angle characteristics, including symmetry of the viewing angle, were excellent.

By contrast, in the liquid crystal display element D for comparison, the pretilt angle of liquid crystal molecules was approximately 3° in all regions of the pixel electrodes. Although hue and viewing angle were good, transverse electric field disclination generation was confirmed around the edges of the pixel electrodes, i.e. in the perimeter portions of the pixel regions. As for the liquid crystal element E for comparison, the pretilt angle of liquid crystal molecules was approximately 5° in all regions of the pixel electrodes. Transverse electric field disclination was generated in the perimeter portions of the pixel regions, hue was not so good, and viewing angle characteristics, including lack of symmetry of viewing angle, were not good. Thus, it is shown that the liquid crystal display element C of the present invention is superior to the liquid crystal display elements D and E for comparison produced by conventional production methods in that the generation of orientation defects caused by a transverse electric field are prevented and hue and viewing angle characteristics are excellent.

EXAMPLE 3

First, for the formation of orientation films, a solution for the fabrication of orientation films was prepared. Specifically, $C_6H_5$—CH=CH—CO—O—$(CH_2)_6$—O—$SiCl_3$ was mixed and dissolved in hexamethyldisiloxane under a dry atmosphere to form a $10^{-3}$ mol/L solution.

As is shown in FIG. 2(a), a substrate for IPS mode was provided and the solution described above applied to the substrate surface under a dry atmosphere (relative humidity of 5% or less). A printing press was used in the application. The thickness of the applied film was made to be approximately 1 $\mu$m. After the hexamethyldisiloxane contained in the applied film was evaporated, the substrate was then baked for a specified length of time to form an orientation film (see FIG. 2(b)).

The substrate having an orientation film formed thereon was then immersed in chloroform, a nonaqueous solvent, and the substrate was washed (washing step, see FIG. 2(c)). In a fixed upright position, the substrate was then lifted from the chloroform and the chloroform was drained (draining orientation step, see FIG. 2(d)). The draining direction was made to be parallel to the direction of the long side of the comb-shaped electrode portions provided on the substrate. Thus, molecules making up the orientation film were inclined in the draining direction, the direction opposite to the direction of lifting, and oriented accordingly.

After the draining orientation step, polarized ultraviolet light was applied utilizing masking with a photomask. Specifically, comb-shaped electrode formation regions were masked by a photomask and polarized ultraviolet light was applied. The polarization direction of the ultraviolet light was lined up with the draining direction, and the direction of the applied light was set so as to be perpendicular to the substrate surface along the draining direction. Irradiation intensity was set at 400 mJ/cm$^2$.

Using a photomask differing from the photomask used above, the region other than the comb-shaped electrode formation regions was masked, and polarized ultraviolet light was again applied. The polarization direction of the ultraviolet light was lined up with the draining direction, but the direction of the applied light was set so as to form a 45° angle with the substrate surface along the draining direction. Irradiation intensity was set at 400 mJ/cm².

An orientation film for the counter substrate having high pretilt angle regions and a low pretilt angle region was fabricated by carrying out each of the steps in sequence.

Spacers were then dispersed on one of the substrates and sealing material was applied on the perimeter of one of the substrates so that the application formation was a frame shape. The substrate and the counter substrate were then adhered together. In this process, the orientation treatment direction of the orientation film provided in one substrate and the orientation treatment direction of the orientation film provided in the counter substrate were positioned so as to form an angle of 90°.

A liquid crystal material was then injected between the substrate and the counter substrate to form a liquid crystal display element F of the present invention.

COMPARATIVE EXAMPLE 4

In the present comparative example 4, the irradiation of the substrates with polarized ultraviolet light was such that the polarization direction of the ultraviolet light was lined up with the draining direction, and except that light was applied, without using a photomask, in a direction perpendicular to the substrate surfaces along the draining direction, a liquid crystal display element G for comparison was fabricated in the same manner as the element of example 3. Conditions of Film Fabrication and Display Characteristics Pretilt angle and response speed of the liquid crystal during operation were measured in the liquid crystal display element F of the present invention and in the liquid crystal display element G for comparison, respectively. The results are shown in Table 3. Note that response speed was obtained by measuring the response time for a change in transmissivity from 10% to 90%.

TABLE 3

| | Liquid crystal display element | |
|---|---|---|
| | F | G |
| Pretilt angle (degrees) | Formation regions: 5<br>Non-formation region: 3 | 3 |
| Response speed (ms) | 30 | 40 |

As is understood from Table 3, in the liquid crystal display element F of the present invention, the pretilt angle of the liquid crystal molecules in the comb-shaped electrode non-formation regions was approximately 5°. The pretilt angle of liquid crystal molecules in the comb-shaped electrode non-formation region was approximately 3°. Response speed was approximately 30 ms. By contrast, in the liquid crystal display element G for comparison, the pretilt angle of liquid crystal molecules of the substrate having the comb-shaped electrodes and that of liquid crystal molecules of the substrate having the counter electrode was approximately 3°. Response speed was approximately 40 ms. Thus, it is shown that the liquid crystal display element F of the present invention is superior to the liquid crystal element G for comparison produced by a conventional production method in terms of response speed.

EXAMPLE 4

First, for the formation of orientation films, a solution for the fabrication of orientation films was prepared. Specifically, $C_6H_5$—CH=CH—CO—O—$(CH_2)_6$—O—$SiCl_3$ was mixed and dissolved in hexamethyldisiloxane under a dry atmosphere to form a $10^{-3}$ mol/L solution.

As shown in FIG. 2(a), a substrate for TN mode, pixel electrodes having been formed thereon in advance, was provided and the solution described above applied to the substrate surface under a dry atmosphere (relative humidity of 5% or less). A printing press was used in the application. The thickness of the applied film was made to be approximately 1 μm. After the hexamethyldisiloxane contained in the applied film was evaporated, the substrate was then baked for a specified length of time to form an orientation film (see FIG. 2(b)).

The substrate having an orientation film formed thereon was then immersed in chloroform, a nonaqueous solvent, and the substrate was washed (washing step, see FIG. 2(c)). In a fixed upright position, the substrate was then lifted from the chloroform and the chloroform was drained (draining orientation step, see FIG. 2(d)). The draining direction was made to be parallel to the direction of the long side of the comb-shaped electrode portions provided on the substrate. Thus, molecules making up the orientation film were inclined in the draining direction, the direction opposite to the direction of lifting, and oriented accordingly.

After the draining orientation step, polarized ultraviolet light was applied utilizing masking with a photomask. Specifically, a center portion (20 μm×20 μm) of each pixel region (80 μm×240 μm) was masked, and polarized ultraviolet light applied. The polarization direction of the ultraviolet light was lined up with the draining direction, and the direction of the applied light was set so as to be perpendicular to the substrate surface along the draining direction. Irradiation intensity was set at 400 mJ/cm².

Using a photomask differing from the photomask used above, the inner region was masked and polarized ultraviolet light again applied. The polarization direction of the ultraviolet light was lined up with the draining direction, but the direction of the applied light was set so as to form a 45° angle with the substrate surface along the draining direction. Irradiation intensity was set at 400 mJ/cm².

An orientation film for the counter substrate having a high pretilt angle region and a low pretilt angle region was fabricated by carrying out each of the steps in sequence.

Spacers were then dispersed on one of the substrates and sealing material was applied on the perimeter of one of the substrates so that the application formation was a frame shape. The substrate and the counter substrate were then adhered together.

A liquid crystal material was then injected between the substrate and the counter substrate to form a liquid crystal display element H of the present invention.

COMPARATIVE EXAMPLE 5

In the present comparative example 5, the irradiation of the substrates with polarized ultraviolet light was such that the polarization direction of the ultraviolet light was lined up with the draining direction, and except that light was applied, without using a photomask, in a direction perpendicular to the substrate surfaces along the draining direction, a liquid crystal display element I for comparison was fabricated in the same manner as the element of example 4.

COMPARATIVE EXAMPLE 6

In the present comparative example 6, orientation films were formed on the substrates in the same manner as those of example 4 except that rubbing treatment was carried out instead of a photoalignment method. After masking a center portion (20 μm×20 μm) of each pixel region (80 μm×240 μm), the surface was rubbed at a speed of 500 m/min. in the draining direction and the direction opposite to the draining direction to a groove depth of 0.1 mm. Thus, orientation films having transition seeds were formed on the substrates. Using these substrates, a liquid crystal display element J was fabricated in the same manner as the element of example 4. Conditions of Film Fabrication and Display Characteristics Along with measuring pretilt angle in the liquid crystal display element H of the present invention and in the liquid crystal display element I for comparison, respectively, the splay-bend transition voltage of each was measured. Using a polarized light microscope, the orientation uniformity of the liquid crystal during operation, in other words, the degree of unevenness in brightness, was observed. The results are shown in Table 4. Orientation uniformity was evaluated as good in the case of uniform and good brightness and as fair in the case of somewhat non-uniform brightness.

TABLE 4

|  | Liquid crystal display element | | |
| --- | --- | --- | --- |
|  | H | I | J |
| Pretilt angle (degrees) | Transition seed regions: 7 Other regions: 2 | 2 | Transition seed regions: 5 Other regions: 3 |
| Splay-bend transition voltage (V) | 20 | 26 | 21 |
| Orientation uniformity | Transition seed regions: good Other regions: good | All regions of pixels: good | Transition seed regions: good Other regions: fair |

As is understood from Table 4, in the liquid crystal display element H of the present invention and the liquid crystal display element J for comparison, transition seed regions in which liquid crystal molecules have a pretilt angle of approximately 7° and 5°, respectively, were formed. When voltage was applied and each of the liquid crystal display elements driven, it was shown that the liquid crystal display element H of the present invention had a lower splay-bend transition voltage than the liquid crystal display elements H and J for comparison.

In addition, the liquid crystal display element H of the present invention, which employed a photoalignment method for the orientation treatment, showed superior orientation uniformity in both the transition angle regions and the other regions in comparison to the liquid crystal display element J for comparison in which rubbing treatment was employed. This was achieved by the liquid crystal display element H of the present invention because deterioration of the orientation film boundary surface was prevented, as it was not necessary to remove a resist or the like.

Examples of the Third Invention Group

Embodiment 3

The present embodiment provides a liquid crystal display element having excellent display characteristics achieved by making the anchoring energy of orientation films with respect to liquid crystal molecules different from one another, the orientation films being provided on two opposing substrates.

In the present embodiment, this is achieved by applying polarized light under varying irradiation conditions, specifically, by applying polarized light of varying irradiation intensity and at varying angles with the substrates. Different irradiation intensities of polarized light cause different degrees of crosslinking and breaking up of crosslinking among molecules having photosensitive groups. Thus, orientation films that induce different anchoring energies in liquid crystal molecules are obtained.

In addition, when polarized light is applied at varying angles with the substrates, polar anchoring energy and azimuthal anchoring energy change according to the angle at which the light is applied.

Photoalignment is desirable as it facilitates the controlling of anchoring energy according to irradiation conditions of the polarized light.

The polarized ultraviolet light should have a wavelength distribution in the neighborhood of 300 nm to 400 nm and the dose should be from approximately 50 $mJ/cm^2$ to 3000 $mJ/cm^2$ at a wavelength of 365 nm. In particular, at a dose of 1000 $mJ/cm^2$ or greater, the orientation of the liquid crystal display element easily changes into a homogeneous orientation suitable for an IPS mode liquid crystal display element.

In particular, in consideration of the driving principle of an IPS mode liquid crystal display element, the anchoring energy, with respect to liquid crystal molecules, of the orientation film near the substrate without electrodes is made smaller than the anchoring energy, with respect to liquid crystal molecules, of the orientation film near the substrate having electrodes. While this does not result in a change in the threshold voltage, the voltage needed to attain a 90° twist in the liquid crystal layer decreases, and with regard to voltage-transmissivity characteristics, the change in transmissivity is steep in the vicinity of the threshold voltage.

Other aspects of the construction are like that of embodiment 1.

EXAMPLE 5

Except for irradiating a first substrate with ultraviolet light at a polarized light intensity of 1000 $mJ/cm^2$ (365 nm) and a second substrate with ultraviolet light at a polarized light intensity of 500 $mJ/cm^2$ (365 nm), an IPS mode liquid crystal display element K of the present invention was fabricated according to the same conditions as that of example 1.

EXAMPLE 5

Except for irradiating a first substrate with ultraviolet light at a polarized light intensity of 1000 $mJ/cm^2$ (365 nm) and a second substrate with ultraviolet light at a polarized light intensity of 500 $mJ/cm^2$ (365 nm), an IPS mode liquid crystal display element K of the present invention was fabricated according to the same conditions as that of example 1.

COMPARATIVE EXAMPLE 7

Except for irradiating a first and a second substrate with ultraviolet light at a polarized light intensity of 500 $mJ/cm^2$ and irradiating a first and a second substrate with ultraviolet light at a polarized light intensity of 1000 $mJ/cm^2$, liquid crystal display elements L and M for comparison were fabricated in the same manner as the element of example 5. Conditions of Film Fabrication and Display Characteristics Initial orientation and display characteristics of the liquid crystal display element K of the present invention and the liquid crystal display elements L and M for comparison were investigated. For initial orientation characteristics, a polarized light microscope was used to observe orientation uniformity of the liquid crystal (variances in brightness). For display characteristics, voltage-transmissivity characteristics and contrast ratio given these voltage-transmissivity characteristics were investigated. The results are shown in Table 5. In addition, azimuthal anchoring energy in the IPS mode liquid crystal display elements E and F was measured.

TABLE 5

| | Liquid crystal display element | | |
|---|---|---|---|
| | K | L | M |
| Initial Orientation | Orientation is uniform | Orientation has variances | Orientation is uniform |
| Voltage-transmissivity characteristics V: voltage (V) T: transmissivity (%) | V = 3.71, T = 10 V = 5.02, T = 90 ΔV (10, 90) = 1.31 | V = 2.64, T = 10 V = 4.72, T = 90 ΔV (10, 90) = 2.38 | V = 3.89, T = 10 V = 5.83, T = 90 ΔV (10, 90) = 1.94 |
| Contrast ratio | 300 | 220 | 340 |
| Azimuthal anchoring energy | Not measured | $2.3 \times 10^{-4}$ J/m$^2$ | $1.2 \times 10^{-4}$ J/m$^2$ |

From the results of the measurement of azimuthal anchoring energy of the IPS mode liquid crystal display elements L and M, it was presumed that the azimuthal anchoring energy above the first substrate of the IPS mode liquid crystal display element K was $1.2 \times 10^{-4}$ J/m$^2$ and that the azimuthal anchoring energy above the second substrate was $2.3 \times 10^{-4}$ J/m$^2$. Thus, K could demonstrate advantageous effects so as to be an IPS mode liquid crystal display element of the present invention.

It was understood that substantially the same initial orientation and contrast ratio could be obtained with the IPS mode liquid crystal display element K, in which the azimuthal anchoring energy at the second substrate is smaller than that at the first substrate, as could be obtained with the IPS mode liquid crystal display element M, in which the azimuthal anchoring energy at the first and the second substrates is the same. As for the steepness of the transmission, the voltage difference between 10% and 90% transmissivity was smaller with K than with L and M, in other words, it was shown that driving in K showed steeper transmission. Thus, with the IPS mode liquid crystal display element of the present invention, an IPS mode liquid crystal display element having an even greater number of scan lines can be provided.

Examples of the Fourth Invention Group

Embodiment 4

The liquid crystal display element of the present embodiment has a liquid crystal sandwiched between two opposed substrates each having an orientation film, wherein at least one of the orientation films contains molecules having a photosensitive group. By irradiating the molecules having a photosensitive group with polarized light, at least two regions having different orientation anisotropics are provided, the anchoring energy with respect to liquid crystal molecules also being different in correspondence with the orientation anisotropics of the regions of the orientation films.

Other aspects of construction are like that of embodiments 2 and 3.

Polarized light is applied to the substrate having the orientation film formed thereon under varying irradiation conditions. As a result, anchoring energies are obtained such that the anchoring energy with respect to liquid crystal molecules corresponds to the orientation anisotropy of each region of the orientation film, thereby achieving similar advantageous effects as are achieved when the pretilt angle of liquid crystal molecules is varied, such as an improvement in display characteristics. Varying anchoring energy also makes it possible to control the driving voltage of each region.

Embodiment 4-1

The liquid crystal display element of the present embodiment has substantially the same structure as that of embodiment 2-1.

The suppressing of reverse tilt caused by a transverse electric field from other pixels is achieved by making polar anchoring energy larger. By making the polar anchoring energy of the perimeter portions of the pixel regions of the liquid crystal layer greater than the polar anchoring energy of the inner regions of the pixel regions, a transverse electric field suppressing region is formed in each pixel region of a TN mode liquid crystal display element.

EXAMPLE 6

Except for applying polarized light having an irradiation intensity of 800 mJ/cm$^2$ to the perimeter portions of the pixel regions in an irradiation direction that forms an angle of 45° with the substrates and is lined up with the draining direction and applying polarized light having an irradiation intensity of 400 mJ/cm$^2$ to the inner regions in an irradiation direction that forms an angle of 45° with the substrates and is lined up with the draining direction, a liquid crystal display element N of the present invention is fabricated in the same manner as the element of example 2.

EXAMPLE 8

Except for applying, without using a photomask, polarized light having an irradiation intensity of 400 mJ/cm$^2$ to all areas of the pixel regions in an irradiation direction that forms an angle of 45° with the substrates and is lined up with the draining direction, a liquid crystal display element O for comparison is fabricated in the same manner as the element of example 6.

COMPARATIVE EXAMPLE 9

Except for applying, without using a photomask, polarized light having an irradiation intensity of 800 mJ/cm$^2$ to all areas of the pixel regions in an irradiation direction that forms an angle of 45° with the substrates and is lined up with the draining direction, a liquid crystal display element P for comparison is fabricated in the same manner as the element of example 6.

Conditions of Film Fabrication and Display Characteristics

Polar anchoring energy and pretilt angle in the liquid crystal display element N of the present invention and the liquid crystal display elements O and P for comparison were measured. Using a polarized light microscope, liquid crystal orientation defects and hue during operation were observed. The results are shown in Table 6.

TABLE 6

| | Liquid crystal display element | | |
|---|---|---|---|
| | N | O | P |
| Polar anchoring energy (J/m$^2$) | Inner regions: 5.1 × 10$^{-5}$ Perimeter portions: 1.2 × 10$^{-4}$ | 5.1 × 10$^{-5}$ | 1.2 × 10$^{-4}$ |
| Pretilt angle | Center portions: 3 Perimeter portions: 3 | 3 | 3 |
| Voltage-transmissivity characteristics V: voltage (V) T: transmissivity (%) | V = 2.31, T = 10 V = 4.61, T = 90 ΔV (10, 90) = 2.30 | V = 2.25, T = 10 V = 4.48, T = 90 ΔV (10, 90) = 2.23 | V = 2.51, T = 10 V = 5.18, T = 90 ΔV (10, 90) = 2.67 |
| Liquid crystal orientation defects during operation | None | Generation of disclination at electrode edges | none |
| Hue | Good | Good | Not so good |

As is understood from Table 6, the liquid crystal display element N of the present invention is such that voltage during operation is low, there are no liquid crystal defects, and hue and viewing angle characteristics are excellent.

Embodiment 4-2

A liquid crystal display element of the present embodiment has substantially the same construction as that of embodiment 2-2.

EXAMPLE 7

Except for applying polarized light having an irradiation intensity of 800 mJ/cm$^2$ to electrode formation regions in an irradiation direction that is perpendicular to the substrates and is lined up with the draining direction and applying polarized light having an irradiation intensity of 400 mJ/cm$^2$ to a non-formation region in an irradiation direction that is perpendicular to the substrates and is lined up with the draining direction, a liquid crystal display element Q of the present invention is fabricated in the same manner as the element of example 3.

COMPARATIVE EXAMPLE 10

Except for applying, without using a photomask, polarized light having an irradiation intensity of 400 mJ/cm$^2$ to all areas of the pixel regions in an irradiation direction that is perpendicular to the substrates and is lined up with the draining direction, a liquid crystal display element R for comparison is fabricated in the same manner as the element of example 7.

COMPARATIVE EXAMPLE 11

Except for applying, without using a photomask, polarized light having an irradiation intensity of 400 mJ/cm$^2$ to all areas of the pixel regions in an irradiation direction that is perpendicular to the substrates and is lined up with the draining direction, a liquid crystal display element S for comparison is fabricated in the same manner as the element of example 7.

Conditions of Film Fabrication and Display Characteristics

Polar anchoring energy, azimuthal anchoring energy, and pretilt angle in the liquid crystal display element Q of the present invention and the liquid crystal display elements R and S for comparison were measured. Using a polarized light microscope, liquid crystal orientation defects and hue during operation were observed. The results are shown in Table 7.

TABLE 7

| | | Liquid crystal display element | | |
|---|---|---|---|---|
| | | Q | R | S |
| Azimuthal anchoring energy (J/m$^2$) | Electrode portions: 1.2 × 10$^{-3}$ Non-formation region: 2.3 × 10$^{-3}$ | 2.3 × 10$^{-3}$ | 1.2 × 10$^{-3}$ |
| Polar anchoring energy (J/m$^2$) | Electrode portions: 3.2 × 10$^{-3}$ Non-formation region: 1.9 × 10$^{-3}$ | 1.9 × 10$^{-3}$ | 3.2 × 10$^{-3}$ |
| Pretilt angle (°) | Center portions: 1 Non-formation region: 1 | 1 | 1 |
| Voltage-transmissivity characteristics V: voltage (V) T: transmissivity (%) | V = 3.90, T = 10 V = 5.83, T = 90 ΔV (10, 90) = 1.97 | V = 3.70, T = 10 V = 5.53, T = 90 ΔV (10, 90) = 1.77 | V = 4.23, T = 10 V = 6.53, T = 90 ΔV (10, 90) = 2.30 |
| Hue | Uniformity within pixels | Non-uniformity at electrode portions and non-formation region | Non-uniformity at electrode portions and non-formation region |

From these results, it was understood that the IPS mode liquid crystal display element D of the present invention has uniform hue within the pixels and realizes an improvement in display characteristics.

Embodiment 4-3

A liquid crystal display element of the present embodiment has a construction substantially like that of embodiment 2-1.

The liquid crystal display element according to the present embodiment is such that by varying anchoring energy, transition seed generation regions are formed. Thus, because transition seed generation regions are formed without varying pretilt angle, the formation of the regions is achieved without affecting viewing characteristics even in areas such as pixel regions. It is though that anchoring energy in particular is related to the formulation of transition seed generation regions.

EXAMPLE 8

Except for applying polarized light having an irradiation intensity of 800 mJ/cm$^2$ to center portions of pixel regions in an irradiation direction that forms an angle of 45° with the substrates and is lined up with the draining direction and applying polarized light having an irradiation intensity of 400 mJ/cm$^2$ to perimeter portions in an irradiation direction that forms an angle of 45° with the substrates and is lined up with the draining direction, a liquid crystal display element T of the present invention was fabricated in the same manner as the element of example 4.

EXAMPLE 9

Except for applying polarized light having an irradiation intensity of 400 mJ/cm$^2$ to center portions of pixel regions in an irradiation direction that forms an angle of 45° with the substrates and is lined up with the draining direction and applying polarized light having an irradiation intensity of 800 mJ/cm² to perimeter portions in an irradiation direction that forms an angle of 45° with the substrates and is lined up with the draining direction, a liquid crystal display element U of the present invention was fabricated in the same manner as the element of example 4.

COMPARATIVE EXAMPLE 10

Except for applying, without using a photomask, polarized light having an irradiation intensity of 400 mJ/cm² to all areas of the pixel regions in an irradiation direction that is perpendicular to the substrates and is lined up with the draining direction, a liquid crystal display element V for comparison was fabricated in the same manner as the element of example 8.

COMPARATIVE EXAMPLE 11

Except for applying, without using a photomask, polarized light having an irradiation intensity of 800 mJ/cm² to all areas of the pixel regions in an irradiation direction that is perpendicular to the substrates and is lined up with the draining direction, a liquid crystal display element W for comparison was fabricated in the same manner as the element of example 8.

Conditions of Film Fabrication and Display Characteristics

Polar anchoring energy and splay-bend transition voltage in the liquid crystal display elements T and U of the present invention and the liquid crystal display elements V and W for comparison were measured. Using a polarized light microscope, the orientation uniformity of the liquid crystal (brightness variances) during operation was observed. The results are shown in Table 8. Orientation uniformity was evaluated as good in the case of uniform and good brightness and as fair in the case of somewhat non-uniform brightness.

TABLE 8

| | Liquid crystal display element | | | |
|---|---|---|---|---|
| | T | U | V | W |
| Polar anchoring energy (J/m²) | Transition seed regions: $5.1 \times 10^{-5}$ Other regions: $1.2 \times 10^{-4}$ | Transition seed regions: $1.2 \times 10^{-4}$ Other regions: $5.1 \times 10^{-5}$ | $5.1 \times 10^{-5}$ | $1.2 \times 10^{-4}$ |
| Splay-bend transition voltage (V) | 20 | 20 | 25 | 26 |
| Orientation Uniformity | Transition seed regions: good Other regions: good | Transition seed regions: good Other regions: good | Fair | Fair |

As is understood from these results, a liquid crystal display element of the present embodiment achieves a reduction in the splay-bend transition voltage. In addition, it is understood that a liquid crystal display element of the present embodiment improves brightness variance. It was determined that each transition seed region should be 5 μm square or larger.

Examples of the Fifth Invention Group

Embodiment 5

A liquid crystal display element of the present embodiment has regions having different liquid crystal molecule pretilt angles and different liquid crystal molecule anchoring energies at the orientation films in correspondence with the orientation anisotropies of the orientation films.

The construction of an element of the present embodiment is like that of elements of embodiments 1 and 3. A liquid crystal display element having the advantageous effects of both is provided.

Embodiment 6

A liquid crystal display element of the present embodiment has a plurality of regions having different liquid crystal molecule pretilt angles and different liquid crystal molecule anchoring energies at the orientation films in correspondence with the orientation anisotropies of the orientation films.

The construction of an element of the present embodiment is like that of embodiments 2 and 4. A liquid crystal display element having the advantageous effects of both is provided.

EXAMPLE 13

Except for applying polarized light having an irradiation intensity of 400 mJ/cm² to inner regions of the pixel regions in an irradiation direction that is perpendicular to the substrates and is lined up with the draining direction and applying polarized light having an irradiation intensity of 400 mJ/cm² to transverse electric field suppressing regions of the pixel regions in an irradiation direction that forms an angle of 45° with the substrates and is lined up with the draining direction, a liquid crystal display element 11 of the present invention was fabricated in the same manner as the element of example 2.

EXAMPLE 14

Except for applying polarized light having an irradiation intensity of 400 mJ/cm² to inner regions of the pixel regions in an irradiation direction that is perpendicular to the substrates and is lined up with the draining direction and applying polarized light having an irradiation intensity of 800 mJ/cm² to transverse electric field suppressing regions of the pixel regions in an irradiation direction that forms an angle of 90° with the substrates and is lined up with the draining direction, a liquid crystal display element III of the present invention is fabricated in the same manner as the element of example 2.

COMPARATIVE EXAMPLE 12

Except for applying, without using a photomask, polarized light having an irradiation intensity of 400 mJ/cm² to all areas of the pixel regions in an irradiation direction that is perpendicular to the substrates and is lined up with the draining direction, a liquid crystal display element IV for comparison is fabricated in the same manner as the element of example 13.

COMPARATIVE EXAMPLE 11

Except for applying, without using a photomask, polarized light having an irradiation intensity of 400 mJ/cm² to all areas of the pixel regions in an irradiation direction that forms an angle of 45° with the substrates and is lined up with the draining direction, a liquid crystal display element VI for comparison is fabricated in the same manner as the element of example 13.

Conditions of Film Fabrication and Display Characteristics

Polar anchoring energy and splay-bend transition voltage in the liquid crystal display elements II and III of the present invention and the liquid crystal display elements IV and VI for comparison were measured. Using a polarized light microscope, uniformity of the liquid crystal (brightness variances) during operation was observed. The results are shown in Table 9.

TABLE 9

| | Liquid crystal display element | | | |
|---|---|---|---|---|
| | II | III | IV | VI |
| Pretilt angle (°) | Inner regions: 3 Transverse electric field suppressing regions: 5 | Inner regions: 3 Transverse electric field suppressing regions: 3 | 3 | 5 |
| Polar anchoring energy (J/m$^2$) | Inner regions: 7.3 × 10$^{-5}$ Transverse electric field suppressing regions: 5.1 × 10$^{-5}$ | Inner regions: 7.3 × 10$^{-5}$ Transverse electric field suppressing regions: 1.7 × 10$^{-4}$ | 7.3 × 10$^{-5}$ | 5.1 × 10$^{-5}$ |
| Liquid crystal orientation defects | None | None | Transverse electric field disclination generation | None |
| Hue | Good | Good | Good | Not so good |
| Viewing angle | Symmetrical | Symmetrical | Symmetrical | Nonsymmetrical |

As is understood from the table, a TN mode liquid crystal display element of the present embodiment has no liquid crystal defects during operation and demonstrates excellent hue and viewing characteristics.

EXAMPLE 15

Except for applying polarized light having an irradiation intensity of 800 mJ/cm$^2$ to electrode formation regions in an irradiation direction that is perpendicular to the substrates and is lined up with the draining direction and applying polarized light having an irradiation intensity of 800 mJ/cm$^2$ to an electrode non-formation region in an irradiation direction that forms an angle of 45° with the substrates and is lined up with the draining direction, a liquid crystal display element i of the present invention was fabricated in the same manner as the element of example 3.

EXAMPLE 16

Except for applying polarized light having an irradiation intensity of 400 mJ/cm$^2$ to electrode formation regions in an irradiation direction that is perpendicular to the substrate and is lined up with the draining direction and applying polarized light having an irradiation intensity of 800 mJ/cm$^2$ to an electrode non-formation region in an irradiation direction that forms an angle of 45° with the substrates and is lined up with the draining direction, a liquid crystal display element ii of the present invention was fabricated in the same manner as the element of example 3.

COMPARATIVE EXAMPLE 12

Except for applying, without using a photomask, polarized light having an irradiation intensity of 800 mJ/cm$^2$ to all areas of the pixel regions in an irradiation direction that is perpendicular to the substrates and is lined up with the draining direction, a liquid crystal display element in for comparison was fabricated in the same manner as the element of example 15.

Conditions of Film Fabrication and Display Characteristics

Pretilt angle, azimuthal anchoring energy, and response speed in the liquid crystal display element i and ii of the present invention and in the liquid crystal display element iii for comparison were measured. The results are shown in Table 10.

TABLE 10

| | Liquid crystal display element | | |
|---|---|---|---|
| | i | ii | iii |
| Pretilt angle (°) | Formation regions: 5 Non-formation region: 3 | Formation regions: 3 Non-formation region: 3 | 3 |
| Polar anchoring energy (J/m$^2$) | Formation regions: 2.5 × 10$^{-4}$ Non-formation region: 3.2 × 10$^{-4}$ | Formation regions: 3.2 × 10$^{-4}$ Non-formation region: 1.9 × 10$^{-4}$ | 3.2 × 10$^{-4}$ |
| Response speed (ms) | 30 | 35 | 40 |

As is clear from the table, an IPS mode liquid crystal display element of the present embodiment realizes an improvement in response speed during operation.

EXAMPLE 17

Except for applying polarized light having an irradiation intensity of 800 mJ/cm$^2$ to electrode formation regions in an irradiation direction that forms an angle of 45° with the substrates and is lined up with the draining direction and applying polarized light having an irradiation intensity of 400 mJ/cm$^2$ to an electrode non-information region in an irradiation direction that is perpendicular to the substrates and is lined up with the draining direction, a liquid crystal display element iv of the present invention was fabricated in the same manner as the element of example 3.

EXAMPLE 18

Except for applying polarized light having an irradiation intensity of 800 mJ/cm$^2$ to electrode formation regions in an irradiation direction that forms an angle of 45° with the substrates and is lined up with the draining direction and applying polarized light having an irradiation intensity of 800 mJ/cm$^2$ to an electrode non-formation region of the pixel regions in an irradiation direction that is perpendicular to the substrates and is lined up with the draining direction, a liquid crystal display element v of the present invention was fabricated in the same manner as the element of example 3.

COMPARATIVE EXAMPLE 13

Except for applying, without using a photomask, polarized light having an irradiation intensity of 400 mJ/cm$^2$ to all areas of the pixel regions in an irradiation direction that is perpendicular to the substrates and is lined up with the draining direction, a liquid crystal display element vi for comparison was fabricated in the same manner as the element of example 15.

COMPARATIVE EXAMPLE 14

Except for applying, without using a photomask, polarized light having an irradiation intensity of 800 mJ/cm$^2$ to all areas of the pixel regions in an irradiation direction that is perpendicular to the substrates and is lined up with the draining direction, a liquid crystal display element vii for comparison was fabricated in the same manner as the element of example 15.

COMPARATIVE EXAMPLE 15

Except for applying without using a photomask, polarized light having an irradiation intensity of 800 mJ/cm$^2$ to all areas of the pixel regions in an irradiation direction that forms an angle of 45° with the substrates and is lined up with the draining direction, a liquid crystal display element viii for comparison was fabricated in the same manner as the element of example 15.

Conditions of Film Fabrication and Display Characteristics

Pretilt angle, azimuthal anchoring energy, voltage-transmissivity characteristics, contrast ratio given these voltage-transmissivity characteristics, and response speed (time for the change in transmissivity from 10% to 90%) of the liquid crystal during operation were measured in the liquid crystal display elements i and ii of the present invention and in the liquid crystal display element iii for comparison. The results are shown in Table 11.

TABLE 11

| Liquid crystal display element | Voltage-transmissivity characteristics V: voltage (V) T: transmissivity (%) | Azimuthal anchoring energy (J/m$^2$) | Pretilt Angle (°) | Contrast | Response Speed (ms) |
|---|---|---|---|---|---|
| i | V = 3.71, T = 10<br>V = 5.02, T = 90<br>ΔV (10, 90) = 1.31 | Not measured | Not measured | 300 | 35 |
| ii | V = 3.41, T = 10<br>V = 5.21, T = 90<br>ΔV (10, 90) = 1.31 | Not measured | Not measured | 280 | 25 |
| iii | V = 2.64, T = 10<br>V = 4.72, T = 90<br>ΔV (10, 90) = 2.08 | 2.3 × 10$^{-4}$ | 3 | 220 | 35 |
| iv | V = 3.89, T = 10<br>V = 5.83, T = 90<br>ΔV (10, 90) = 1.94 | 1.2 × 10$^{-3}$ | 3 | 340 | 40 |
| v | V = 3.47, T = 10<br>V = 5.23, T = 90<br>ΔV (10, 90) = 1.76 | 1.0 × 10$^{-3}$ | 3 | 250 | 30 |

As is clear for the table, an IPS mode liquid crystal display element of the present embodiment has excellent contrast ratio and response speed. In addition, an IPS model liquid crystal display element having driving that shows steep transmission and having a greater number of scan lines can be provided.

Examples of the Seventh Invention Group

EXAMPLE 7

In a liquid crystal display element of the present embodiment, liquid crystal is not injected into portions that do not contribute to image display. This is achieved by the provision of at least one orientation film composed of molecules having a photosensitive group and the formation of at least two regions having differing orientation anisotropies by irradiation of the molecules with polarized light, whereby the contact angle between the liquid crystal and the orientation film is made different in correspondence with the orientation anisotropies of the regions of the orientation film.

In the present embodiment, the contact angle is defined as the angle, spanning the liquid crystal, formed by the liquid crystal surface with the orientation film surface.

The contact angle should be 40° or higher as liquid crystal cannot be injected in a region having a contact angle of 40° or higher.

The method of providing orientation film with a contact angle is the same as that for providing an orientation film with a contact angle. As it is an object of the present embodiment to form a region in which liquid crystal is not injected, this region may be formed without consideration of pretilt angle and pretilt direction.

The present embodiment is substantially like embodiment 2.

EXAMPLE 19

First, for the formation of orientation films, a solution for the fabrication of orientation films was prepared. Specifically, $C_6H_5$—CH=CH—CO—O—$(CH_2)_6$—O—$SiCl_3$ was mixed and dissolved in hexamethyldisiloxane under a dry atmosphere to form a 10$^{-3}$ mol/L solution.

As is shown in FIG. 2(a), a substrate for OCB mode having pixel electrodes formed thereon was provided and the solution described above applied to the substrate surface under a dry atmosphere (relative humidity of 5% or less). A printing press was used in the application. The thickness of the applied film was made to be approximately 1 μm. After the hexamethyldisiloxane contained in the applied film was evaporated, the substrate was then baked for a specified length of time toform an orientation film (see FIG. 2(b)).

The substrate having an orientation film formed thereon was then immersed in chloroform, a nonaqueous solvent, and the substrate was washed (washing step, see FIG. 2(c)). In a fixed upright position, the substrate was then lifted from the chloroform and the chloroform was drained (draining orientation step, see FIG. 2(d)). The draining direction was made to be parallel to the substrate. Thus, molecules making up the orientation film were inclined in the draining direction, the direction opposite to the direction of lifting, and oriented accordingly.

After the draining orientation step, polarized ultraviolet light was applied utilizing masking with a photomask. Specifically, the display region of the liquid crystal display element was masked and polarized ultraviolet light was applied. The polarization direction of the ultraviolet light was lined up with the draining direction, and the direction of the applied light was set so as to be perpendicular to the substrate surface along the draining direction. Irradiation intensity was set of 1000 mJ/cm$^2$.

The contact angle inside and outside the display region was then measured using liquid crystal for OCB mode, and it was determined that the value within the display region was 20° and the value outside the display region 60°. The liquid crystal for OCB mode was then applied to the whole surface of the substrate, and the substrate was rotated at 3000 rpm using a spin coater to remove the liquid crystal from the region outside the display region.

The pair of substrates was then adhered together to fabricate a liquid crystal display element of the present embodiment.

It was demonstrated that this liquid crystal display element has excellent display characteristics. The method of producing the liquid crystal display element is also simpler than the conventional vacuum injection.

Example of the Eight Invention Group

Embodiment 8A purpose of the present embodiment is to provide an optically anisotropic film, useful for a liquid crystal display element having more than one liquid crystal orientation, which contributes to the realization of a liquid crystal display element that further has no coloration, but excellent display characteristics.

An optically anisotropic film of the present embodiment is formed of a liquid crystal polymer that is optically positive and uniaxial and of a polymerizable polymer. A liquid crystal polymer that is optically positive and uniaxial is employed.

The liquid crystal polymer is not particularly limited, but it is desirable that a cholesteric liquid crystal polymer or a discotic liquid crystal polymer be used. These liquid crystal polymers are polymeric liquid crystal or a mixture of polymers and low molecular liquid crystal.

The polymerizable polymer is not particularly limited, but it is desirable that the substance be optically isotropic after polymerization for enhancing the advantageously effects of an optically anisotropic film of the present embodiment. Specifically, examples include a phenoxyether based crosslinked resin, epoxy resin, acrylic epoxy resin, melamine resin, phenol resin, melamine resin, and the like.

When for the polymerizable polymer, a polymer that has orientation is used, such as polyvinyl alcohol, ethylene vinyl alcohol copolymer, polyimide resin, polyparabanic-based resin, or the like, the advantageous effects of the present embodiment are further enhanced.

As for optically isotropic properties, the value for retardation is 60 nm or less, preferably 30 nm or less, and the visible light transmissivity is 60% or higher, preferably 70% or higher.

The method of producing an optically anisotropic film of the present embodiment is described below.

First, an orientation film having a plurality of regions with different orientation anisotropies is formed on a substrate. Such an orientation film should be formed on at least one of a pair of substrates. In forming a plurality of regions, a known method such as a rubbing method or a photoalignment method may be carried out. In particular, in a liquid crystal display element having more than one liquid crystal orientation, it is desirable that a plurality of regions corresponding to the orientation divisions be provided in cases of employing an optically anisotropic film of the present embodiment.

Spacers are then dispersed on one of the substrates, sealing material applied on the perimeter of one of the substrates so that the application formation was a frame shape, and the substrates adhered together. Thus, an empty cell is fabricated. It is suitable that the distance between the substrates be approximately in the range of 100–200 $\mu$m.

the polymerizable polymer and the liquid crystal polymer are injected between the substrates through an injection port to form a layer of polymerizable polymer and the liquid crystal polymer.

By polymerizing the polymerizable polymer and the liquid crystal polymer, a polymer is fabricated. The method of polymerization is not particularly limited, but heating or application of light, for example, may be employed for the polymerization.

The polymer is then removed from the cell to obtain an optically anisotropic film of the present embodiment.

EXAMPLE 20

First, for the formation of orientation films, a solution for the fabrication of orientation films was prepared. Specifically, $C_6H_5$—CH=CH—CO—O—$(CH_2)_6$—O—$SiCl_3$ was mixed and dissolved in hexamethyldisiloxane under a dry atmosphere to form a $10^{-3}$ mol/L solution.

As is shown in FIG. 2(a), a substrate for OCB mode having pixel electrodes formed thereon was provided and the solution described above applied to the substrate surface under a dry atmosphere (relative humidity of 5% or less). A printing press was used in the application. The thickness of the applied film was made to be approximately 1 $\mu$. After the hexamethyldisiloxane contained in the applied film was evaporated, the substrate was then baked for a specified length of time to form an orientation film (see FIG. 2(b)).

The substrate having an orientation film formed thereon was then immersed in chloroform, a nonaqueous solvent, and the substrate was washed (washing step, see FIG. 2(c)). In a fixed upright position, the substrate was then lifted from the chloroform and the chloroform was drained (draining orientation step, see FIG. 2(d)). The draining direction was made to be parallel to the substrate. Thus, molecules making up the orientation film were inclined in the draining direction, the direction opposite to the direction of lifting, and oriented accordingly.

After the draining orientation step, polarized ultraviolet light was applied utilizing masking with a photomask. Specifically, the regions (perimeter portions) other than the center portions (50 $\mu$m×210 $\mu$m) of each pixel (80 $\mu$m×240 $\mu$m) were masked, and polarized ultraviolet light applied. The polarization direction of ultraviolet light was lined up with the draining direction, and the direction of the applied light was set so as to be perpendicular to the substrate surface along the draining direction. Irradiation intensity was set at 400 mJ/cm$^2$. After this mask was removed, the center portion of each pixel was masked, and polarized ultraviolet light applied. The polarization direction of the ultraviolet light was lined up with the draining direction, and the direction of the applied light was set so as to form a 45° angle with the substrate surface along the draining direction. Irradiation intensity was set at 400 mJ/cm$^2$.

Spacers were then dispersed on one of the substrates and sealing material was applied on the perimeter of one of the substrates so that the application formation was a frame shape. The substrate and the counter substrate were then adhered together.

Polyvinyl alcohol, serving as the polymerizable polymer and liquid crystal polymer were mixed at a weight ratio of 10 to 90, injected between the substrate and the counter substrate, and polymerized for 12 hours at 120° C. The cell was then disassembled to obtain an optically anisotropic film of the present embodiment.

When this optically anisotropic film is fixed to the OCB mode liquid crystal display element D, the twist is reversed. In addition, because the optically anisotropic film changes the degree of the pretilt in correspondence with the regions having differing degrees of pretilt in the liquid crystal display element D, coloration arising when viewing from a diagonal direction is reduced.

INDUSTRIAL APPLICABILITY

By irradiating the orientation films of a liquid crystal display element with polarized ultraviolet light, orientation films are obtained that can induce a pretilt angle in liquid crystal molecules for various modes of liquid crystal display.

A TN mode liquid crystal display that prevents disclination caused by a transverse electric field and suppresses reduction in contrast caused by this disclination can be obtained by the provision, in perimeter portions of pixel regions in the liquid crystal layer, of transverse electric field suppressing regions for orientating liquid crystal molecules to a higher pretilt angle than do inner regions of pixel regions.

An IPS mode liquid crystal display element having good response speed can be obtained by making the pretilt angle of liquid crystal molecules in first regions greater than that of liquid crystal molecules in a second region. Liquid crystal alignment is controlled by electric field components above the electrodes in the first regions and by transverse electric field components in the region corresponding to the area between the pairs of the electrodes.

By providing transition seed generation regions for accelerating a transition in the liquid crystal layer from splay alignment to bend alignment with the application of a voltage between the electrodes, a liquid crystal display element with no display defects and excellent display quality can be obtained in which the splay-bend transition voltage is reduced by the almost certain generation of transition seeds. Each of the transition seed generation regions has a high pretilt region for orientating liquid crystal molecules to a higher pretilt angle than do other regions.

As is demonstrated by the explanation above, the problems to be solved by the present invention are overcome by employing the constructions of the present invention.

What is claimed is:

1. A liquid crystal display element comprising a liquid crystal material sandwiched between two substrates each having an orientation film, wherein at least one of the orientation films comprises molecules having a photosensitive group and has at least two regions with different orientation anisotropies, having been irradiated with polarized light of differing irradiation intensities, one of the regions surrounding another of the regions, and wherein said liquid crystal molecules have different pretilt angles corresponding to the orientation anisotropies of the regions of the orientation film.

2. The liquid crystal display element according to claim 1, wherein the orientation film having the at least two regions with different orientation anisotropies is located on an inner side of each of the opposed substrates such that regions of the orientation films having a same orientation anisotropy are opposed to one another.

3. The liquid crystal display element according to claim 1, wherein:
the liquid crystal display element is a twisted nematic orientation mode liquid crystal display element comprising a liquid crystal layer with an initial orientation state in twisted orientation mode located between the substrates; and
a transverse electric field suppressing region in which liquid crystal molecules have been oriented at a higher pretilt angle than liquid crystal molecules in an inner region of each pixel region, said suppressing region located in a perimeter portion of each pixel region in the liquid crystal layer.

4. The liquid crystal display element according to claim 3, wherein:
an orientation film for orientating liquid crystal molecules in a specified direction is located on an inner side of each of the substrates; and
the orientation film comprises a high pretilt angle region for initially orienting liquid crystal molecules at a high pretilt angle in each of the transverse electric field suppressing regions and a low pretilt angle region for initially orienting liquid crystal molecules at a low pretilt angle in each of the inner regions.

5. The liquid crystal display element according to claim 4, wherein the orientation film comprises thin film components each having a photosensitive group, the photosensitive groups being polymerized and fixed in a desired direction.

6. The liquid crystal display element according to claim 4, wherein the orientation film is a thin film comprising a group of molecules including at least molecules of a silane-based compound each having a photosensitive group, the group of molecules being bonded and fixed to each of the substrates.

7. The liquid crystal display element according to claim 6, wherein the group of molecules is inclined in a specified direction and the photosensitive groups are polymerized and fixed in the specified direction.

8. The liquid crystal display element according to claim 6, wherein the orientation film is a monomolecular film.

9. A liquid crystal display element comprising a liquid crystal material sandwiched between two substrates each having an orientation film, wherein at least one of the orientation films comprises molecules having a photosensitive group and has at least two regions with different orientation anisotropies, having been irradiated with polarized light applied at differing angles to the substrates, one of the regions surrounding another of the regions, and wherein the liquid crystal molecules have different pretilt angles corresponding to the regions of the orientation film.

10. A method of producing a liquid crystal display element comprising:
forming thin films on a pair of substrates using molecules having at least a photosensitive group;
irradiating areas of at least one of the thin films with polarized light wherein each of said areas is irradiated with one of a plurality of different irradiation intensities to form at least two regions having differing orientation anisotropies on the at least one of the thin films, one of the regions surrounding another of the regions;
forming a sealing material on either of the substrates in a frame shape excluding a portion for a liquid crystal injection port;
adhering the substrates together; and
injecting a liquid crystal material between the substrates through a liquid crystal injection port to form a liquid crystal layer.

11. The method of producing a liquid crystal display element according to claim 10, wherein the liquid crystal display element is a twisted nematic orientation mode liquid crystal display element having a liquid crystal layer with an initial orientation state in twisted orientation mode between the substrates, the method comprising:
forming orientation films on the pair of substrates;
applying polarized liquid to surfaces of the substrates having the orientation films located thereon such that the irradiation intensity of a first polarized light applied to perimeter portions of pixel regions is made greater than the irradiation intensity of a second polarized light applied to regions of the pixel regions other than the perimeter portions to form high pretilt angle regions for orienting liquid crystal molecules at a high pretilt angle in the regions corresponding to the perimeter portions and low pretilt angle regions for orienting liquid crystal molecules at a low pretilt angle in the regions corresponding to the inner regions;
adhering the substrates together; and
injecting a liquid crystal between the substrates to form a liquid crystal layer;
whereby transverse electric field suppressing regions are formed in the perimeter portions of the pixel regions in the liquid crystal layer, the transverse electric field suppressing regions orienting liquid crystal molecules to a higher pretilt angle than do the inner regions of the pixel regions.

12. The method of producing a liquid crystal display element according to claim 11, wherein forming orientation films comprises contacting a silane-based compound having photosensitive groups to the substrate surfaces under a dry atmosphere, whereby the silane-based compound is chemisorbed to the substrate surfaces.

13. The method of producing a liquid crystal display element according to claim 12, further comprising:
removing unadsorbed silane-based compound by washing the substrate surfaces having the orientation films formed thereon using a washing solution immediately after forming orientation films; and
temporarily aligning molecules of silane-based compound adsorbed to the substrate surfaces by standing the washed substrates in a fixed direction to drain and dry washing solution remaining on the substrate surfaces;
wherein the draining direction is parallel to the planes of polarization of the step of carrying out an orientation treatment by photoalignment with polarized light.

14. A method of producing a liquid crystal display element comprising:
forming thin films on a pair of substrates using molecules having at least a photosensitive group;
by irradiating plurality of areas of at least one of the thin films with polarized light having parallel planes of polarization and at least two different angles of incidence with respect to surfaces of the substrates to form at least two regions having differing orientation anisotropies on at least one of the thin films, one of the regions surrounding another of the regions;
forming a sealing material on either of the substrates in a frame shape excluding a portion of said frame shape for a liquid crystal material injection port;
adhering the substrates together; and
injecting a liquid crystal material between the substrates through a liquid crystal injection port to form a liquid crystal layer.

15. The method of producing a liquid crystal display element according to claim 14, wherein the liquid crystal display element is a twisted nematic orientation mode liquid crystal display element having a liquid crystal layer with an initial orientation state in twisted orientation mode provided between the substrates, the method comprising the steps of:
forming orientation films on the pair of substrates;
applying polarized light to surfaces of the substrates having the orientation films formed thereon such that the plane of polarization of a first polarized light applied to regions corresponding to perimeter portions of pixel regions in the liquid crystal layer and a second plane of polarization applied to regions corresponding to inner regions of the perimeter portions are made parallel, and the angle of incidence with respect to the substrates surfaces of the first polarized light is made smaller than the angle of incidence with respect to the substrate surfaces of the second polarized light to form high pretilt angle regions for orientating liquid crystal molecules at a high pretilt angle in the regions corresponding to the perimeter portions and low pretilt angle regions for orienting liquid crystal molecules at a low pretilt angle in the regions corresponding to the inner regions;
adhering the substrates together; and
injecting a liquid crystal material between the substrates to form a liquid crystal layer;
whereby transverse electric field suppressing regions are formed in the perimeter portions of the pixel regions in the liquid crystal layer, the transverse electric field suppressing regions orienting liquid crystal molecules to a higher pretilt angle than do the inner regions of the pixel regions.

16. A liquid crystal display element comprising liquid crystal material sandwiched between two substrates each having an orientation film, wherein at least one of the orientation films comprises molecules having a photosensitive group and has at least two regions with differing orientation anistropies having been irradiated with polarized light of differing irradiation intensities, one of the regions surrounding another of the regions, and wherein pretilt angles of liquid crystal molecules and anchoring energies, with respect to liquid crystal moles, of the orientation film are different in correspondence with the orientation anisotropies of the regions of the orientation film.

17. The liquid crystal display element according claim 16, wherein the orientation film having the at least two regions with differing orientation anisotropies is located on an inner side of each of the substrates such that regions of the orientation films having a same orientation anisotropy are opposed to one another.

18. A liquid crystal display element comprising a liquid crystal sandwiched between two substrates each having an orientation film, wherein at least one of the orientation films comprises molecules having a photosensitive group and has at least two regions with differing orientation anisotropies having been irradiated with polarized light applied at differing angles to the substrates, one of the regions surrounding another of the regions, and wherein pretilt angles of liquid crystal molecules and anchoring energies, with respect to liquid crystal molecules, of the orientation film are different in correspondence with the orientation anisotropies of the regions of the orientation film.

19. A method of producing a liquid crystal display element comprising:
forming thin films on a pair of substrates using molecules having at least a photosensitive group;
irradiating a plurality of areas of at least one of the thin films with polarized light wherein each of said areas is irradiated with one of a plurality of different irradiation intensities to form at least two regions having differing orientation anisotropies on the at least one of the thin films, one of the regions surrounding another of the regions;
forming a sealing material on either of the substrates in a frame shape and excluding a portion of said frame shape for a liquid crystal material injection port;
adhering the substrates together; and
injecting a liquid crystal material between the substrates through a liquid crystal injection port to forms a liquid crystal layer;
wherein regions are formed in which a pretilt angle of liquid crystal molecules corresponding to the orientation anisotropy of an orientation film provided on an inner side of at least one of the substrates differs from a pretilt angle of liquid crystal molecules corresponding to the orientation anisotropy of an orientation film provided on an inner side of the other substrate and an anchoring energy region, with respect to liquid crystal molecules, of the orientation film on the inner side of the one substrate differs from an anchoring energy region, with respect to liquid crystal molecules, of the orientation film provided on the inner side of the other substrate.

20. A method of producing a liquid crystal display comprising:

forming thin films on a pair of substrates using molecules having at least a photosensitive group;

irradiating a plurality of areas of at least one of the thin films with polarized light having parallel planes of polarization and at least two different angles of incidence with respect to surfaces of the substrates to form at least two regions having differing orientation anisotropies on the at least one of the thin film, one of the regions surrounding another of the regions;

forming a sealing material on either of the substrates in a frame shape and excluding a portion of said frame shape for a liquid crystal material injection port;

adhering the substrate together; and injecting a liquid crystal material between the substrates through a liquid crystal injection port to form a liquid crystal layer;

whereby regions are formed in which a pretilt angle of liquid crystal molecules corresponding to the orientation anisotropy of an orientation film provided on an inner side of at least one of the substrates differs from a pretilt angle of liquid crystal molecules corresponding to the orientation anisotropy of an orientation film provided on an inner side of the other substrate and an anchoring energy region, with respect to liquid crystal molecules, of the orientation film on the inner side of the one substrate differs from an anchoring energy region, with respect to liquid crystal molecules, of the orientation film provided on the inner side of the other substrate.

* * * * *

UNITED STATES PATENT AND TRADEMARK OFFICE
CERTIFICATE OF CORRECTION

PATENT NO. : 6,982,774 B1  Page 1 of 1
APPLICATION NO. : 10/110409
DATED : January 3, 2006
INVENTOR(S) : Takaiki Nomura et al.

It is certified that error appears in the above-identified patent and that said Letters Patent is hereby corrected as shown below:

On the title page item (57),
IN ABSTRACT
 Line 7, replace "is" with --are--.

In claim 4, col. 75, line 3, replace "orientating" with --orienting--.

In claim 11, col. 76, line 8, replace "liquid" with --light--.

In claim 14, col. 77, line 5, delete "by" and replace "irradiating plurality" with --irradiating a plurality--.

In claim 15, col. 77, line 16, replace "substrates" with --substrate--.
 col. 77, line 19, replace "orientating" with --orienting--.

In claim 16, col. 78, line 10, replace "moles" with --molecules--.

In claim 19, col. 78, line 17, replace "forms" with --form--;
 col. 78, line 19, replace "wherein" with --whereby--;
 col. 78, line 30, replace "film provided on" with --film on--.

In claim 20, col. 79, line 1, replace "liquid crystal display" with --liquid crystal display element --;
 col. 79, Line 10, replace "film" with --films--.
 col. 80, line 15, replace "substrate" with --substrates--.

Signed and Sealed this

Ninth Day of January, 2007

JON W. DUDAS
*Director of the United States Patent and Trademark Office*